US010028199B2

(12) United States Patent
Friday et al.

(10) Patent No.: US 10,028,199 B2
(45) Date of Patent: *Jul. 17, 2018

(54) METHODS AND APPARATUS RELATING TO THE USE OF REAL AND/OR VIRTUAL BEACONS

(71) Applicant: Mist Systems, Inc., Los Altos, CA (US)

(72) Inventors: Robert Friday, Los Gatos, CA (US); Neal Dante Castagnoli, Morgan Hill, CA (US); Randall Wayne Frei, San Jose, CA (US)

(73) Assignee: Mist Systems, Inc., Cupertino, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 15/135,376

(22) Filed: Apr. 21, 2016

(65) Prior Publication Data
US 2016/0323803 A1 Nov. 3, 2016

Related U.S. Application Data

(63) Continuation of application No. 14/811,689, filed on Jul. 28, 2015, now Pat. No. 9,363,784.
(Continued)

(51) Int. Cl.
*H04W 4/00* (2018.01)
*H04W 40/24* (2009.01)
(Continued)

(52) U.S. Cl.
CPC ........ *H04W 40/244* (2013.01); *H04B 17/318* (2015.01); *H04W 4/02* (2013.01);
(Continued)

(58) Field of Classification Search
CPC ..... H04W 40/244; H04W 4/02; H04W 64/00; H04W 64/003; H04W 48/12; H04W 88/02; H04B 17/318
See application file for complete search history.

(56) References Cited

U.S. PATENT DOCUMENTS 5,293,642 A 3/1994 Lo
5,734,977 A 3/1998 Sanmugam
(Continued)

FOREIGN PATENT DOCUMENTS

EP          2268066 A1   12/2010
WO   2009122000 A1   10/2009
(Continued)

OTHER PUBLICATIONS

Notification of Transmittal of the International Search Report and the Written Opinion of the International Searchingn Authority or the Declaration, International Search Report and Written Opinion of the International Searching Authority from PCT/US2016/030324, dated Aug. 18, 2016 1-8 pages.
(Continued)

*Primary Examiner* — Kevin Mew
(74) *Attorney, Agent, or Firm* — Straub & Straub; Michael P. Straub; Stephen T. Straub

(57) ABSTRACT

Virtual beacons are virtual in that an actual beacon need not be transmitted but a rather a virtual beacon transmitter at a desired location maybe considered to transmit virtual beacons. In some embodiments a set of beacon transmitter information for one or more beacons is supplied to devices in a communications system. The beacon transmitter information indicates transmission power and location of actual and virtual beacon transmitters as well as information to be communicated by virtual beacons. Devices with access to beacon information can determine based on the location of a wireless terminal whether the wireless terminal is within coverage area of a virtual beacon and report reception of the virtual beacon to the wireless terminal or a component of the wireless terminal which acts upon receiving an indication of beacon reception.

20 Claims, 30 Drawing Sheets

Related U.S. Application Data

(60) Provisional application No. 62/155,428, filed on Apr. 30, 2015.

(51) Int. Cl.
*H04W 64/00* (2009.01)
*H04W 4/02* (2018.01)
*H04B 17/318* (2015.01)
*H04W 88/02* (2009.01)
*H04W 48/12* (2009.01)

(52) U.S. Cl.
CPC ......... *H04W 64/00* (2013.01); *H04W 64/003* (2013.01); *H04W 48/12* (2013.01); *H04W 88/02* (2013.01)

(56) References Cited

U.S. PATENT DOCUMENTS

| | | | |
|---|---|---|---|
| 5,946,612 A | 8/1999 | Johansson | |
| 6,304,515 B1 | 10/2001 | Spiesberger | |
| 6,597,927 B1* | 7/2003 | Eswara | H01Q 1/246 370/334 |
| 6,707,422 B2 | 3/2004 | Sheynblat et al. | |
| 6,928,296 B2 | 8/2005 | Kanemoto et al. | |
| 7,058,359 B1 | 6/2006 | Doyle et al. | |
| 7,079,850 B2 | 7/2006 | Cameron | |
| 7,110,771 B2 | 9/2006 | Fisher | |
| 7,110,772 B1 | 9/2006 | Wu | |
| 7,200,392 B2 | 4/2007 | Kennedy, Jr. et al. | |
| 7,598,856 B1 | 10/2009 | Nick et al. | |
| 7,689,240 B2 | 3/2010 | Anderson | |
| 8,131,312 B2 | 3/2012 | Levin et al. | |
| 8,738,024 B1 | 5/2014 | Kerr et al. | |
| 8,879,607 B2 | 11/2014 | Skarp | |
| 8,942,718 B2 | 1/2015 | Svendsen | |
| 8,965,411 B1* | 2/2015 | Busch-Sorensen | G01S 5/14 370/328 |
| 9,225,370 B2 | 12/2015 | Tazebay et al. | |
| 9,229,089 B2 | 1/2016 | Do et al. | |
| 9,363,784 B1 | 6/2016 | Friday et al. | |
| 9,648,652 B2 | 5/2017 | Granbery | |
| 9,743,254 B2* | 8/2017 | Friday | H04W 4/043 |
| 9,894,475 B2* | 2/2018 | Morgan | H04W 4/027 |
| 2002/0045424 A1 | 4/2002 | Lee | |
| 2004/0203880 A1 | 10/2004 | Riley | |
| 2005/0003827 A1 | 1/2005 | Whelan | |
| 2005/0075118 A1* | 4/2005 | Lewis | H04W 64/00 455/456.5 |
| 2005/0136845 A1 | 6/2005 | Masuoka et al. | |
| 2005/0136981 A1 | 6/2005 | Rensburg et al. | |
| 2007/0073842 A1 | 3/2007 | Uehara | |
| 2007/0117568 A1 | 5/2007 | Misikangas et al. | |
| 2007/0121560 A1 | 5/2007 | Edge | |
| 2007/0270157 A1* | 11/2007 | Kim | H04W 64/00 455/456.1 |
| 2008/0002627 A1 | 1/2008 | Cha et al. | |
| 2009/0022078 A1 | 1/2009 | Patterson et al. | |
| 2009/0047973 A1 | 2/2009 | MacNaughtan et al. | |
| 2010/0087194 A1 | 4/2010 | MacNaughtan et al. | |
| 2010/0142365 A1 | 6/2010 | Richardson et al. | |
| 2010/0248640 A1 | 9/2010 | MacNaughtan et al. | |
| 2010/0309051 A1* | 12/2010 | Moshfeghi | G01S 5/0236 342/378 |
| 2011/0069630 A1* | 3/2011 | Doppler | H04W 16/14 370/252 |
| 2011/0110338 A1 | 5/2011 | Khoryaev | |
| 2011/0190004 A1 | 8/2011 | Tenny et al. | |
| 2011/0212720 A1 | 9/2011 | Hamalainen et al. | |
| 2011/0287801 A1 | 11/2011 | Levin et al. | |
| 2012/0026941 A1 | 2/2012 | Ahmad et al. | |
| 2012/0040602 A1 | 2/2012 | Charland | |
| 2012/0064881 A1 | 3/2012 | Svendsen | |
| 2012/0282948 A1* | 11/2012 | Waters | H04W 64/00 455/456.2 |
| 2013/0030931 A1* | 1/2013 | Moshfeghi | G01S 19/48 705/16 |
| 2013/0260693 A1* | 10/2013 | Un | G01S 5/02 455/67.11 |
| 2014/0087758 A1* | 3/2014 | Maor | G01S 5/0252 455/456.1 |
| 2014/0357196 A1 | 12/2014 | Mayor et al. | |
| 2015/0066802 A1 | 3/2015 | Goulart et al. | |
| 2015/0201306 A1 | 7/2015 | Kazemi et al. | |
| 2015/0249907 A1 | 9/2015 | Gupta et al. | |
| 2015/0296476 A1* | 10/2015 | Wilmhoff | H04W 64/00 455/456.1 |
| 2015/0334677 A1* | 11/2015 | Patil | H04W 4/025 455/456.1 |
| 2015/0373762 A1 | 12/2015 | Raj et al. | |
| 2016/0025837 A1* | 1/2016 | Hillier | G01S 5/0054 342/386 |
| 2016/0087765 A1 | 3/2016 | Guey et al. | |
| 2016/0119958 A1 | 4/2016 | Tan et al. | |
| 2016/0150357 A1 | 5/2016 | Jung et al. | |
| 2016/0261986 A1* | 9/2016 | Nord | H04W 4/023 |
| 2016/0306813 A1 | 10/2016 | Meredith et al. | |
| 2016/0323717 A1 | 11/2016 | Friday et al. | |
| 2016/0323754 A1* | 11/2016 | Friday | H04W 16/28 |
| 2016/0323803 A1 | 11/2016 | Friday et al. | |
| 2017/0273008 A1* | 9/2017 | Friday | H04W 16/28 |

FOREIGN PATENT DOCUMENTS

| | | |
|---|---|---|
| WO | 2011106517 A1 | 9/2011 |
| WO | 2011106538 A1 | 9/2011 |

OTHER PUBLICATIONS

Notification of Transmittal of the International Search Report and the Written Opinion of The International Searching Authority or the Declaration, International Search Report and Written Opinion of the International Searching Authority from PCT/US2016/030328, dated Sep. 1, 2016 1-7 pages.

Notification of Transmittal of the International Search Report and the Written Opinion of The International Searching Authority or the Declaration, International Search Report and Written Opinion of the International Searching Authority from PCT/US2016/030326, dated Aug. 18, 2016 1-7 pages.

\* cited by examiner

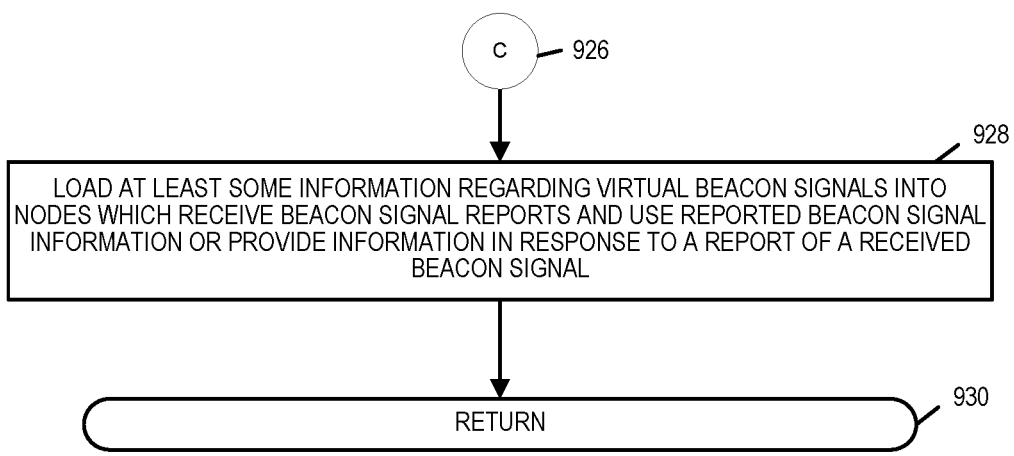

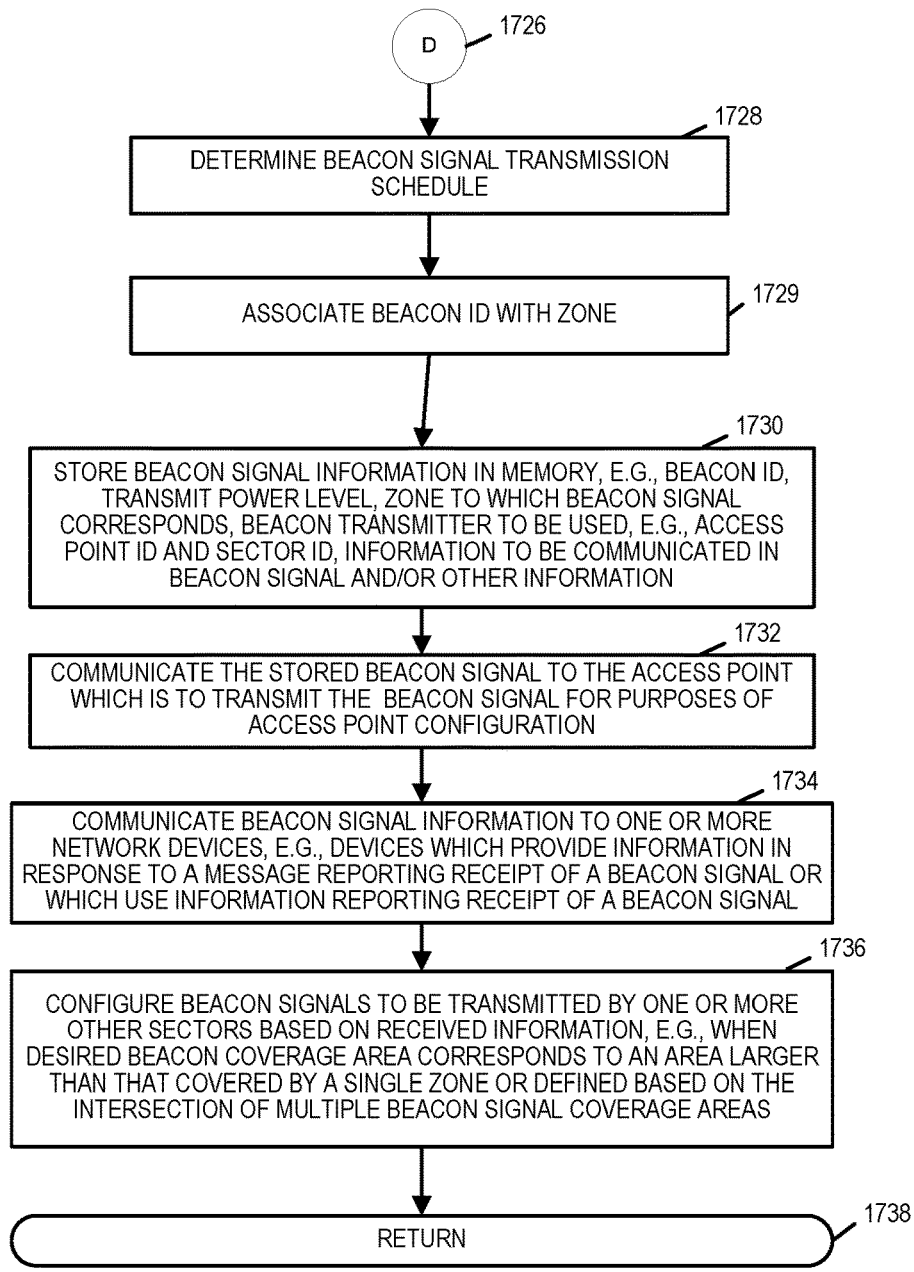

METHODS AND APPARATUS RELATING TO THE USE OF REAL AND/OR VIRTUAL BEACONS

RELATED APPLICATIONS

The present application is a continuation of U.S. patent application Ser. No. 14/811,689 filed Jul. 28, 2015 and claims the benefit of U.S. Provisional Patent Application Ser. No. 62/155,428 filed Apr. 30, 2015 and U.S. Provisional Patent Application Ser. No. 62/197,980 filed Jul. 28, 2015, all of the preceding applications are hereby expressly incorporated by reference in their entirety.

FIELD

The present application relates to wireless beacons and, more particularly, to methods and apparatus for using real and/or virtual beacon signals.

BACKGROUND

Beacon transmissions are used for a wide range of applications. WiFi, Bluetooth and other types of beacons are becoming common place. A device detecting a beacon signal may use information included in a received beacon signal and/or information about the signal strength of a received beacon signal to obtain additional information or to provide information to another device which can be used for a variety of purposes.

Stores and/or other information providers may install access points to transmit beacon signals to communicate information. They also support devices and/or system components which can provide information relating to a beacon signal, e.g., information indicating a mapping of a value included in a beacon signal to information. Thus, to support the use of beacon signals, transmitters and information providing elements are normally included in a network which facilitate use of beacon signals by devices, e.g., mobile wireless terminals of end users, which may detect one or more transmitted beacon signals.

In some systems a network device or other device, operated by the store or another entity may receive a report indicating receipt of a beacon signal by a device and respond to the device with information that may be useful to the device that reported the receipt of the beacon signal. The network or other device in such a case expects to receive a message indicating that a particular beacon signal was received and, optionally, the strength of the received beacon signal. Thus such devices may include what can be thought of as a beacon interface which receives beacon related information and responds, at least in some cases, with information to supplied to the device reporting receipt of a beacon signal.

It would be desirable if wireless terminal could be able to take advantage of devices, modules or other components which are intended to provide information in regard to received beacon signals even when beacon signals are not in fact received and/or the device seeking information lacks the ability such as a wireless receiver, capable of receiving a transmitted beacon signal. It would also be desirable if an entity seeking to communicate information could take advantage of devices, modules or components intended to supply information in response to an indication that a beacon signal was received, without having to deploy an actual beacon transmitter in at least some cases.

In view of the above discussion, it should be appreciated that there is a need for methods and/or apparatus which allow devices to communicate or receive information as if a beacon signal were transmitted and/or received even when a beacon signal is not actually transmitted or received.

SUMMARY OF THE INVENTION

Methods and apparatus for communicating and/or obtaining information are described. The methods and apparatus support the use of what are called virtual beacon information and messages relating to virtual beacons. Virtual beacons are virtual in that an actual beacon signal need not be, and in many cases is not, transmitted.

An information provider seeking to use virtual beacons can select one or more locations, e.g., from a map where a beacon transmitter is to be placed. The information provider indicates the transmission power level as well as the location of the virtual beacon transmitter. The information to be transmitted on the virtual beacon signal is also indicated. A beacon identifier which may be a value or other identifier is associated with the virtual beacon signal and may be, and often is, of the same format as a beacon identifier used to identify an actual beacon signal. A set of virtual beacon transmitter information maybe, and in some embodiments is, created for one or more virtual beacons and supplied to one or more devices in a communications system. The devices to which the virtual beacon transmitter information is supplied may include wireless terminals and/or a network device. Devices which store or have access to the virtual beacon information can determine based on the location of a wireless terminal whether the wireless terminal is within the coverage area of a virtual beacon and the signal strength of the virtual beacon signal that would have been received by the wireless terminal if a real beacon signal had been transmitted by the virtual beacon transmitter. The wireless terminal's distance to the virtual beacon transmitter may also be determined along with the direction the wireless terminal relative to the beacon transmitter. In embodiments where the wireless terminal determines the receipt of a virtual beacon signal it uses the information internally, e.g., by providing the information indicating the receipt of a beacon signal, e.g., a virtual beacon signal, to a device or component within or external to the wireless terminal which processes information indicating the receipt of a beacon signal and takes an action, e.g., generates an audible, visual, or some form of perceivable alert, displays a message or takes some other physical action based on the information indicating the receipt of a real or virtual beacon signal.

In cases where a network node is the device that determines that a wireless terminal is to be treated as having received a virtual beacon signal, the network node sends a message to the wireless terminal or another device that uses received beacon signal information indicating that the wireless terminal received a beacon signal, e.g., a virtual beacon signal. The wireless terminal then uses the information in the received message and reports to a device or component in the wireless terminal that a beacon signal of the type and strength indicated in the received message was received when in fact it was the message reporting a virtual beacon signal rather than an actual beacon signal that was received. Messages reporting receipt of a virtual beacon signal may, and in some embodiments do, indicate distance, in addition to received signal strength, to the virtual beacon transmitter and optionally also direction to the virtual beacon transmitter.

A network device external to the wireless terminal or a component of the wireless terminal which receives a message indicating receipt of a beacon signal supplies information in response to such a message or takes an action on the received beacon signal information whether a receipt of a real or virtual beacon signal is being reported. In this way, the same device or circuit which responds to messages or signals regarding actual received beacons can respond to messages reporting the receipt of a virtual beacon signal as if it were an actual beacon signal. In fact, the device which provides information in response to messages reporting received beacon signals need not know that the beacon information it is being supplied with corresponds to a virtual beacon signal or that a beacon signal being reported as being received is a virtual beacon signal. While the reports of receiving a beacon signal are not actually true in the case of virtual beacon signals the device or component within the wireless terminal acting on the report of a received beacon signal need not know this. By miss-representing to the device that takes actions based on received beacon signals, a wireless terminal can obtain information using messages of the same format which would be used if an actual beacon signal was received and corresponding information was being sought. While virtual beacon identifiers and corresponding information maybe included in an information database with no distinction between information corresponding to actual beacon signals and virtual beacon signals, in some embodiments messages reporting the receipt of virtual beacon signals may include additional information beyond that normally included in messages communicating the receipt of actual beacon signals. For example information on the reporting device's angle, direction, or distance relative to the virtual beacon transmitter maybe reported in a message reporting receipt of a virtual beacon signal in addition to beacon signal strength information and/or information indicating a time of receipt of the virtual beacon signal in addition to received beacon signal power level. In the case of a message reporting receipt of a virtual beacon signal the reported time of signal receipt is the time at which the wireless terminal was at the location on which the received signal strength report was based. Thus, the reported signal strength in a message reporting receipt of a virtual beacon corresponds to the wireless terminals estimate of the strength of beacon that would have been received if transmitted by the virtual transmitter at the time indicated in the message reporting receipt of the virtual beacon signal given the wireless terminal's actual location at the indicated time and specified location of the virtual beacon transmitter.

Thus it should be appreciated that receipt of a virtual beacon based on wireless terminal location and virtual beacon transmitter characteristics can be determined either in a network element outside the wireless terminal or in the wireless terminal depending on the particular embodiment.

For each of one or more virtual beacon signal transmitters, a wireless terminal or network device responsible for determining receipt of a virtual beacon signal by a wireless terminal stores the location of the beacon transmitter, the transmit power level of the beacon transmitter, the information and/or beacon identifier communicated by the virtual beacon signal. Additional information may include the type of beacon signal and/or the frequency band allegedly used to transmit the virtual beacon transmitter.

In some embodiments the wireless terminal includes a location determination device or module such a GPS receiver or location determination circuit which may operate on received signals whether they be GPS signals, beacon signals or other signals. Thus, in various embodiments the wireless terminal may determine its location in any of a variety of different ways. Wireless terminal location determination is in some embodiments performed by a network device, e.g., based on signals received from the wireless terminal or based on information received from other devices. The determined wireless location information whether it be determined in the wireless terminal or network device is communicated to the device or component of the wireless terminal or network for determining whether a wireless terminal has received a virtual beacon signal. Based on its determined location at a given time, the wireless terminal or network device which supports virtual beacon signal receipt determinations, determines, based on stored information, if a wireless terminal is in the transmission range of a virtual beacon transmitter. If the device responsible for determining receipt of virtual beacon signals determines that a wireless terminal is in the range of a virtual beacon transmitter the determination device determines based on the location of the wireless terminal, the transmit power level of the virtual beacon and the location of the beacon transmitter a received signal strength which is the strength of a beacon signal that would have been received by the wireless terminal if the virtual transmitter had in fact transmitted a beacon signal at the transmit power level of the virtual beacon signal. The determination device may, and in some embodiments does use a path loss model that takes into consideration distance in determining the received signal strength corresponding to the virtual beacon signal.

Once a received signal strength has been computed, the virtual beacon receipt determination device in some embodiments proceeds to generate a received beacon signal reporting message, e.g., signal, reporting the receipt of a virtual beacon signal. The reporting message includes, in some embodiments, an identifier identifying the wireless terminal or other device reporting receipt of the virtual beacon signal, the determined received signal strength of the virtual beacon signal, a beacon signal identifier identifying the received beacon signal and/or other content which was to be communicated by the virtual beacon signal if it had been transmitted as an actual beacon signal. The beacon signal reporting message may have the same form and content of a beacon signal reporting message used to report receipt of a real beacon signal but itself is not a beacon signal. For example, a cellular message may be sent to a wireless terminal indicating receipt of a virtual WiFi beacon signal or a WiFi data signal which is not a beacon signal may be sent to the wireless terminal indicating that the wireless terminal should act as if it received a WiFi beacon signal having the content and received power level indicated in the communicated message In such cases, the virtual beacon reception determination device, in sending the message reporting the receipt of the virtual beacon signal, is intentionally providing false information since no such beacon signal was actually received. This miss-representation allows the device receiving the message to act on the reported receipt of a beacon signal and obtain information from a device or module, e.g., a network device or a module on the wireless terminal, using the same interface and messaging used to obtain information used when actual beacon signals are received and are to be acted upon.

While the same message format and content may be used for reporting the receipt of actual received beacon signals and virtual beacon signals, in some embodiments virtual beacon signal reporting messages include more information than messages communicating the receipt of actual beacon signals. The virtual beacon signal reporting message includes, in some embodiments, information indicating the wireless terminals position relative to the position of the virtual beacon transmitter. The position may be an angle to the virtual transmitter, direction and/or distance to the virtual beacon transmitter.

It should be appreciated that virtual beacon transmitters, by their virtual nature, do not require the deployment of actual beacon transmitter hardware and because they do not transmit actual signals do not cause interference to other actual beacon transmitters. Thus virtual beacon transmitters can correspond to wireless spectrum which is licensed and not available for actual beacon transmitters. In addition virtual beacon transmitters can use transmission power levels which exceed transmission power levels allowed by law in a given area but, given the virtual nature of the beacon signals are allowable since the power levels do not correspond to actual transmissions. In addition virtual beacon transmitters can be positioned at locations where it might not be possible or desirable to deploy actual beacon transmitters. As a result of the wide range of locations, power levels, frequency bands and/or other characteristics that can be configured for a virtual beacon signal and virtual beacon transmitter, virtual beacon signals can cover geographic regions and/or zones which might not be possible to cover with an actual beacon transmitter. For example, a virtual beacon transmitter might be indicated as being positioned at the center of a city at a vertical position 5000 feet high with a transmit power level that would result in a beacon transmission covering the entire city. While a physical transmitter with such characteristics might not be physically or legally possible the methods and apparatus of the present invention allow for such a virtual beacon transmitter and for wireless terminals to report the receipt of beacon signals from such a virtual beacon transmitter based on their location and information about the virtual beacon transmitter.

Significantly, from the wireless terminal perspective, the wireless terminal is able to obtain information or services from devices, components, applications, etc. which respond to or act on reported receipt of beacon signals even when a signal may not have actually been received. In fact, in some embodiments the wireless terminal reporting the beacon signal lacks a receiver having the ability to receive the type of beacon signal being reported as having been received. For example, a cell phone which lacks the ability to receive iBeacon signals may report the receipt of an iBeacon based on virtual beacon information and the wireless terminal's known location.

In addition to a virtual beacon reception determination device storing location and transmit power for virtual beacon transmitters, in some embodiments, the virtual beacon reception determination device also stores the same or similar information for actual beacon transmitters. The stored information may include information indicating whether the transmitter is a real or virtual beacon transmitter. In some such embodiments even when an actual beacon signal is not received from the known actual beacon transmitter the virtual beacon reception determination device will report a received beacon signal in the same manner as it would for a virtual beacon signal. Thus, in some embodiments a virtual beacon reception determination device generates phony received beacon signal reports for known actual transmitters in addition to virtual beacon transmitters. Such an approach is particularly useful when a device lacks a receiver capable of receiving beacons of a particular type known to be transmitted in an area in which the wireless terminal is located and the wireless terminal desires access to information being provided to devices which are actually capable of receiving the beacon signals.

Numerous variations on the above described methods and apparatus are possible and remain within the scope of the present invention. While various embodiments have been discussed in the summary above, it should be appreciated that not necessarily all embodiments include the same features and some of the features described above are not necessary for all embodiments. Numerous additional features, embodiments and benefits of various embodiments are discussed in the detailed description which follows.

BRIEF DESCRIPTION OF THE FIGURES

FIG. 9 is a diagram showing that FIG. 9 includes the combination of FIGS. 9A and 9B which, in combination, show the steps of a virtual beacon transmitter configuration subroutine.

FIG. 9B is a second part of the flow chart of FIG. 9.

FIG. 17 which includes the combination of FIGS. 17A and 17B illustrates an access point configuration subroutine in accordance with one embodiment.

FIG. 17B is a second part of FIG. 17.

DETAILED DESCRIPTION

Figure 1:
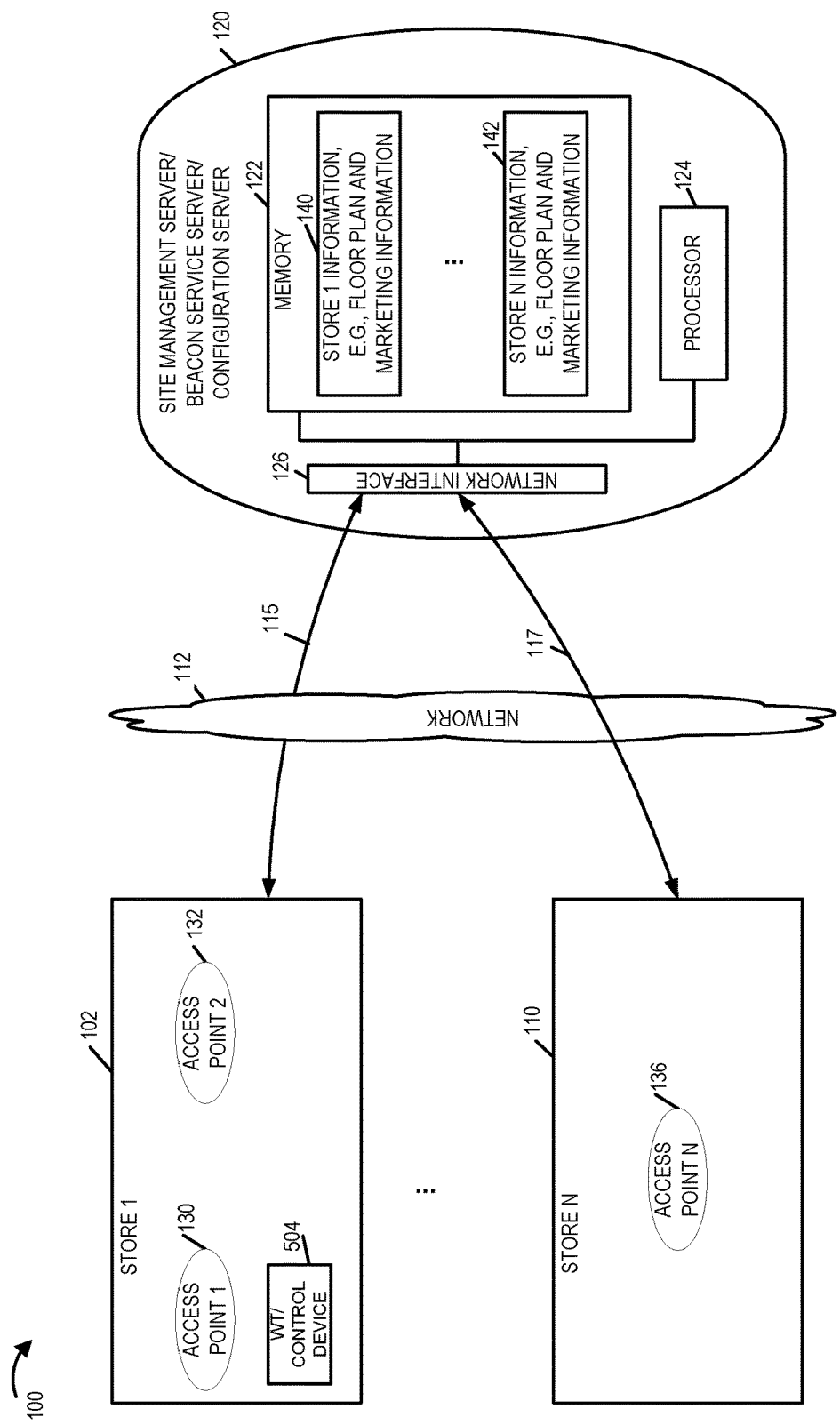
FIG. 1 is a drawing of an exemplary system, in accordance with an exemplary embodiment.

FIG. 1 is a drawing of an exemplary system 100 implemented in accordance with an exemplary embodiment. Exemplary system 100 supports generation, use and transmission of beacons communicating information to one or more desired regions of interest, e.g., sections of one or more venues.

Exemplary system 100 includes one or more sites of interest, e.g., stores, a communications network 112, and a site management/beacon/configuration and/or zone correlation server 120. As should be appreciated the configuration, management, zone correlation services can be provided by one server 120 or distributed through a plurality of servers which operate together to provide the functions provided by the exemplary server 120. The server 120 maybe, and sometimes is, located in a network and is thus sometimes referred to as a cloud sever since the physical location of the server is not critical to operation of the system even though the server 120 is normally not located at a customer site. However in some applications sever 120 may be, and is, located at a customer side or office location. The one or more sites of interest include store 1 102, . . . , store N 110. One or more wireless terminals 504 maybe present at a store or other site and can operate as a control device for configuring beacon signals transmitted by access points, zones and/or virtual beacons as will be discussed below. Wireless terminals may, and in various embodiments do, receive beacon signals and/or messages reporting the receipt of a virtual beacon signal and act on received beacon signal information. The wireless terminals can, and sometimes do, provide information to a network device such as a server which includes a zone correlation information which can determine the location of the wireless device from received signals, e.g., beacon signals reported to the zone correlation engine and which can and sometimes does return information, offers and/or store or sales position location information, corresponding to a beacon signal received by the WT or a zone in which the wireless terminal is determined to be located. As can be seen in the figure, store 1 102 includes access point 1 130 and access point 2 132 while store N includes an access point N 136. Each of the access points 130, 132, 136 has beam forming capability, e.g., capability of generating beams, that can be used to transmit one or more beacons. The beacons are used to communicate information, either directly via the contents of the beacon or by correlating one or more identifiers in the transmitted beacons to other information. The beacons are transmitted into regions of the corresponding stores in accordance with the features of the invention. Areas in the store may be defined in terms of the beacon signals which are expected to be received in a particular area. For example, zones may be defined by arbitrary shapes anywhere in the coverage area of the access points. In some embodiments each of the access points 130, 132, 136 is coupled to a backend server, e.g., site management/beacon service server 120, or other network device via a wireless connection or a wired connection. The backend server may, and in some embodiments does, include a zone correlation engine and a database for mapping zones to tags.

In some embodiments the access points 130, 132, 136 are located or incorporated into ceiling light fixtures and/or placed adjacent to such fixtures. In some embodiments the configuration and/or settings of each of the access points can be controlled by an administrator via a device which can communicate with the access points via the wireless connection or a wired connection coupling the access points to such a device. Similarly, in some embodiments each of the access points 130, 132, 136 can be controlled by the site management/beacon service server 120 which can communicate with the access points via the wireless connection or a wired connection over the network 112. The communications network 112 may be, e.g., a hybrid fiber-coaxial (HFC) network, satellite network, and/or internet.

The site management/beacon service server 120 is configured to control and/or configure the access points located at various sites to generate beams conveying beacons communicating information, e.g., advertisement and/or other relevant information, to one or more regions of the store intended to be covered by such beams. The site management/beacon service server 120 includes a memory 122, a processor 124 and a network interface 126. In some embodiments the memory 122 includes store floor plan and/or marketing information 140, 142 corresponding to the plurality of stores 102 through 110 in the system. The site management/beacon service server 120 uses the stored floor plan and/or marketing information 140, 142 to configure and/or control the access points 130, 132, 136 to generate beacons communicating information, e.g., advertisements/promotions, to one or more targeted regions in the stores 102, 110 via beams covering these targeted regions. The information and/or control signaling for controlling the access points can be communicated from the site management/beacon service server 120 via the network interface which coupled the site management/beacon service server 120, via the links 115, 117 to the access points and/or the communications network of the stores 102, 110.

Methods and/or apparatus for generating, transmitting and/or using wireless beacons are described. In various embodiments, rather than use individual beacon transmitters for each region of an environment, e.g., a store, office or other area, one or more access points with directional antenna beams are used. The beams of an access point, e.g., base station, cover different geographic areas of the environment. Individual beams transmit one or more beacons. The beacons communicate information directly in the beacon or indirectly via one or more identifiers included in the beacon which map to information. The mapping to information may be a direct mapping with an identifier included in the beacon corresponding directly to a corresponding piece of information which can be retrieved via a database lookup or through other techniques. Alternatively the identifiers of one or more beacons may be associated with a zone and the receipt of the beacons corresponding to a zone being used to determine the zone to which the received beacon or beacons correspond and then to obtain information which corresponds to the zone, e.g., from a database including a mapping of zones to information. which can be identified and accessed based on the identifier or identifiers included in the beacon. Thus, a transmitted beacon may include the information to be communicated or provide a receiving device a value or other identifier which can be used to retrieve information being communicated indirectly through a beacon to database look up or a beacon signal to zone mapping and than a zone to information mapping operation.

In some but not all embodiments, a beacon communicates a major id which maps to first information and a minor identifier which maps to second information where the information is known or accessible to a receiving device. A device receiving a beacon may recover the major and minor identifiers in a received beacon and then do a lookup in a previously stored or remotely accessible database to receiver the information being communicated by the beacon by doing lookup of the received identifier to the corresponding information.

While in some embodiments an individual beacons, e.g., transmitted using a beam of a BTLE (Blue Tooth Low Energy) base station directly communicates information, relevant to the particular geographic area to which the individual beam used to transmit the beacon corresponds, given that the beams are directional, they may cover an area extending over a long distance, e.g., 50 feet, 60 feet or more. For some embodiments such an area is larger than the area with which particular information is to be associated. In one particular embodiment, different beacons are transmitted on beams from different base stations. While each beam covers a relatively large area, the zone where multiple beams overlap may be far smaller than the total area of an individual beam.

By deploying multiple base stations with beam transmission capability, e.g. sectorized bases stations or base stations with steerable beams, an area such as an interior floor area or inside of a stadium can be covered with overlapping beacons transmitted using directional beams. The area can be divided for purposes of providing information into regions referred to herein as "zones". While the number of base stations may be relatively small, the number of zones can be relatively high given that each base station may transmit using a plurality of relatively small beams and given that beam overlap may be used to precisely determine location and/or define different zones.

In various embodiments each beacon communicates an identifier which can be used to identify the transmitting base station and beam which was used to transmit the beacon. A device receiving a beacon makes a received signal strength measurement and generates an RSSI (Received Signal Strength Indicator) value indicating the strength of the received beacon signal. A time stamp indicating the time of receipt of the beacon signal is also generated. The RSSI value, time stamp indicating time of receipt, and information indicating the content of the beacon signal, e.g., one or more identifiers, is communicated to a zone correlation engine. Similar information is generated for each received beacon signal. Thus, while a device is in area into which multiple beacons are transmitted from different base stations, a wireless terminal may receive, measure and time stamp a plurality of beacon signals received on beams corresponding to different base stations.

The beacon information, signal measurements and time stamps for the received beacon signals are communicated to a zone correlation engine that processes the received information and determines the location, e.g., zone, in which a wireless terminal is located at a particular time.

The zone correlation engine provides the zone information to an information server which determines if there are one or more virtual tags stored for the zone. The virtual tags may be offers or other information stored for the zone in which the wireless terminal is determined to be located in. The virtual tag may be configured based on a schedule with different offers and information being scheduled to be provided for a zone based on different times and/or days of the week, e.g., based on a sale schedule or items which will be available in the zone at a particular time/day of the week.

In some embodiments, while a device detecting a beacon provides the identifier(s) included in the beam to the zone correlation engine, what is returned is not the information to which the identifier(s) directly map to but rather the tag information for the zone in which the zone correlates determines the beacons indicate the wireless terminal is located. In such an embodiment, while the beacons correspond to the information for the zone, there is not a direct one to one mapping in some cases between the beacon content and the returned information with the information that is returned in some cases depending on the fact that multiple beacons were received by the wireless terminal and the returned information depending on the receipt of multiple beacons indicating a zone that is smaller than the area covered by a beam used to transmit an individual beacon.

By using a tag information data base to map zones to information to be returned to a device reporting the receipt of a set of beacons corresponding to a zone, the identifiers transmitted in the beacon can be left unchanged and used to identify the transmitting base station and beam while the returned information provided in response to beacon identifiers can be changed to reflect a schedule, sale, promotions and/or other time varying constraints.

Because the returned information, in some but not necessarily all embodiments, corresponds to a zone which is defined by the intersection of multiple beams from different base stations, the number and size of zones can be relatively small and precise will the number of base stations used to transmit the beams can be keep relatively low.

To facilitate a consistent pattern of zones, base stations maybe deployed in a grid pattern in a ceiling or at other uniform spacing's at a site, e.g., on each wall of a hall or arena.

Thus, in at least some embodiments, the access points which support multiple distinct beams corresponding to different areas of an environment are ceiling or wall mounted. This allows a single access point to cover multiple locations in a store or other environment with different distinct beams. While ceiling mounting is preferred in many cases since often provides a relatively unobstructed path to multiple locations as compared to a floor based transmitter, the methods and apparatus described herein are not limited to ceiling or wall mounted access points. While a single base station can be used in some embodiments, in many but not necessarily all embodiments, multiple base stations with beam capability are used.

Since the beams are used to provide geographic precision to facilitate location determination and to allow a longer range then might be achieved if an omni-directional antenna was used, in some embodiments a single transmitter, e.g., transmitter chain, is time shared between the different beams of a base station with transmission on a single beam occurring at a given time in some such embodiments. Such an approach allows for low cost base station implementations since a separate transmitter need not be provided for each sector/beam of the base station. In other embodiments a separate transmitter is provided for each sector/beam allowing multiple beams to be transmitted in parallel, e.g., at the same time, from a base station.

By using a single access point which can support multiple distinct beams, transmitting multiple beacons associated with different areas of a location is achieved in some embodiments. Thus, a single access point can replace the use of multiple individual beacon transmitters which might otherwise be required to cover the same number of distinct locations.

By using multiple ones of such access points in combination, relatively small zones can be defined with a low number of base stations being required.

The access points with beam forming capability which are used in various embodiments may be coupled to a backend server or other network device via a wireless connection or a wired connection. In some embodiments, the access point uses a power line connection for both power and a data connection to the server or other network device. The access points of the present invention may be, and sometimes are, located or incorporated into ceiling light fixtures and/or placed adjacent to such fixtures. Accordingly, it should be appreciated that the access points of the present invention can be installed in ceiling tiles or other ceiling fixtures and obtain power by connecting to existing power lines such as those already present in a ceiling for lighting purposes. Thus, in at least some embodiments, the access points of the present invention are not battery powered and thus maintenance and replacement costs associated with battery usage can be avoided.

Given that a single beam forming access point of the present invention can cover a plurality of distinct regions with different beams tailored in terms of content and/or shape to each of a plurality of individual regions, an access point of the present invention can be used in place of a number of individual beacon transmitters that might otherwise be required to cover the distinct regions in an environment which are to be supplied with beacons.

Once installed in an area, the access points can be controlled and/or configured in terms of the beams that are generated and/or the information transmitted using one or more beacons on an individual beam. Since beacons can be transmitted on a periodic or other recurring basis and need not be transmitted continuously, the number of transmitter circuits required to support the multiple beams can be, and in many embodiments is, lower than the number of beams which are supported. In such a case transmitter and/or receiver circuits are used on a time shared basis between multiple beams. Thus, the beam forming access point of the present invention can use fewer transmitter circuits than would be required if separate transmitters were used for each region covered by a beam.

Use of access points beams and/or beam coverage can be controlled via a network connection to an access point or via wireless signals received at the access point, e.g., from a handheld device used to signal a desire to have a beacon transmission coverage of a particular geographic area. Once beam coverage is configured, information associating beams of an individual known access point with particular locations, e.g., portions of a store, can be stored and used to determine information to be communicated using one or more beacons transmitted to a particular region. In other embodiments, the information transmitted on the beams remains fixed and information in a data base which is accessed in response to detection of one or more beacons is updated to reflect information to be supplied in response to a device being located in a zone corresponding to the one or more detected beacons.

For example, information associating different beams of an access point or set of beams from a plurality of different access points which can be used to indicate a location, may be stored and known to correspond to particular product displays in a store. Information associating a particular access point beam or the intersection of beams from different access points, with a particular store display may be stored in a server along with corresponding information about one or more products on display at a given time. The access point can be signaled via the network connection to the server to transmit a beacon communicating information about the product currently on display at the location covered by the beacon. When the product on display is changed and/or a current promotion for the product changes and/or a new promotion emerges, the beacon may be changed via the network without having to physically visit or access the access point used to transmit the beacon or, in embodiments where the beacons are left unchanged the information in the database used to supply information corresponding to a zone may be updated so that when beacons corresponding to the zone are detected, the current information is supplied to the wireless device in the zone reporting the detection of the corresponding beacons Thus, management of beacons corresponding to particular areas they serve can be easily managed from a remote location and, in cases of national or other store chains, can be remotely configured to broadcast information corresponding to weekly specials or other specials consistent with marketing and the product which will be displayed at the location known to correspond to a particular access point beam. For example, product displays at the ends of different store isles used to showcase weekly specials in a grocery store may correspond to different beams. With knowledge of the product to be displayed at the end of each isle and the weekly promotion planned, a schedule can be developed so that beacons communicating the specials corresponding to the product on display at the end of the isle at a given time will be broadcast via the access point beam covering the individual end of isle display with the corresponding product.

Various configuration techniques can be used to control the coverage area of beams which may be used to transmit beacons into an environment where an access point is positioned. A wide range of beam forming techniques may be used by access points for purposes of generating beams which can be used to transmit beacons. For example switched beam forming where switching between fixed antennas occurs can be used, analog or digital beam forming can also be used. In various embodiments a combination of beam forming techniques can and are used.

It should be appreciated that once a beam of an access point is known to correspond to a particular region, this information can be used as part of determining what information should be communicated over a beacon transmitted on a particular beam.

Determining what regions should be covered by access point beams and/or determining which beams of an access point cover a particular region of an environment is an important management issue that can be, and depending on the embodiment is, addressed using one or more different approaches.

In one embodiment, configuration involves use of information about the location of an access point in an environment and the transmitter capabilities of the access point. From this information it is possible to determine what regions in an environment correspond to individual beams which may be generated by an access point located in the environment. In order to facilitate determination of the coverage area of beams of an access point, in one embodiment the access points include a compass and/or range detection device. The compass determines the orientation (e.g., relative North, South, East, West orientation) of the access point after installation. The range detection device included in the access point measures the height from the floor. Using the height from the floor, the orientation of the access point and information about the general location in the ceiling of an area which may be readily determined at time of installation via a measurement or count of ceiling tiles used to determine the access points location relative to one or more walls, the coverage area of the beams which can be, and sometimes are, calculated. Measurements of signals transmitted by an access point detected by other access points in the area can, and in some embodiments are, used to determine relative spacing between access points based on path loss measurements based on the strength of one or more received signals at neighboring access points. While not critical, in some embodiments the access points are mounted in an array pattern with each access point being oriented in the same direction. The access point spacing may be relatively uniform facilitating uniform coverage of an area.

In one embodiment, access point beam configuration for transmission purposes is determined without an administrator having to be physically present in the environment to indicate the region into which a beacon should be transmitted. In one such embodiment, an administrator, who maybe a store manager, marketing director and/or other user of the system can display a floor plan of the area into which one or more beacons are to be transmitted. The user can then simply mark on the floor plan, e.g., by touching a location on the screen corresponding to the desired location of a beacon or by clicking on the area using a mouse, to indicate the desire to transmit a beacon at the indicated location. The user can assign a name to the beacon to be transmitted and either at the time of designating the beacon or at a later time indicate the information to be communicated using the beacon. For example, a user may click or touch a displayed location corresponding to a tie rack to indicate a beacon is to be transmitted covering the indicated location, name the beacon, e.g., assignee the name tie rack to the beacon, and then associate information to be communicated by the beacon to be transmitted, e.g., "Special 3 ties for $10". The user can also indicate a schedule on which the beacon is to be transmitted, e.g., weekdays but not weekends or on some schedule corresponding to a planned sale. A user may do this for multiple different locations in a store or other environment from a location at the store or remotely. Thus, configuration of beacons and information to be communicated to the beacons can be performed from a corporate headquarters or other location.

Rather than alter the transmission of beacons, the marking of a location on a floor plan is used to indicate a desired zone location. The beacons which are transmitted into the zone may but need not be altered. Information is stored in a database which is to be provided to a user when a user device, e.g., wireless terminal, reports beacon signals indicating that the user device is in the designated zone. The information to be provided when a device is detected to be present in a zone, e.g., based on reported RSSI information corresponding to received beacon signals, may be referred to as a TAG. By associating different tags with different zones, it is possible to control the information that will be supplied to a wireless terminal without having to alter the content of the beacon signals which are transmitted. In addition, since a zone may be defined in terms of the intersection of the coverage area of multiple beacon signals, or based on the location of the zone to one or more beacon transmitters, a zone maybe smaller than the coverage area of an individual beacon signal transmission or beam. The TAG information to be provided may be advertising or offer information for an item available in the zone. By designating Zones and associating tags with zones, offers and information may be changed by simply updating a tag database without the need to changing the beacon transmissions. However, in cases where beacons may not already be transmitted into an area corresponding to a zone, as part of configuring a Zone, one or more base stations maybe, and sometimes are, configured to transmit beacons into the zone to facilitate the ability to use detected beacons to determine the presence in the zone.

Based on beacon coverage area information, the server, e.g., system configuring beacon transmissions from one or more access points, determines which access point beam or beams corresponds to the user indicated desired beam location and associates the beam or beams with the beacon to be transmitted. The beacon will then be transmitted on the associated beam in accordance with the user configured transmission schedule or on a predetermined schedule. In this way beacon management can be done remotely without the need for the party configuring the beacon transmissions to walk through the store and indicate while at the store what beacons are to be transmitted or where the beacons are to be transmitted.

While access points may have beams which can cover all or the majority of a store, in at least some cases signals will not be transmitted into regions where beacons, e.g., used for advertising sale items and/or site specific offers, are not used to transmit signals when a user has not designated or specified that a beacon should be associated with the corresponding area of the store or other environment. However, in many cases beacons will be transmitted into all or most of the area to be covered allowing for detection of devices in zones whether or not tags with information to be provided are associated with an individual zone.

In addition to user devices detecting beacon transmissions, base stations, e.g., Access Points (APs) can monitor and report the detection of signals from wireless terminals. In this way, for purposes of detecting the presence of a wireless terminal in a zone, signals from wireless terminals can be used in addition to RSSI information relating to signals detected by wireless terminals.

While beacons may not be transmitted into all regions of an environment into which transmission are possible in some embodiments, APs monitor for signals form users and report detection of signals to a server or other central processing site. This allows movement of one or more individuals with a wireless device to be tracked as they move through a store or other environment. The path of the individual can be useful in determining special offers to present to the user via wireless signals and/or for determining future configuration of a store or other site.

While beacons, e.g., real or virtual beacons, may be designated on a floor plan by a user, in other embodiment a user such as a manager walks or otherwise moves through the store or other site with a mobile wireless device capable of transmitting signals to the one or more access points and also being capable of receiving signals from the access points. If an access point is available to transmit into the area on the floor plan designated to be covered by a beacon, the access point which can transmit into the area maybe, and in some embodiments is, configured to transmit a beacon into the designated region. Alternatively a virtual beacon maybe configured to cover the area. For example if a access point is not available to transmit into the region virtual beacon transmitter information can be configured in a database and a wireless terminal or network device will determine, using the stored virtual beacon transmitter information and a device's location, when a device or element, e.g., application in a device, is to be notified that the device received a beacon even though no beacon was actually received. In this way the report of the received beacon is of a "virtual" beacon but the device or element can act on the notification of receipt of a beacon signal as if an actual beacon signal was received.

The user, while in the environment to be covered by a beacon signal, positions a user device at a location to be covered by a beacon. Then selects a set beacon option on the mobile device. The mobile device then transmits a signal which is received by one or more access points in the vicinity, e.g., via antenna elements corresponding to different beams. The receiving access point(s) process signal strength measurements from each beam, creates a probability surface and then combines those surfaces to determine the devices location. Alternatively, signal strength measurements are reported back to a server and then the server decides which beam has the best coverage of the area from which the signal used to indicate a desired beacon location was transmitted. In addition to indicating a desire to have a beacon transmitted in the region from which the beacon location designation signal was transmitted, the signal transmitted to the access point or points may indicate a name to be used for the beacon associated with the beacon location. For example when signaling that a beacon should be added to cover a region corresponding to a tie stand, the user sending, from the location of the tie stand, the request to add a beacon may enter the phrase "tie rack" to be associated with the location into which the beacon is to be transmitted. The user can also signal to the access point sale and/or other information to be communicated by the use of a beacon and/or the time period in which the beacon should be transmitted. Alternatively, such information can be associated with the beacon at a later time. The access point communicates to the beacon server the received request to create a beacon along with information identifying the beam on which the beacon is to be transmitted and/or received signal strength information corresponding to different beams on which the request was received thereby providing the server information sufficient to determine which beam should be used for the requested beacon. The server stores the beacon and corresponding beam information in a database which can be accessed and updated by a user. For example, the user can associate sale information to be communicated via a beacon for a sale associated with the tie rack corresponding to the location of the new beacon.

By moving through a store and/or other environment, and signaling places where beacons are to be transmitted or a zone is to be placed, the user can associate beacons with particular locations without having a detailed map of the store and/or without knowing before hand how individual access point beams correspond to different areas of the environment. While the process of indicating where beacons are to be transmitted or where zones are to be defined within a geographic area may be similar in some ways to a manager going through a location and placing beacon transmitters at different places within the environment, the requirement that beacon transmitters be placed at individual locations is avoided along with the associates costs of maintaining large numbers of individual beacon transmitters that are distributed throughout a store, e.g., at ground level or on display racks.

It should be appreciated that the different methods of designating beacon and/or zone placement and coverage may be combined with some beacons/zones being signaled via indications made on a floor plan and other beacons/zones being designated as a manager walks through a store and indicates places to be covered by a beacon or where a zone is to be defined. A zone definition may be achieved by reporting back beacons detected at the zone in which case in the future receipt of the same beacons may indicate that a wireless terminal is in the zone defined as part of the configuration process.

Significantly, multimode cell phones with beacon transmission capability or which can otherwise interact with the access points can be used to signal the desired location of beacon coverage/zones and related information to be associated with an individual beacon transmissions or set of overlapping beacon transmissions.

Customer's and/or other individuals walking through the environment will receive the beacons and be able to recover the information that is communicated using the beacons or which corresponds to a set of received beacons, e.g., after reporting receipt of the beacons, time of receipt and received signal strength measurements to a zone correlation engine or other device capable of mapping received beacons to zones with which information to be provided is associated. The information maybe included directly in the beacon in some cases or may be recovered through a database lookup or from broadcast information which can be used to map a value or other identifier received in a beacon to information which is to be communicated through use of the beacon. Thus beacons can be used to communicate advertisements and/or other information directly or indirectly depending on the transmission standard and/or beacon protocol being used.

Figure 2:
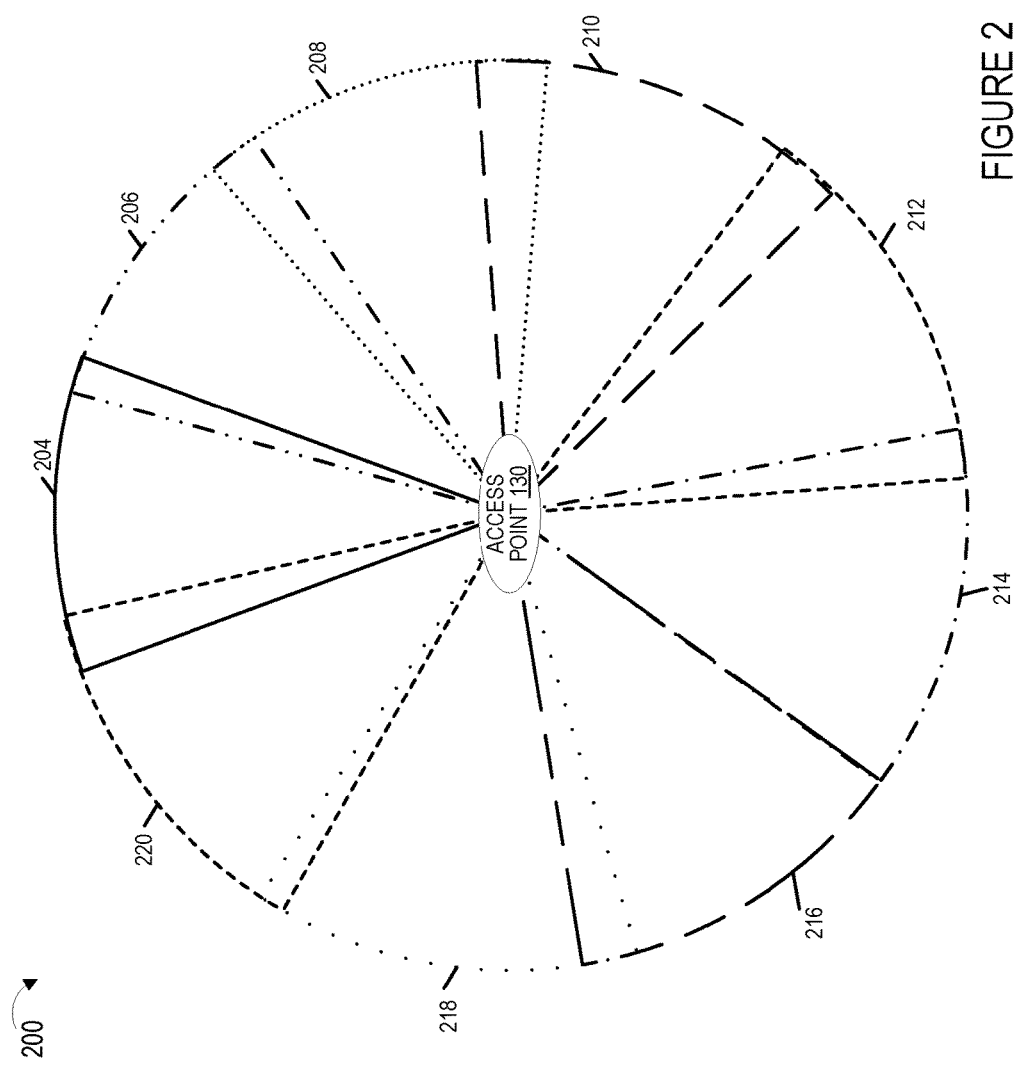
FIG. 2 illustrates exemplary antenna patterns that may be used by an access point to transmit a plurality of different beacons using directed beams which cover different corresponding areas.

FIG. 2 is a drawing 200 illustrating an exemplary access point with multiple antenna patterns, e.g., a pattern with multiple beams, that may be selectively used by an access point (AP), e.g., AP 130. The pattern shows the coverage area of the access point 130 if all the beams are used. Other antenna patterns are possible and in many cases may include lobes of different sizes or areas of significant attenuation.

The beams may be individually used to transmit different beacons into the coverage areas corresponding to the beams. In some embodiments the access point 130 has beam forming capability, e.g., a beam forming antenna assembly, which can radiate beacon signals using one or more beams. Each of the wedges 204, 206, 208, 210, 212, 214, 216, 218 and 220 shows a corresponding coverage area of a beam that may be transmitted by the access point 130 to communicate beacons communicating information, e.g., advertisements. Each of the coverage areas 204, 206, 208, 210, 212, 214, 216, 218 and 220 may correspond to an area of a site of interest, e.g., a store, mall, food court etc. In accordance with the features of the present invention the access point may, and in some embodiments does, transmit beacons communicating promotional advertisements and/or other marketing information relevant to a given area of a site/store, using directed beams which cover these store areas and enable devices within the coverage area of the beam to receive the beacons.

While beacons may be transmitted using the beams, the AP can also receive signals using the beams. Based on received signal energy and/or signal to noise ratio (SNR) the AP 130 and/or a server, e.g., beacon service server 120, receiving signal information from the AP can determine the region from which a received signal was transmitted, e.g., with the region being the one from which the strongest signal was received.

Figure 3:
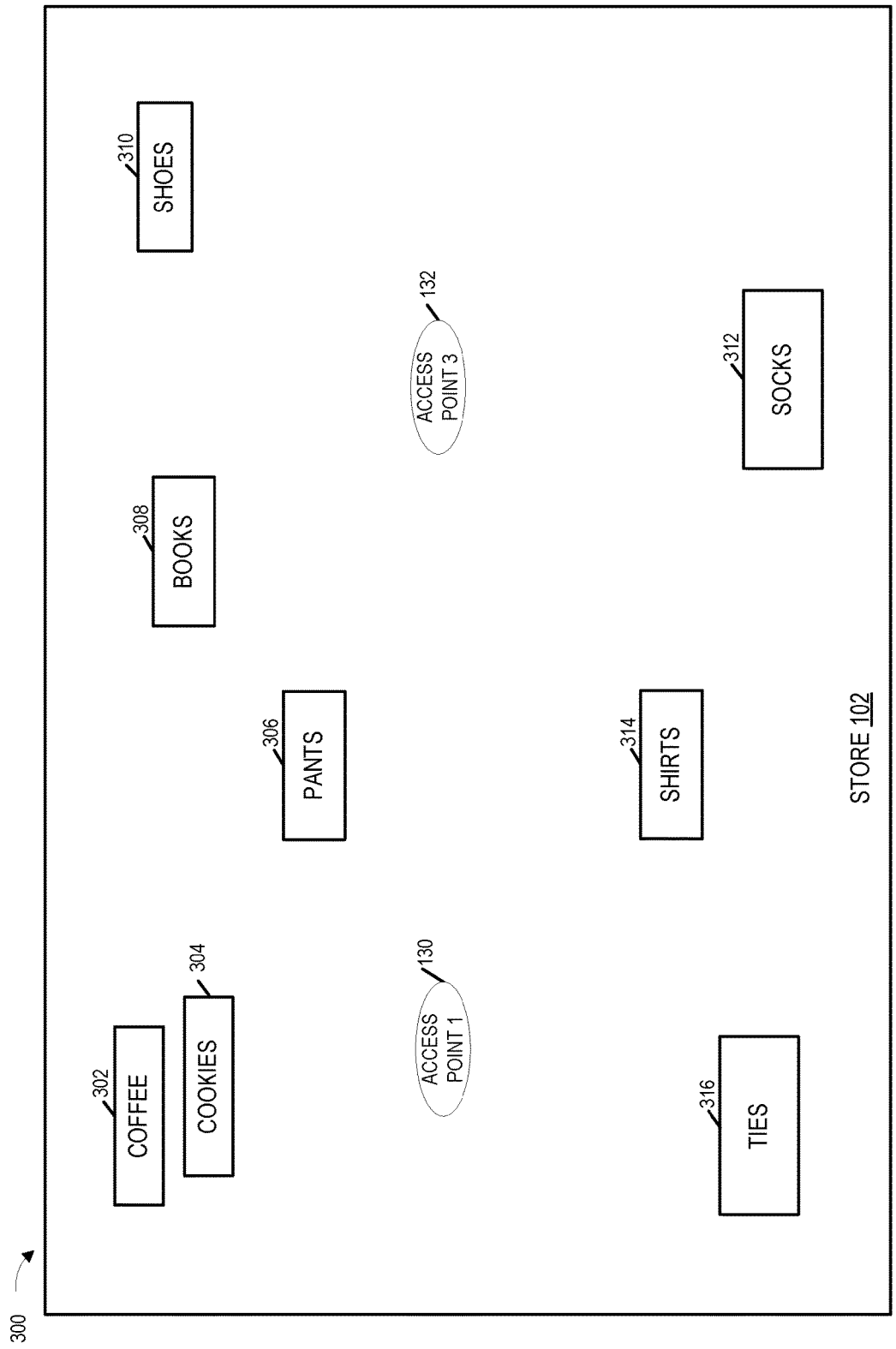
FIG. 3 illustrates an exemplary floor plan of an exemplary site, e.g., store, including a plurality of different store areas/sections, in accordance with an exemplary embodiment.

FIG. 3 is a drawing 300 illustrating an exemplary floor plan of an exemplary site, e.g., store 102, including a plurality of different store areas/sections, in accordance with an exemplary embodiment. As can be seen in the floor plan of FIG. 3, the store 102 includes various areas that may be dedicated to a given category of merchandise/item. Near the top left corner in the floor plan there is an area/section with a COFFEE stand 302 and an adjacent a COOKIES stand 304 which may be operated together or separately in close proximity in the store 102. More towards the upper central portion there is a store area/section corresponding to PANTS 306, another area corresponding to BOOKS 308 and another for SHOES section 310. On the other opposite side in the floor plan there is a store area/section corresponding to TIES 316, another section corresponding to SHIRTS 314 and then another store area/section corresponding to SOCKS 312. As can be appreciated, each of the areas with different merchandise/items is physically separated thus forming different dedicated areas in the illustrated embodiment. While one such floor plan is shown as an example it should be appreciated that a variety of different floor plans or variation in the arrangement are possible. In some embodiments some related items may be grouped together in a single area. For example, in some embodiments shoes and socks may be grouped together and be given a single dedicated area.

Also shown in FIG. 3 floor plan is the location of access points 130, 132, which may be mounted on a ceiling or a wall or may be simply placed on another structure. In accordance with the features of some embodiments the different store areas/sections of the store may be provided different beacons via beams communicated by the access points 130, 132. The APs 130, 132 may use a directed beam covering a corresponding region to transmit one or more beacons communicating advertisement and/or other information, to one or more devices in the area covered by the beam.

Figure 4:
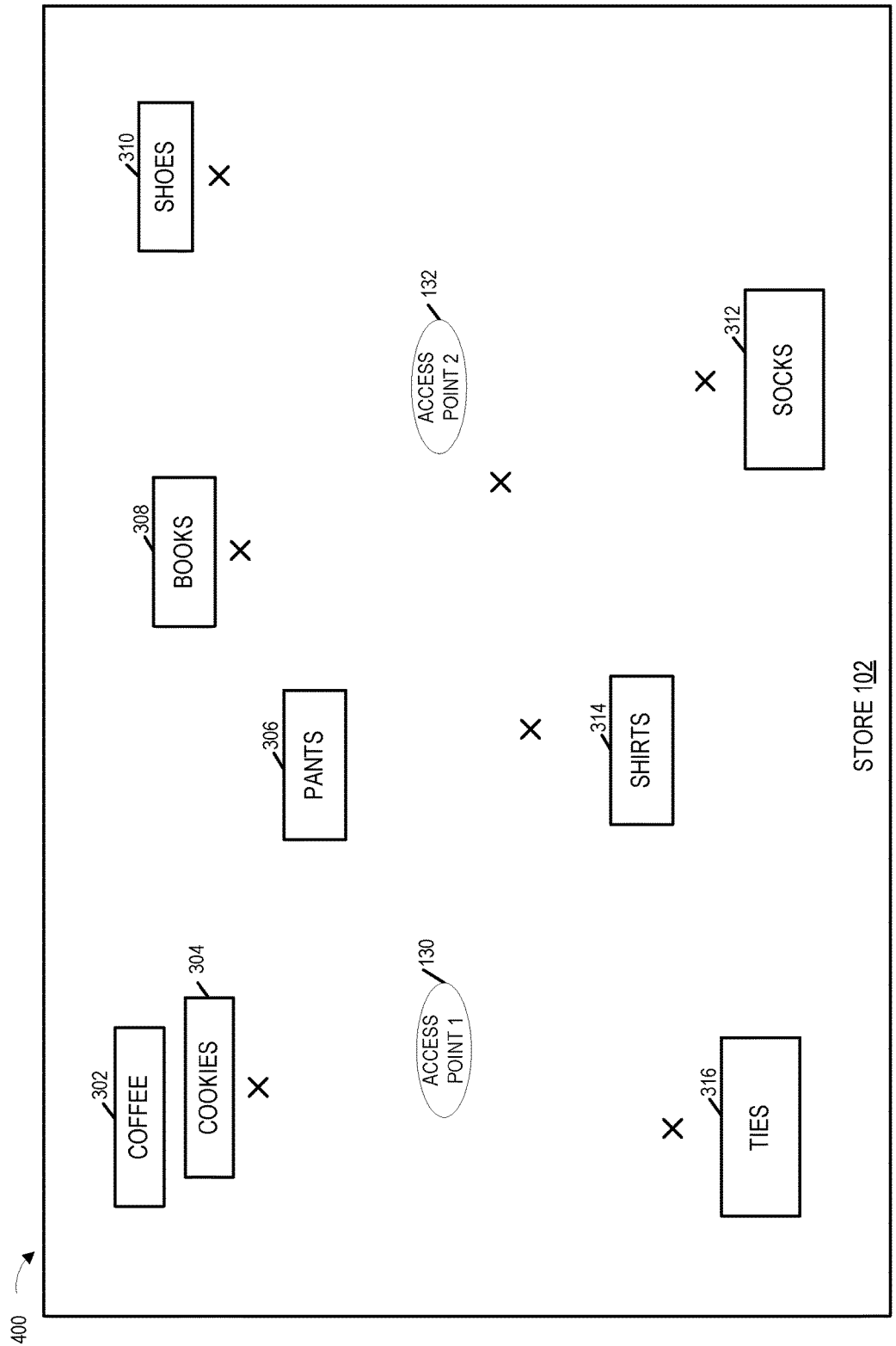
FIG. 4 illustrates various different merchandise sections of the exemplary store that have been tagged, e.g., by an administrator/manager, for receiving beacons, in accordance with an exemplary embodiment.

FIG. 4 is a drawing 400 illustrating various different merchandise sections of the exemplary store 130 that have been tagged (indicated by the "X" mark in the figure), e.g., by an administrator/manager, for receiving beacons in accordance with an exemplary embodiment. In some embodiments the tagging operation is performed by an administrator/manager by selecting the different merchandise locations using a user device that displays a visual representation of the floor plan. For example a user device, e.g., desktop, laptop, smart phone, and/or a tablet device, that stores or has access to the floor plan, is used by the administrator/manager to view a visual representation of the floor plan, e.g., the floor plan illustrated in FIG. 3. In accordance with the features of some embodiments the administrator/manager can select one or more store areas which are to be provided beacons communicating promotion offers and/or other desired information. The selection may be performed in some embodiments by, e.g., tapping on the particular location on the displayed floor plan in an embodiment that support a touch screen device and/or by simply selecting the location from a drop down menu and/or by pointing and clicking on a location using a mouse. Thus it should be appreciated that the selection may be made in a variety of ways. In various embodiments the selection information as well information to be communicated by the beacons, e.g., promotions/advertisements, is communicated from the user device on which the selection is made to the access points 130, 132 which uses the information to generate and transmit beams corresponding to the selected areas. The access points 130, 132 further uses the received information to select and/or generate information to be communicated in the beacons communicated via the beams. The administrator need not be present at the actual store site in order to tag the areas for receiving beacons and the tagging selection can be done remotely, e.g., from an head office corresponding to the store or retail chain. Alternatively in some embodiments the selection information and beacon information is communicated from the user device operated by the administrator to the beacon service server 120 which in turn uses the received information to control and/or configure the access points to generate and transmit beams corresponding to the selected areas.

In some other embodiments, information associating different beams of the access points 130, 132 is stored, e.g., in the device used by the administrator and/or at the beacon service server 120, and known to correspond to particular areas in the store. Information associating a particular access point beam with a particular store area, e.g., area corresponding to the BOOKS stand 308, may be stored in the user device used by the administrator and/or at the beacon service server 120 along with corresponding information about one or more products/items in that area on display at a given time. Thus in some embodiments APs are configured using information about the location of the APs in an environment, e.g., store 102, and the transmitter capabilities of the APs. In such embodiments it is determined what regions/areas in the store correspond to individual beams which may be generated by the access points located at the store. Based on this information that maps regions/store areas to corresponding beams, the administrator device and/or the beacons service server 120, determines which access point beam or beams corresponds to the selected regions/areas on the floor plan and associates the beam or beams with the beacon to be transmitted. In some such embodiments the access points can simply be signaled via a network connection to the user device and/or the beacon service server 120 to transmit a beacon communicating information about the product currently on display at the location covered by the beacon. In some such embodiments when the product on display is changed and/or a current promotion for the product changes and/or a new promotion emerges, the beacon information may be changed via the network without the administer having to physically visit or access the access points used to transmit the beacons. Thus in some embodiments the access points can be configured to transmit beacons corresponding to merchandise displayed at one or more locations in the store which are known to correspond to respective particular beams transmitted by the access points.

After the selection/tagging of area has been completed, the access points can transmit beams covering the selected areas at a desired time which may be indicated by the administrator and/or based on a stored schedule.

In some embodiments the information that may be communicated by the beacons include promotions, advertisements, special sales offers, menu items, newly added items, wait times at a location, specific announcement relating to an item or location, change in opening and/or closing time, store closing announcements etc.

Figure 5:
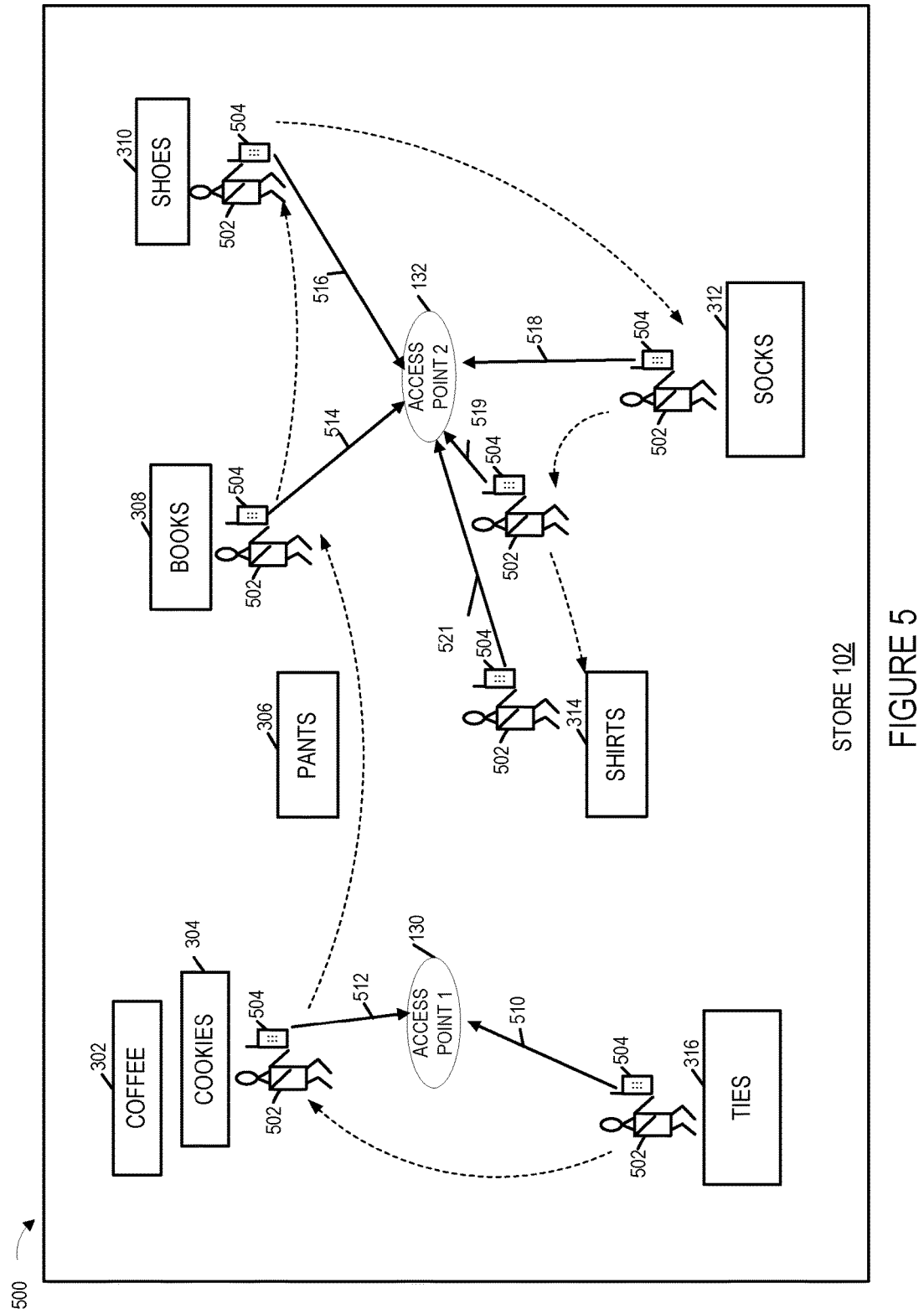
FIG. 5 illustrates another embodiment where various different merchandise sections of the exemplary store are tagged, e.g., by an administrator/manager by sending signals, using a mobile communications device, which trigger sending of beacons to the corresponding sections, in accordance with an exemplary embodiment.

FIG. 5 is a drawing 500 illustrating another embodiment where various different merchandise sections of the exemplary store are designated to be zones, e.g., by an administrator/manager walking through the store and signaling where a zone is to be located. In one embodiment the manager sends a signal, using a mobile communications device, which indicates to a server that the area from which the signal is sent should be designated as a zone. A tag may then be associated with the zone. In one embodiment the zone indicator signal triggers sending of one or more beacons to the corresponding zone via one or more direction beams. In another embodiment, the zone is defined based on which beacon or beacons should be received at the location and, in some embodiments, the expected strength of the received signals. In the case where a manager is present and signals that a zone should be placed at a particular location, the manager's device may measure and report on the beacon signals received at the zone and the received signal strength, e.g., received measured beacon signal power level for beacons received at the zone location. This information can be used in defining the zone but the signals may be predicted in cases where signal measurements are not made at the zone site.

In the illustrated embodiment shown in drawing 500 of FIG. 5 an administrator/manager simply walks through the various sections of the store where different merchandise is placed for display or where a zone is to be designated for some reason. At the locations where the administrator desires a zone to be located, the administrator can simply uses his device, e.g., cell phone, tablet or other device, to send a zone designation signal to the access points 130, 132 which then communicate the request to a control device. In some embodiments the access points receiving the zone request signal determines the region/location from which the signal was transmitted and which transmit beam covers that corresponding area. In some embodiments there is a one to one mapping between transmit beam coverage areas and receiver beam coverage areas so that a base station can readily determine which transmit beam corresponds to a zone based on which beam the zone request signal was received.

In other embodiments rather that having to visit the physical site at which zones are to be located, the zone definition/tagging operation is performed by an administrator/manager by selecting the different locations at which zones are to be placed using a user device that displays a visual representation of the floor plan. For example a user device, e.g., desktop, laptop, smart phone, and/or a tablet device, that stores or has access to the floor plan, is used by the administrator/manager to view a visual representation of the floor plan, e.g., the floor plan illustrated in FIG. 3. In accordance with the features of some embodiments the administrator/manager can select one or more store areas which are to be designated as zones for communicating promotion offers and/or other desired information. The selection may be performed in some embodiments by, e.g., tapping on the particular location on the displayed floor plan in an embodiment that support a touch screen device and/or by simply selecting the location from a drop down menu and/or by pointing and clicking on a location using a mouse. A user may indicate the size of the zone by making a circle around the designated zone location or through other input such as spreading of fingers in contact with a touch sensitive screen being used to indicate the location of a zone. Thus it should be appreciated that the selection may be made in a variety of ways. In various embodiments the selection information as well information to be communicated for the zone, e.g., promotions/advertisements, is communicated to a zone management server or other device. The zone designation information can be used to control access point transmission of beacons into the zone and/or monitoring for the presence of a wireless terminal in the zone as may be determined by a zone correlation engine. The administrator need not be present at the actual store site in order to designate zones or specify tag information to be provided when presence of a device in the zone is detected or which is to be communicated via the use of one or more beacons transmitted into the zone.

Figure 6:
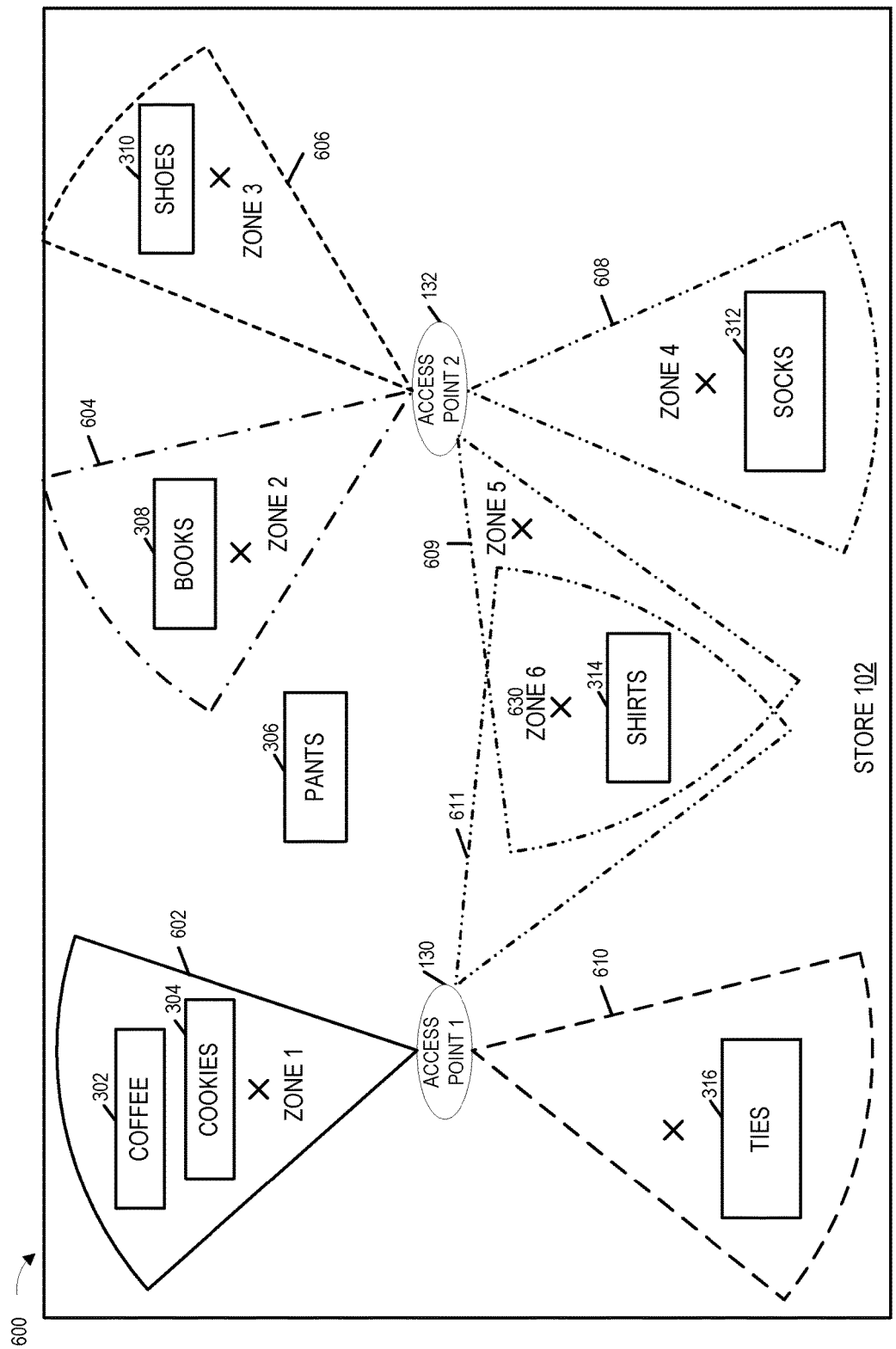
FIG. 6 is a drawing illustrating different exemplary beams coverage areas corresponding to different beams directed to the different merchandise sections of the store which were tagged.

FIG. 6 is a drawing illustrating different exemplary beams coverage areas corresponding to different beams directed to the different merchandise sections of the store which were tagged. As can be seen various zones have been designated. Zone 6 corresponds to the overlapping area corresponding to beams 609, 611 of the first and second access points 130, 132 while other zones correspond to coverage areas associated with an individual beam. Receipt of a beacon may be used by a wireless terminal or correlation engine to determine that the wireless terminal is in the coverage area of a particular beam. Signal strength may be further considered and used to determine if the wireless terminal is within a zone covered by a beam when the zone is smaller than the full beam coverage area. When a zone is covered by multiple beams, beacons received on the different beams and their corresponding signal strength than be used to determine presence of a wireless terminal in a zone covered by the different beams. For example, presence in zone 6 may be determined based on beacon signals received in beams 611, 609 and their signal strength. While receipt of signals via beams 611, 609 may indicate presence in zone 6, detection of a relatively strong beacon signal via beam 609 and a very weak beacon or no beacon received via beam 611 will tend to indicate presence in zone 5.

As will be discussed below, the zone correlation engine used in various embodiments uses reports of received beacons and the received signal strength of the beacons to detected the presence of a wireless device in a zone and to trigger providing of tag information corresponding to the zone to the wireless terminal determined to be in the zone.

Figure 7:
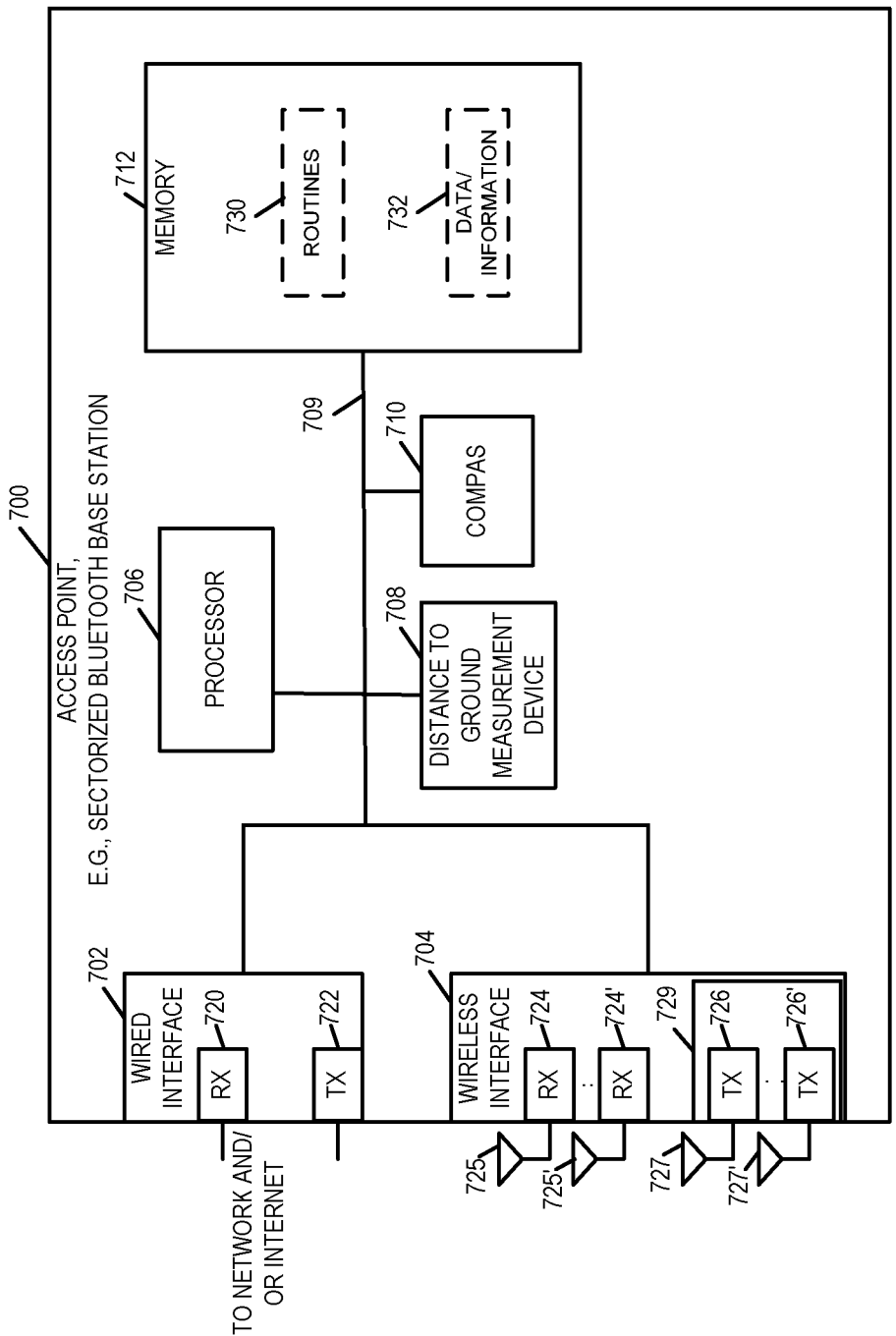
FIG. 7 illustrates an exemplary access point, e.g., sectorized Bluetooth base station, capable of transmitting beacons in accordance with various embodiments of the invention.

FIG. 7 illustrates an exemplary access point 700, e.g., base station, capable of transmitting beacons on a plurality of different beams in accordance with various embodiments of the invention.

The base station maybe, and in some embodiments is, a sectroized Bluetooth base station including a plurality of sectors, e.g., three, six or even more sectors depending on the embodiment. The wireless interface 704 includes a receiver 724 or 724' and transmitter 726 or 726' for each sector. The base station antenna maybe formed from elements corresponding to different sectors of the base station and thus in some embodiments is sectorized with different receive (725, 725') and transmit elements (727 or 727') of the sectorized antenna being provided for each sector. For example, receive sector antenna element 725 and transmit sector antenna element 727 may correspond to a first sector while receive sector antenna element 725 and transmit antenna element 727' may correspond to an Nth sector of the multi-sector base station with the combination of sector elements forming the sectorized antenna. The sector antenna elements 725, 725', 727, 727' may be mounted on the base station or remote from the base station and oriented so that different sectors correspond to different geographic coverage regions.

In some embodiments base station 700 is a Bluetooth base station comprising a transmitter 729 in the form of the set of transmitter elements 726, 726' which can be used to transmit into a plurality of sectors of the base station. The base station 700 includes a plurality of sector antenna elements 727, 727; and at least one processor 706 configured to control the transmitter 704 and transmitter elements 726, 726' included therein to communicate different information into different geographic areas, corresponding to different sectors of the sectorized base station 700, by transmitting different Bluetooth Low Energy (BLE) beacons on different transmission beams of said Bluetooth base station, said different beams corresponding to different sets of sector antenna elements, e.g., a first set including element 726 and a second set including element 726' but not element 726; and memory 712 coupled to said at least one processor 706.

In some embodiments the base station 700 is an access point that includes a transmitter 729 at least one processor 706 configured to control said transmitter 729 to transmit different beacons using a first plurality of transmission beams corresponding to a first set of different coverage areas, e.g., corresponding to different sectors, where the processor 706 is configured transmit a first set of beacons into a first coverage area corresponding to a first beam communicating information relevant to a zone in the first coverage area or mapping to information relevant to the zone in the first coverage area, as part of being configured to transmit said different beacons; and memory 712 coupled to said at least one processor 706.

The base station maybe, and in some embodiments is a ceiling or wall mounted device and, in some embodiments includes a compass 710 and distance to ground measurement device 706 which can be used to determine the orientation of the access point and height from the ground when deployed. This information is measured and automatically reported to a management server which can then predict the coverage area of beams transmitted by the access point 700.

The access point 700 includes a processor 706 and memory 712 coupled together via a bus 709 over which the various elements may interchange data and information. Memory 712 includes routines 730 and data/information 732. The access point 700 further includes a wired interface 702, a wireless interface 704 in addition to the compass 710 and distance to ground measurement device 706.

Via the wired interface 702 the access point 700 can be coupled to the communications network, external device and/or internet. The interface 702 in some embodiments includes receiver 720 and a transmitter 722. The wired interface 702 is capable of transmitting/receiving information over a wired link. In some embodiments the wired 702 is coupled to other nodes and/or a backhaul via a communications link. In some such embodiments via the interface 702 the access point 700 transmits/receives information to/from the network nodes such as the configuration server 120/1000. The access point 700 further includes a wireless interface 704 via which the access point 700 communicates with wireless devices. The wireless interface 704 includes a wireless receiver module 724 coupled to receive antenna 725, via which the access point 700 receives radio signals. The radio signals include, e.g., signals from one or more wireless terminals or other wireless devices. The wireless interface 704 further includes a wireless transmitter 726 coupled to transmit antenna 727 via which the device 700 transmits radio signals. The transmitted radio signals include beacon signals. In some embodiments, the same antenna is used for both input and output wireless communications signaling.

In some embodiments the access point 700 is a ceiling or wall mounted device and includes the compass 710 which is configured to determine the orientation of the access point or access point sectors relative to the magnetic north. The ground measurement device 706 is configured to determine the height of the access point from the ground once the access point 700 is deployed.

The processor 706 in various embodiments is configured to control the access point 700 to implement the methods of the present invention, e.g., method of flowchart 1800.

In one embodiment the access point is configured to receive, e.g., via the receiver 724 or receiver 720, a first zone configuration control signal from a control device at a first location within the coverage area of the access point, the first zone configuration control signal indicating a desire to designate an area from which the control signal was transmitted, as the first zone. The access point is further configured to receive, e.g., via the receiver 724, information from the control device indicating first beacon content to be communicated using the beacon signal to be transmitted using the beam covering the first location. In some embodiments the access point 700 is further configured to receive, e.g., via the receiver 724, information from the control device indicating a transmission schedule to be used to control transmission of the first beacon content to be communicated using the beacon signal to be transmitted using the beam covering the first location. In some embodiments the access point 700 is configured to receive, e.g., via the receiver 724, beacon information indicating a first beacon signal to be transmitted into the first area using the first beam, and a time period or schedule used to control transmission of the first beacon signal from the first access point. In some embodiments the processor 706 is configured to forward, e.g., via the interface 702, at least some information relating to the first zone and/or first beacon signal discussed above to a configuration server, e.g., such as the configuration server 120/1000.

In some embodiments the access point 700 is further configured to receive, e.g., via the receiver 724, a second zone configuration control signal from the control device while the control device is located at a second location within the coverage area of the first access point, the second zone configuration signal indicating a desire to designate a second area as a second zone. In some embodiments the access point 700 is further configured to receive, e.g., via the receiver 724, information from the control device indicating second beacon content to be communicated using a second beacon signal to be transmitted using the beam covering the second location and information indicating transmission schedule to be used to control transmission of the second beacon to be communicated using the beacon signal to be transmitted using the second beam covering the second location. In some embodiments the processor 706 is further configured to forward, e.g., via the interface 702, at least some information relating to the second zone and/or second beacon signal discussed above to a configuration server, e.g., such as the configuration server 120/1000.

In some embodiments the access point 700 is configured to receive, e.g., via the receiver 724 or 720, a user input identifying an area on a floor plan to be designated as the first zone. In some embodiments the processor 706 is further configured to control the access point 700 to store (e.g., in memory 712 along with data/information 732) information identifying one or more beacon signals transmitted on beams covering the first zone. In some embodiments the processor 706 is further configured to forward, e.g., via the interface 702, information identifying the area on the floor plan to be designated as the first zone and information identifying one or more beacon signals transmitted on beams covering the first zone at to the configuration server 120/1000.

In some embodiments the access point 700 is configured to receive, e.g., via the receiver 720, access point configuration information from a network device, e.g., such as the configuration server 120/1000. As part of receiving the access point configuration information the access point 700 is configured to receive, e.g., via the receiver 720, first access point configuration information from the network device, the access point configuration information providing first antenna pattern configuration information specifying a first beam forming pattern to be used to generate the first beam, the first beam forming pattern indicating antenna elements to be used to transmit signals corresponding to the first beam. In some embodiments the beam forming pattern information further indicates antenna beam gains to be applied to signals transmitted on at least some of the antenna elements corresponding to the first beam. In some embodiments the access point 700 is further configured to receive, e.g., via the receiver 720, additional first access point configuration information from the network device, the additional first access point configuration information providing second antenna pattern configuration information specifying a second beam forming pattern to be used to generate the second beam, the second beam forming pattern indicating antenna elements to be used to transmit signals corresponding to the second beam.

In various embodiments the processor 706 is configured to control the access point to configure one or more beacon transmission beams, e.g., in accordance with the received configuration information and beacon information. The processor 706 in some embodiments is configured to control the access point to configure the first beam to cover the geographic area including the first location and to configure the second beam to cover the geographic area including the second location. In various embodiments the processor 706 is further configured to control the access point to transmit, e.g., via transmitter 726, different beacons, using a first plurality of transmission beams corresponding to a first set of different coverage areas. As part of controlling transmission of different beacons, using a first plurality of transmission beams corresponding to a first set of different coverage areas the processor 706 is further configured to control the access point to transmit, via transmitter 726, a first set of beacons into a first coverage area corresponding to a first beam communicating information relevant to a first zone which is at least partially in the first coverage area or mapping to information relevant to the first zone area. In some embodiments the processor 706 is further configured to control the access point to transmit, via the transmitter 726, information corresponding to the beacon using at least two antenna elements, transmissions from the at least two antenna elements combining in a pattern which forms the first beam, as part of transmitting first set of beacons into a first coverage area. In some embodiments the processor 706 is further configured to control the access point to transmit, via the transmitter 726, a second set of beacons into a second coverage area corresponding to a second transmission beam, the first and second coverage areas being different, the second set of beacons communicating information relevant to a zone in the second coverage area or mapping to information relevant to the zone in the second coverage area. In some embodiments the access point is configured to receive, e.g., via the receiver 724 or receiver 720, beacon information, the beacon information indicating a first beacon signal to be transmitted into the first area using the first beam. In some embodiments the beacon information further indicates a time period or schedule used to control transmission of the first beacon signal from the first access point. In some embodiments the beacon information includes the schedule, the schedule corresponding to a product sale schedule for a product displayed in the coverage area of the first beam.

In some embodiments the first and second sets of beacons each include one or more beacons. In some embodiments the first access point is a sectorized access point and each beam corresponds to a different sector of the access point. In some embodiments the first access point includes a first antenna element used for transmitting from the first access point and the second sector includes a second antennal element used for transmitting from the second access point.

In some embodiments the first beam communicates information corresponding to at least one product in a geographic area covered by the first beam or maps to the information, the second beam communicates information corresponding to at least one product in a geographic area covered by the second beam or maps to the information. In some embodiments the first access point is a Bluetooth Low Energy and/o Bluetooth Access Point and the first and second sets of beacons include BLE (Bluetooth Low Energy) beacons.

Figure 8A:
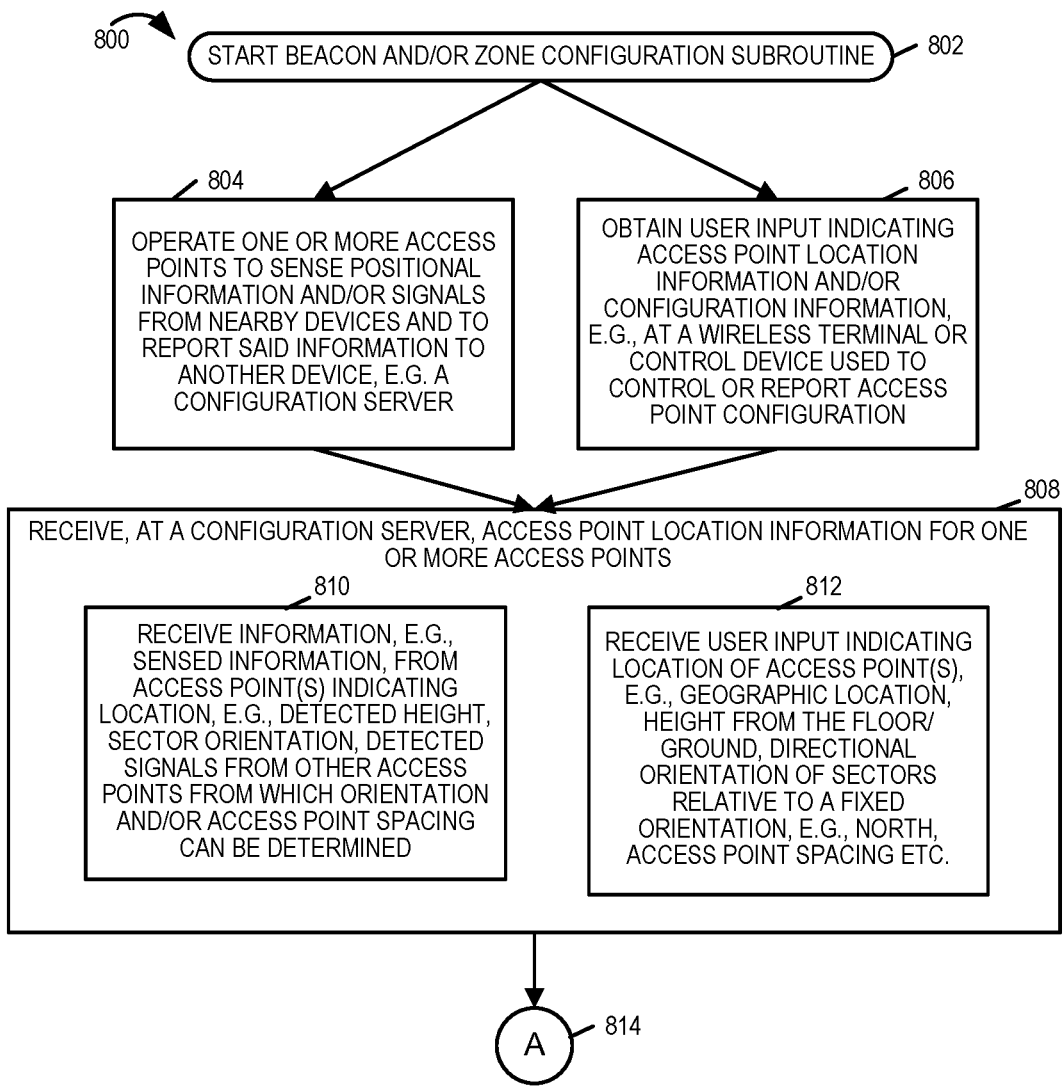
FIG. 8A is a first part of the flow chart of FIG. 8.
Figures 8, 8A, 8B:
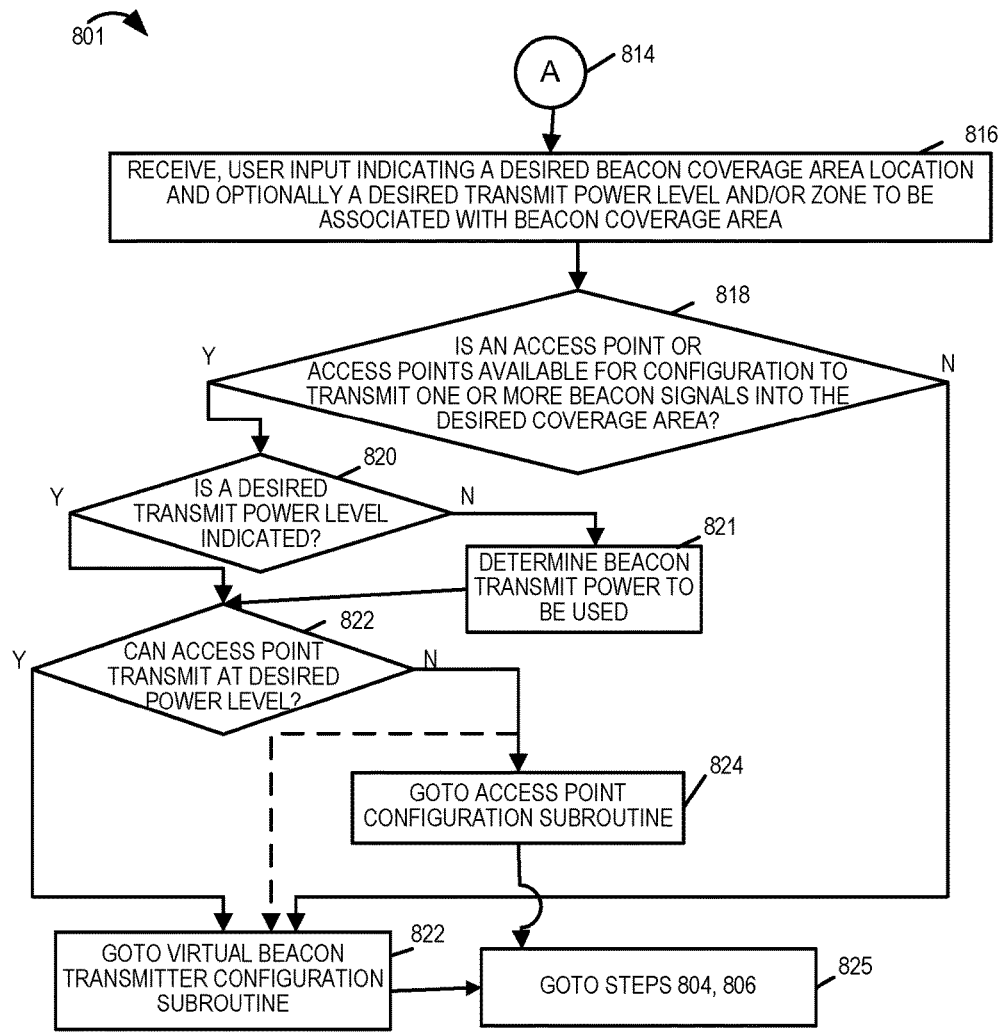
FIG. 8 is a diagram showing that FIG. 8 includes the combination of FIGS. 8A and 8B which, in combination, show the steps of a beacon and/or zone configuration subroutine.
FIG. 8B is a second part of the flow chart of FIG. 8.

FIG. 8 which comprises the combination of FIGS. 8A and 8B illustrates the steps of a beacon and/or zone configuration subroutine 800 which implements an exemplary method. The method starts in step 802 with the components, e.g., access points 130, 132, 136 and configuration server 120, and one or more WTs 504 which can operate as control devices being powered on.

Operation proceeds from step 802 to steps 804 and 806 which can be performed serially or in parallel. In step 804 one or more access points 130, 132, 136 sense positional information, e.g., height from a surface such as ground or floor beneath the access point, magnetic orientation of the access point and/or signals from nearby devices, e.g., access points within the reception range of the reporting access point. The height may be, and in some embodiments is, measured by a distance sensor in the access point which measures the AP's height. The orientation may be and in some embodiments is measured by a built in compass included in the reporting AP. Signal information may be measured by a wireless receiver which receives and measures signaling transmitted by neighboring APs. The signal strength of a received signal is measured and reported along with an indication of which sectorized antenna the signal was received along with an access point (AP) identifier identifying the received signal. Thus, from the measurements made and reported in step 804 it is possible to determine from the reported information the APs neighboring the reporting AP, the neighbor's position relative to the reporting AP as indicated by the information as to which sector received the signal, the APs height from the ground and the APs orientation which can be combined with known information about the APs sectorized antenna arrangement relative to the reported compass orientation. Strength of received signals from other APs can be used to estimate the distance between the reporting AP and the AP from which a signal was received. GPS determined location information, e.g., determined using a GPS circuit in an AP, or other AP location information may also be communicated to the configuration server, when available, which can then use the reported information. Thus, based on the information communicated in step 804, which may be communicated to the configuration server 120 from multiple APs 130, 132, 136, the configuration server is able to determine the locations and coverage areas corresponding to multiple APs which can be located at the same or different locations, e.g., stores.

While AP placement and orientation information can be automatically collected and reported in step 804, such information can also be entered manually, e.g., by a installer, using a WT 504 or other communications device which can transmit such information through an access point or other node to the configuration server 120. Thus, all or some of the information obtained in step 804 maybe manually entered and reported to the configuration server in step 806. In such a case received signal strength may not be reported for neighboring APs but the communicated information may, and sometimes does, identify APs and indicate their relative spacing and orientation at a site such as a store or other location which maybe identified via GPS coordinates, street address or using other information. In step 806 user input is received indicating access point location information and/or other configuration information such as sector orientation, adjacent access point information, etc. This information which can be received at a WT 504 or other device is communicated, e.g., via an AP 130 or 132 to the configuration server 120 which can then use the information in configuration beacon transmission control information and/or zones which may be defined based on AP beacon transmission coverage areas.

Operation proceeds from steps 804 and 806 to steps 808 which involves configuration server 120 operation with the configuration server receiving access point location information and other access point information, e.g., the information communicated in steps 804 and 806, for one or more access points. Step 820 includes steps 810 and/or step 812.

In step 810 the configuration server 120 receives information, e.g., sensed information, from access point(s) indicating location which may include height and/or GPS obtained position information and sector orientation information, information regarding detected signals from other access points which can allow for determination of access point spacing and/or relative orientation of access points and their sector antennas. In step 812, the configuration server receives user input indicating location of access points as well as orientation and/or spacing as well as other information which may be provided in step 806.

Since AP information is received, by the time step 808 has been completed, the configuration server 120 knows where APs are located and has sufficient information to determine sector orientation. From this information, coverage areas for access points and individual sector transmitters, e.g., sector antennas, included in the access points can be determined allowing the configuration server to determine which access points can transmit beacons covering different portions of a store or other location.

Operation proceeds from step 808 to step 816 via connecting node 814 which is part of FIG. 8B which includes the set of steps 801. In step 816 information indicating the desired location of one or more beacons is received. In some embodiments in step 816 user input indicating a desired beacon coverage area location and optionally a desired transmit power level is received. Additional information may include a zone to be associated with a beacon coverage area and/or desired beacon transmit power level information. Other information can include a beacon ID and/or information to be transmitted as part of the beacon. A user can indicate a desired beacon coverage area by indicating an area on a map, e.g., displayed on WT 504 or another control device, and providing the associated zone and beacon ID information as well as optimally a transmit schedule. The WT 504 can transmit this information to the configuration sever 120 which can process it and determine what access points, if any, can be used to transmit a beacon covering the indicated area. Alternatively, a user can transmit a signal indicating a desire to have the area from which the signal is transmitted covered by a beacon signal. The AP receiving the signal can determine the location of the area to be covered based on which sector received the signal and signal strength information. The area to be covered maybe assumed to be of a predetermined size surrounding the location of the device which transmitted the signal indicating the desired beacon coverage area and/or of a size specified by the user of the device which transmitted the beacon coverage request signal. Zone information, transmission schedule, and/or other information can also be communicated regarding the desired beacon signal. In step 116, the user input may be received via one or more APs which received the information or signal indicating a desire to establish a beacon coverage area from a WT 504 or another control device.

In step 818 the configuration server 120 determines based on the received beacon coverage area information obtained in step 816 if one or more access points are available for configuration to transmit one or more beacon signals into the desired coverage area. This decision maybe based on consulting the access point location and sector orientation information to determine if the APs known to the configuration server 120 can support actual beacon transmissions into the desired coverage area. If an access point is not available for transmitting into the desired beacon overage area, operation proceeds from step 818 to step 822 wherein a virtual beacon transmitter is configured to provide coverage without the use of an actual transmitter. If however in step 818 it is determined that one or more actual beacon transmitters is available for transmitting a beacon or beacons into the desired beacon coverage area, operation proceeds from step 818 to step 820. In step 820 a check is made as to whether a desired beacon transmit power was specified. If a desired beacon transmit power was specified operation proceeds directly to step 822 otherwise operation proceeds to step 821. In step 821 a beacon transmit power is determined, e.g., based on the location of the beacon coverage area and location of the access point beacon transmitter or transmitters that can transmit into the desired coverage area. The beacon transmitter may be a transmitter corresponding to a sector of an access point which can transmit a beacon covering the desired coverage area. The transmit power level may be determined as a function of the location of the beacon transmitter and desired beacon coverage area with the transmit power being determined to be a level sufficient for a transmitted beacon to cover the desired coverage area in the case where coverage of the entire area is possible using a single beacon signal.

With the beacon transmission power needed known from user input or the determination made in step 821 operation proceeds to step 822. In step 822 a determination is made if the access point or points to transmit the beacon or beacons to cover the desired area can transmit at the power level to be used to cover the area. If the access point or points can transmit at the required power level, operation proceeds from step 822 to step 824 wherein one or more actual access points are configured by the configuration server 120. If the access point or points can not transmit at the required power level or levels, meaning configuration of an actual access point to achieve the desired beacon coverage is not possible operation proceeds to step 822 which is a call to a virtual beacon configuration subroutine. While configuration of real or virtual beacons is shown in FIG. 8 as alternatives in some embodiments for each real beacon transmission that is configured a virtual beacon is also configured. This is represented by dashed arrow leading from the input of step 824 to the input of step 822. The configuration of a virtual beacon corresponding as well as a real beacon for the same coverage area allows a device which is not capable of receiving an actual beacon, e.g., because it lacks a receiver capable of receiving the transmitted real beacon, from determining that it should have received a beacon or receiving a message indicating receipt of a beacon. This indication of receipt of a "virtual beacon" allows the device to act as if a real beacon had been received.

Operation is seen in FIG. 8 progressing from steps 822 and 824 to steps 804 and 806 via goto step 825. This is to show that additional configuration information maybe received on an ongoing basis as it becomes available and the information will be processed and used as it becomes available. Thus multiple passes through the steps of the method shown in FIG. 8 may occur over times as access node and/or configuration information is received and processed.

Figure 9A:
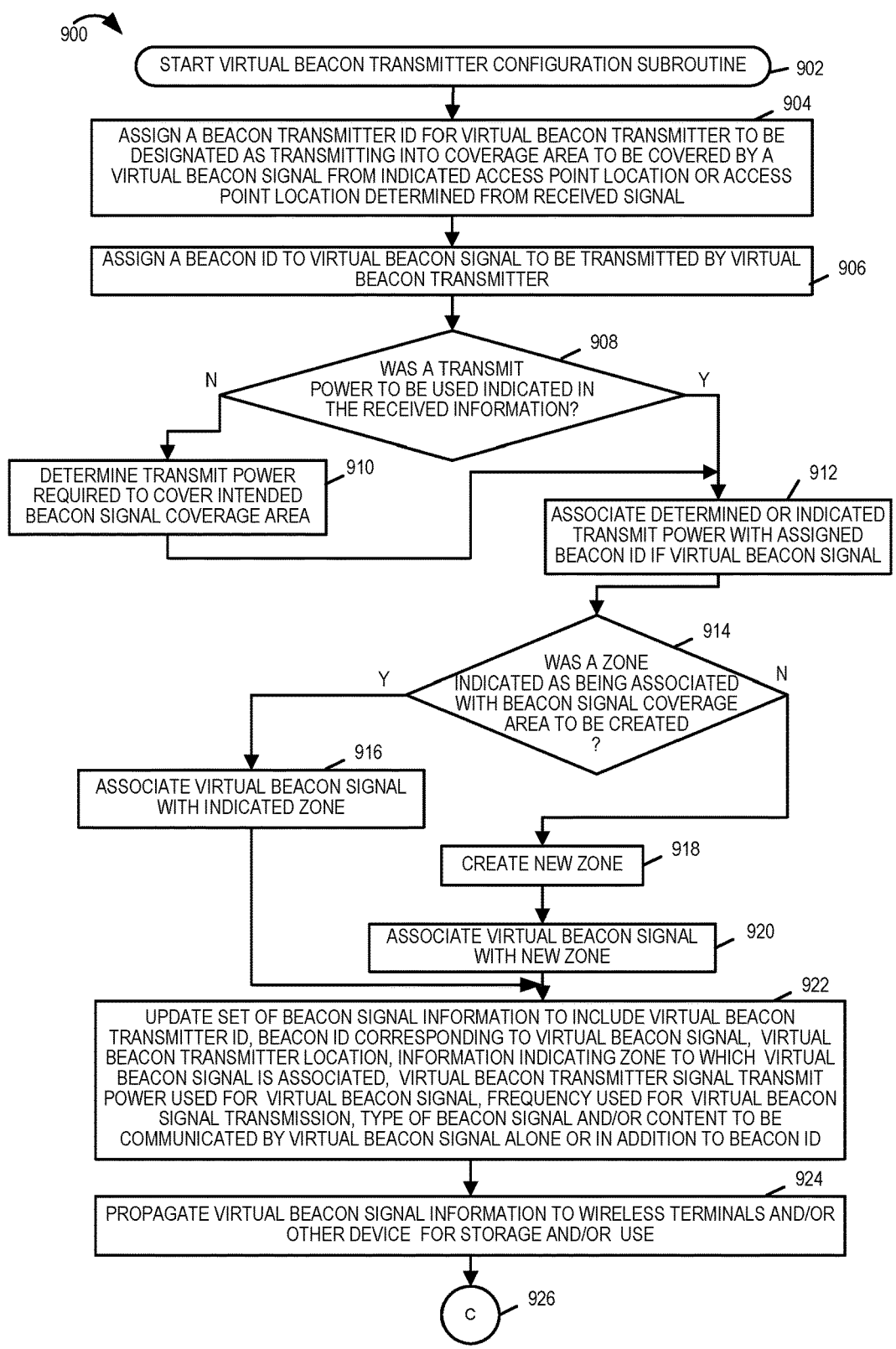
FIG. 9A is a first part of the flow chart of FIG. 9.

Having described various aspects with regard to the receipt of access point information and desired beacon coverage area information, an exemplary virtual beacon transmitter configuration subroutine 900 shown in FIG. 9, which comprises the combination of FIGS. 9A and 9B will now be discussed. The steps of the virtual beacon transmitter configuration subroutine 900, which starts in step 902, maybe, and in some embodiments is, performed by the configuration server 120.

Operation proceeds from start step 902 to step 904 in which a beacon transmitter ID is assigned for a virtual beacon transmitter to be designated as transmitting into a coverage area to be covered by a virtual beacon signal. The virtual beacon signal will be indicated as being transmitted from a transmitter located at an access point location indicated by someone entering such information or which was determined based on a signal received from a control device, e.g., WT 504. The virtual beacon transmitter may, and in some embodiments does, have the same format and form as an actual access point identifier or other identifier used to identify a real beacon transmitter. Thus, step 904 may and sometimes does include assigning an access point identifier, e.g., a base station identifier or SSID, to a virtual transmitter. The virtual transmitter ID assigned in step 904 can then be used in the system as if it identified an actual transmitter. Operation proceeds from step 904 to step 906. In step 906 one or more beacon IDs is assigned to the beacon signal to be considered as being transmitted by the virtual beacon transmitter identified in step 904. The beacon ID assigned in step 906 may have the same form and content of actual beacon signals which are transmitted by access points. Thus the beacon identifier or identifiers assigned in step 908 can be used in the same manner as actual beacon identifiers and can be located into databases or memory with beacon identifiers corresponding to real beacon signals without have to indicate that the beacon ID corresponds to a virtual beacon signal which may not actually be transmitted, Operation proceeds from step 906 to step 908 where a check is made as to whether a transmit power to be used was specified. If a transmit power was not specified in received beacon information operation proceeds to step 910 in which a transmit power required to cover the intended beacon signal coverage area is determined. This step may, and in some embodiments does, involve use of a path loss model which takes into consideration location of the virtual beacon transmitter and, optionally, the frequency to which the virtual beacon transmission corresponds, to determine the amount of transmit power that will be required to cover the desired beacon coverage area. Virtual beacon transmitter characteristics may also be taken into consideration where, for example, the virtual beacon transmitter is considered to be a sector of a base station with a direction antenna.

Operation proceeds from transmit power determination step 910 to step 912. Operation proceeds directly from step 908 to step 912 if a beacon transmit power was specified in the received information avoiding the need for the transmit power determination of step 910. In step 912 the determined or indicated transmit power is associated, e.g., stored in an information database, with the assigned beacon transmitter ID and virtual beacon identifier or identifiers corresponding to the virtual beacon being configured. See for example FIG. 19 which shows an exemplary beacon transmitter and signal information data base where one row corresponds to a beacon signal and includes information which can be populated by the method of FIG. 9. In step 912 in addition to transmit power a frequency band and/or type of beacon signal can and sometimes is associated with the virtual beacon signal. For example, the virtual beacon signal may be specified to be a WiFi beacon signal corresponding to a frequency band F4 as shown in exemplary row 1926 of FIG. 19.

Operation proceeds from step 912 to step 914. In step 914 a determination is made as to whether a zone has been indicated as being associated with the beacon signal coverage area for which the virtual beacon is being established. If a zone was specified in the received information the virtual beacon and corresponding beacon transmitter is associated with the specified zone. Thus, when a WT or other device determines or receives a message indicating receipt of the virtual beacon, a determination can be made that the WT is within the corresponding zone. See for example column 1917 which indicates the Zone corresponding to the beacon signal of the row to which the Zone information corresponds. Operation proceeds from step 916 to step 922.

If in step 914 it is determined that no zone was specified to be associated with the desired beacon signal coverage operation proceeds from step 914 to step 918 in which a new zone corresponding to the coverage age of the virtual beacon signal is created and assigned a zone identifier. The virtual beacon signal being transmitted into the desired beacon coverage area is then associated with the zone so that there is a mapping between the virtual beacon signal and its contents, e.g., assigned beacon identifier and/or other information and the newly created zone.

Figure 19:
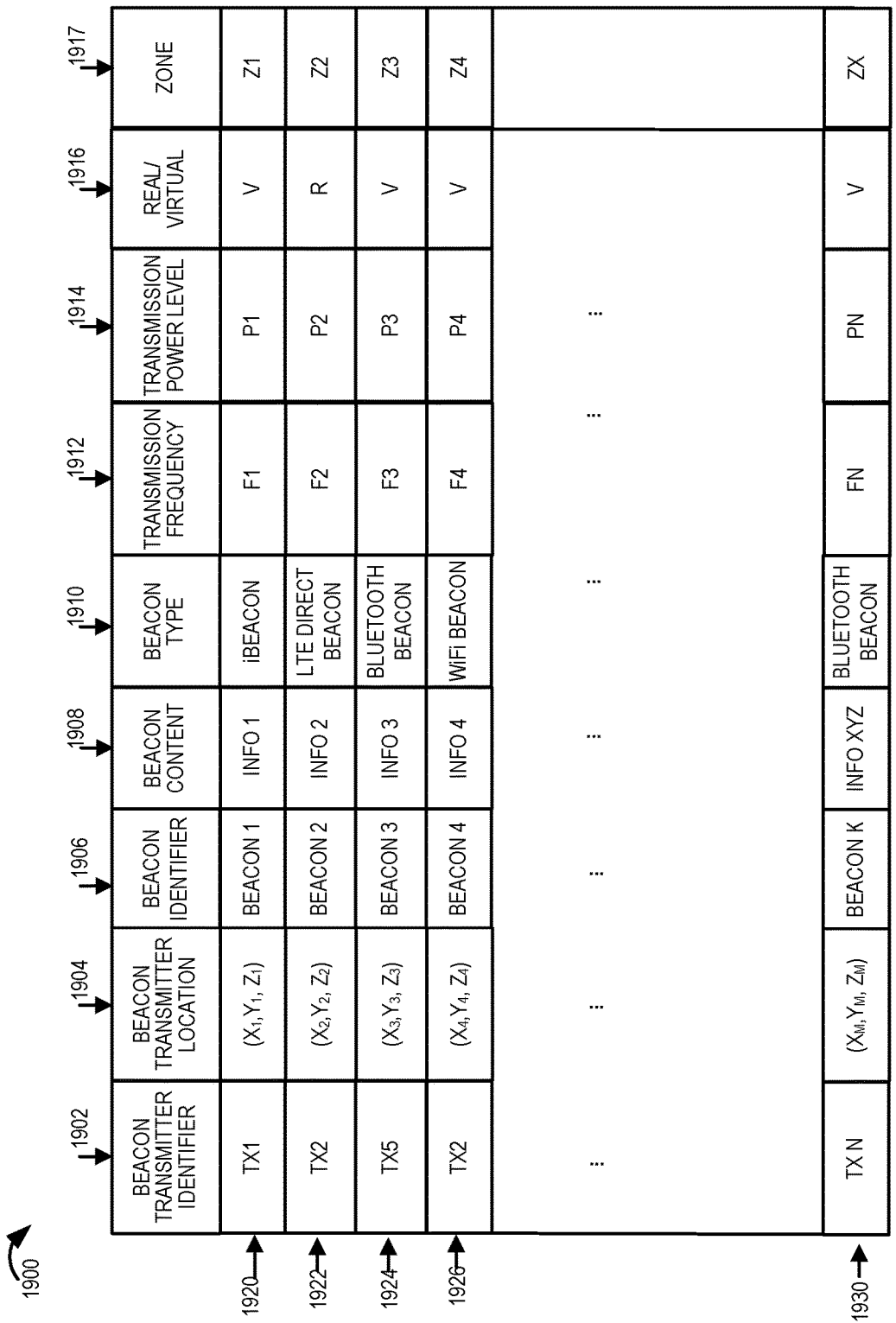
FIG. 19 illustrates an exemplary beacon transmitter information database in accordance with an exemplary embodiment.

Operation proceeds from step 920 to step 922. In step 922 as set of beacon information such as that shown in FIG. 19, is updated to include the information corresponding to the virtual beacon signal being created. This may involve adding a row to the set of information in FIG. 19 corresponding to the new virtual beacon transmitter and virtual beacon signal. For example memory and/or a database storing the information shown in FIG. 19 maybe updated to include the contents of row 1926 which corresponds to a virtual WiFi beacon signal corresponding to zone 4.

Once the beacon transmitter, signal content information including beacon ID and/or other information and other information corresponding to the virtual beacon signal being configured to cover a desired beacon coverage area has been updated and/or stored, the information is then propagated to devices which use the virtual beacon information. The devices to which the beacon information is propagated, e.g., table 1900 shown in FIG. 19, include, e.g., WTs 504, the server operating as the zone correlation engine, if it is not part of the same server as the server which configured and stored the virtual beacon information and other devices such as location determination servers, etc which may use or rely on reports of received beacon signals to provide services, alerts, and/or information.

Operation proceeds from step 924 to step 928 via connecting node C 926. In step 928 at least some of the information regarding virtual beacon signals is loaded into nodes, e.g., communications nodes in the network, which receive beacon signal reports and use reported beacon signal information or provide information in response to a report of a received beacon signal. Thus, the information in not only provided to nodes which determine if a virtual beacon signal is to be deemed to have been received but nodes which use beacon receipt and related information to provide other information or to take actions, e.g., based on the location of a transmitter which is known to have "transmitted" a reported beacon signal. In the case of a reported virtual beacon signal it will deem to have been transmitted from the location and at the power level indicated in the information loaded into one or more devices allowing them to treat reports of virtual beacon signals in the same way they use reports of actual received beacon signals.

With the information corresponding to a virtual beacon signal having been distributed to one or more devices and stored in the devices, e.g., in memory or long term storage, configuration of the virtual beacon is complete and operation returns via step 930 to the routine which made the call to the virtual beacon transmitter subroutine 902.

Figure 10:
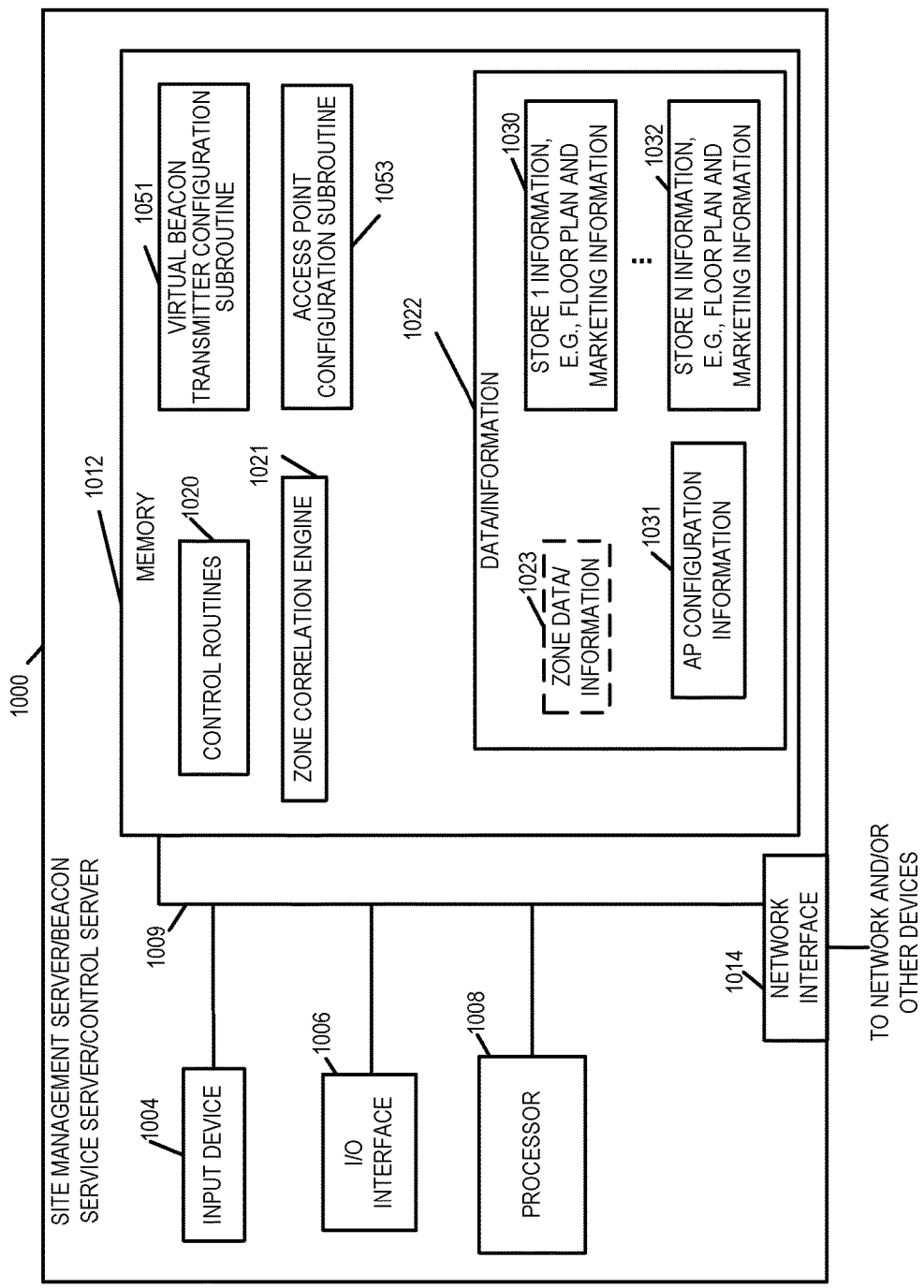
FIG. 10 illustrates an exemplary site management/beacon service server in accordance with an exemplary embodiment which in addition to controlling base station beacon transmissions can and in some embodiments is used to perform zone correlation operations and serve information to wireless terminals reporting receipt of beacons corresponding to zones.

FIG. 10 illustrates an exemplary site management/beacon service server 1000 in accordance with an exemplary embodiment which in addition to controlling base station beacon transmissions can and in some embodiments is used to perform zone correlation operations and serve information to wireless terminals reporting receipt of beacons corresponding to zones. The exemplary site management/beacon service server 1000 is also referred to as the beacon information and/or configuration server. In some embodiments the management/beacon service server 1000 is a node in the core network. In some embodiments the configuration server 1000 is configured to implement the methods of flowcharts 800, 900, and 1700 to control the operation of the server 1000 in accordance with the invention.

The server 1000 includes a processor 1008 and memory 1012 coupled together via a bus 1009 over which the various elements may interchange data and information. Memory 1012 includes various routines, modules and data/information which are used to control the operation of the server 1000 in accordance with the invention.

The server 1000 further includes an input device 1004, an input/output (I/O) interface 1006, and a network interface 1014 in addition to the processor 1008 and memory 1012. The various elements are coupled together via bus 1009 over which they exchange signals/information.

The input device 1004 may include one or more devices via which input can be provided to the server 1000 such as a keypad, a microphone for voice input, a touchpad etc. Via the I/O interface 1006 the configuration server 1000 can be coupled to one or more external devices. Via the network interface 1014 the configuration server 1000 is coupled to the communications network, e.g., network 112. Via the network interface 1014, the configuration server 1000 can exchange signals and/or information with other nodes and devices of the system such as the access points via the network 112. The interface 1014 supports the receipt and/or transmission of signals and/or information from/to different devices. To support the receipt and transmission of information, the interface 1014 includes a receiver and transmitter.

To control the server 1000, the processor 1008 uses information and/or routines including instructions stored in memory 1012. Routines 1020 include communications routines and control routines. In addition to the control routines 1020 the memory 1012 includes virtual beacon transmitter configuration subroutine 1051, zone correlation engine module 1021, and access point configuration subroutine 1053. The data/information stored in memory 1012 includes zone data/information 1023, access point (AP) configuration information 1031 and store information corresponding to a plurality of stores including store 1 information 1030, . . . , store N information 1032. The processor 706 in various embodiments is configured to control the configuration server 1000 to implement the methods of flowchart 800, 900, and 1700.

Figure 11:
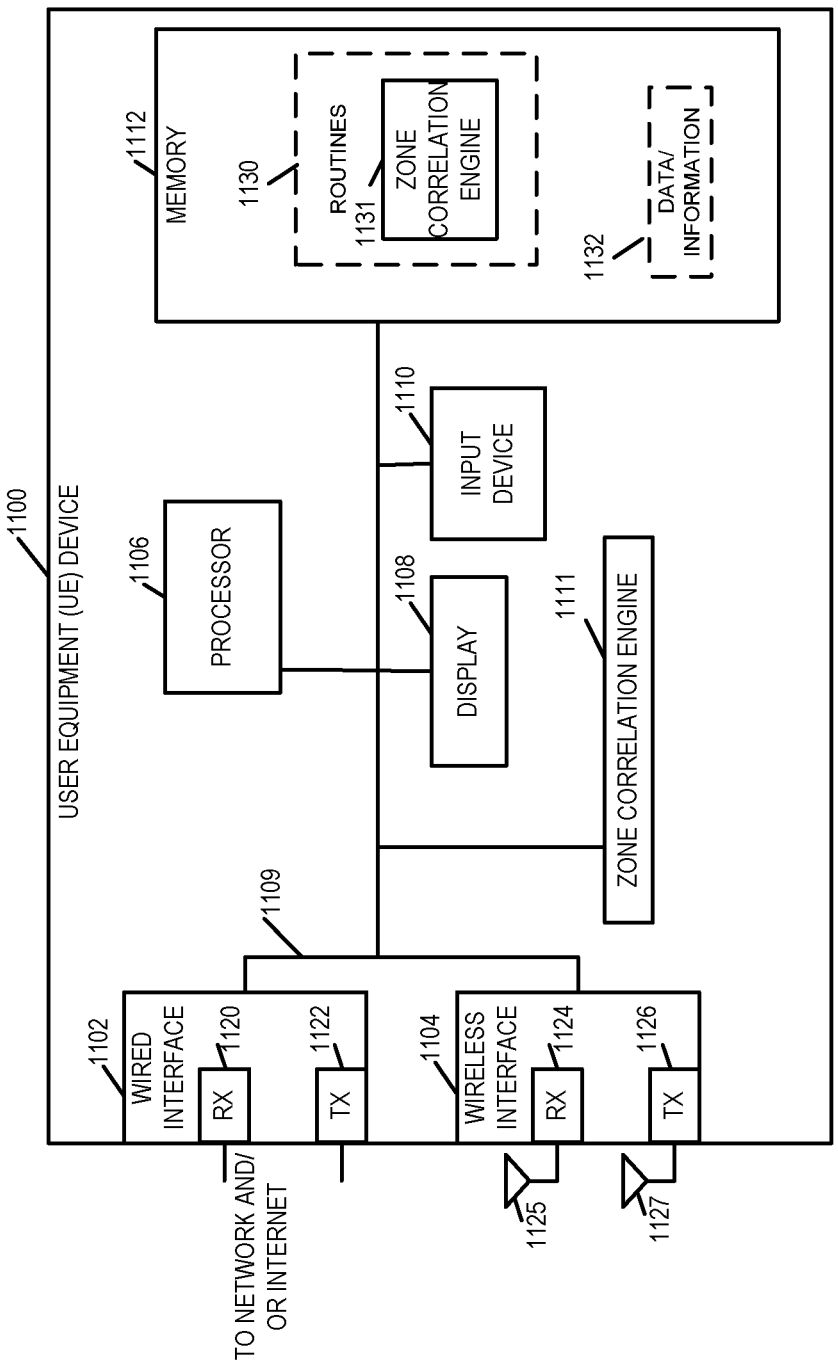
FIG. 11 illustrates an exemplary user device, e.g., wireless terminal (WT), desktop and/or laptop etc., implemented in accordance with some embodiments which is capable of acting as a control device and/or detecting receipt of beacons and communicating the beacon information either to an internal zone correlation information or external zone correlation engine and of receiving information corresponding to zones in response to detection of one or more beacons corresponding to a zone.

FIG. 11 illustrates an exemplary user device 1100, e.g., a cell phone, desktop and/or laptop etc., implemented in accordance with some embodiments which is capable of detecting receipt of beacons and communicating the beacon information either to an internal zone correlation engine 1111 or external zone correlation engine 1021 and of receiving information corresponding to zones in response to detection of one or more beacons corresponding to a zone.

The user device 1100, includes a processor 1106 and memory 1112 coupled together via a bus 1109 over which the various elements may interchange data and information. Memory 1112 includes routines 1130 and data/information 1132. The user device 1100 further includes a wired interface 1102, a wireless interface 1104, a display 1108, an input device 1110, and a zone correlation engine 1111. In some embodiments the zone correlation engine 1111 is included in processor 1106. In some embodiments the memory 1112 includes a zone correlation engine 1131 implemented as a module within the memory 1112. In some embodiments one or more modules of the user device 1100 are, implemented fully in hardware within the processor 1106, e.g., as individual circuits. In other embodiments some of the modules are implemented, e.g., as circuits, within the processor 1106 with other modules being implemented, e.g., as circuits, external to and coupled to the processor. Alternatively, rather than being implemented as circuits, all or some of the modules may be implemented in software and stored in the memory 1112 of the device 1100 with the modules controlling operation of the user device 1100 to implement the functions corresponding to the modules when the modules are executed by a processor, e.g., processor 1106.

Via the wired interface 1102 the user device 1100 can be coupled to a communications network and/or external device using a wired link. The interface 1102 in some embodiments includes receiver 1120 and a transmitter 1122. In addition to receiver 1120 and a transmitter 1122 the interface 1102 in some embodiments further includes an optical interface and/or a power line interface for communicating with various devices and system elements. The wired interface 1102 is capable of transmitting/receiving information over a wired link. In some embodiments the wired and 1102 is one of an Ethernet interface or USB interface.

The user device 1100 further includes a wireless interface 1104 via which the users device 1100 communicates with wireless devices. The wireless interface 1104 includes a wireless receiver module 1124 coupled to receive antenna 1125, via which the user device 1100 receives radio signals. The radio signals include, e.g., beacon signals. The wireless interface 1104 further includes a wireless transmitter 1126 coupled to transmit antenna 1127 via which the device 1100 transmits radio signals. In some embodiments, the same antenna is used for both input and output wireless communications signaling. In some embodiments the wireless interface 1104 is a WAN (wide area network) radio module. In some embodiments the wireless interface 2204 includes a plurality of wireless transmitter/receiver modules capable of transmitting and receiving variety of wireless signals, e.g., WiFi signals, LTE direct beacon signals, iBeacons, Bluetooth beacons etc. Various other types of radio modules may be used in the wireless interface in some embodiments. Thus in some embodiments, the different radio modules in the wireless interface correspond to different communications technologies, different communications protocols and/or different frequency bands. While a variety of radio modules may be used in the user device 1100 in some embodiments, in accordance with one aspect of the invention even when the user device 1100 does not actually include a particular type of wireless receiver which would otherwise be needed to receive the particular type of beacon signal, it can still claim to have received a beacon (e.g., virtual beacon signal). The receivers included in the interfaces 1102, 1104 are configured to receive signals (e.g., control signals, beacon signals etc.) and process them to recover information and/or data communicated in a received signal.

Figure 12:
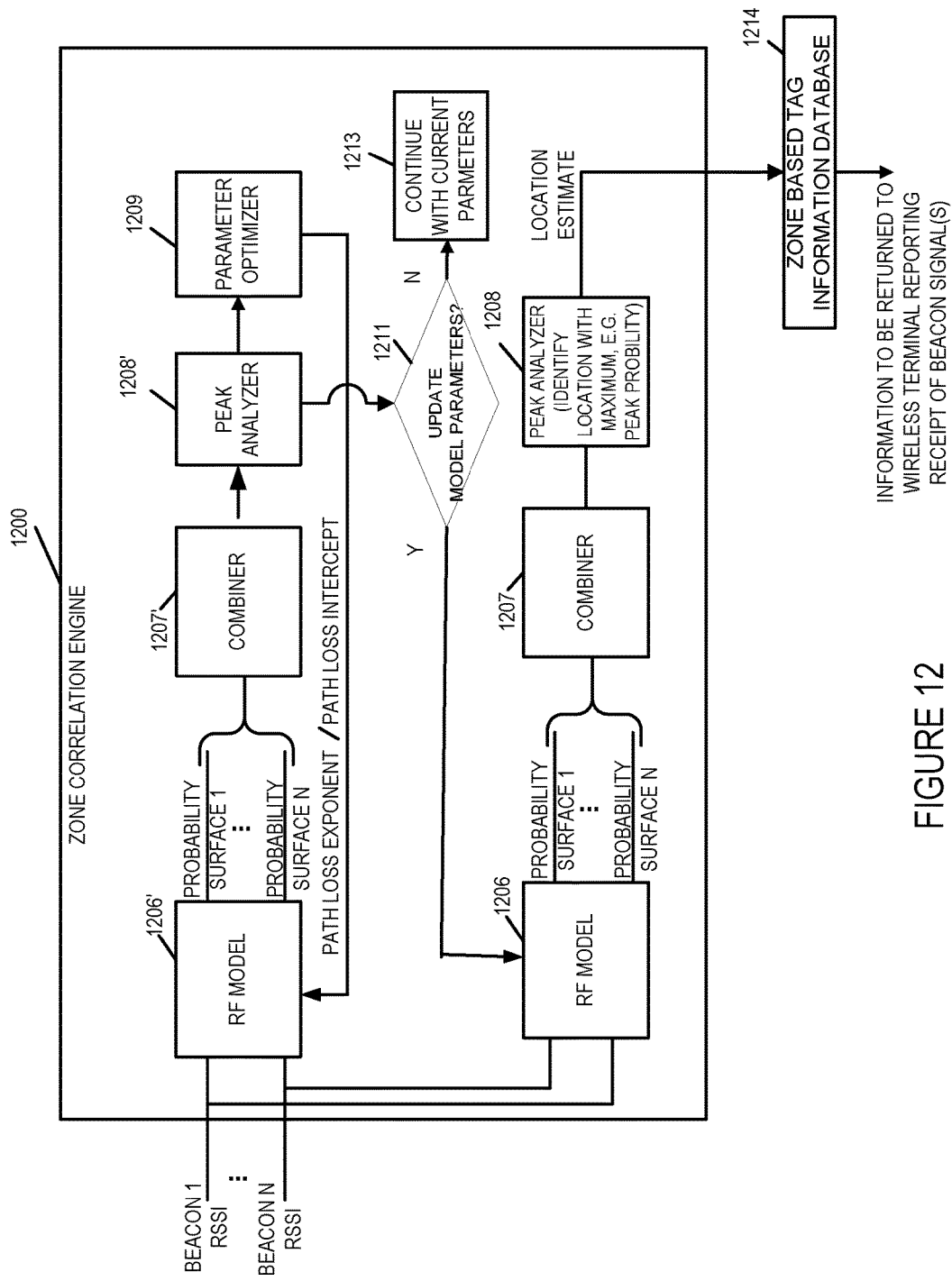
FIG. 12 illustrates an exemplary zone correlation engine and associated information database with the zone correlation engine being capable of determining which zone a wireless terminal is located in based on received beacon information and updating RF path loss model parameters based on received information.

FIG. 12 illustrates an exemplary zone correlation engine 1200 and associated information database with the zone correlation engine being capable of determining which zone a wireless terminal is located in based on received beacon information and updating RF path loss model parameters based on received information.

As shown in FIG. 12, the zone correlation engine 1200 receives as input RSSI information from one or more wireless terminals along with information identifying the beacon signal to which the RSSI information corresponds and the time at which the beacon signal was received. Thus, the zone correlation engine 1200 is made aware of beacon signals received by a wireless terminal during a given time period and the strength of the signals that were received. The RSSI information may be in the form of a received signal strength, e.g., received power, measurement value. Based on the beacon signal information the zone correlation engine 1200 can determine which base station and beam was used to transmit a particular received beacon and can use beam location, zone location and signal strength information to produce a probability surface reflecting the probability that the receiving wireless terminal is at a location corresponding to one or more zones.

The RSSI and beacon information is applied to RF models used in generating probability surfaces reflecting the probability that the wireless terminal is located in a zone covered by a beam. For a given reported RSSI value a probability surface is determined by RF modeling engine 1206 for the beam on which the received beacon signal was transmitted. The probability surface indicates probabilities along the surface corresponding to the beam that the RSSI value corresponds to a particular zone or zones. For each reported RSSI value a probability surface is determined. The determined probability surfaces are then combined by a combiner 1207 which is used to determine a location of a peak in the probability surface resulting from combining the individual probability surfaces. Based on the peak of the combined probability surfaces, e.g., the area indicative of maximum overlap of the value of the individual probability surfaces, a peak analyzer 1208 determines the location of the wireless terminal, e.g., which zone, if any, the wireless terminal is located in. The location estimate is provided to a zone based tag information database which provides information corresponding to the zone in which the wireless terminal is located. The information corresponds to what is called a TAG for the location. The information output by the database 1114 is provided to the processor of the wireless terminal. Thus, while the wireless terminal reports receipt of beacon signals in the FIG. 13 embodiment the returned information maps to the zone which the received beacon signals indicate the wireless terminal is located in.

While the lower portion of the zone correlation engine determines device location for purposes of retrieving information corresponding to a zone in which the wireless terminal is located. The upper set of elements 1206', 1207', 1208', 1209, 1211 and 1213 related to RF parameter module updating based on received RSSI information.

Elements 1206', 1207' and 1208' operate in the same or similar manner as elements 1206, 1207, 1208 but may operate at a higher rate with different parameter values being used by the RF module engine 1206 during different iterations using the same set of beacon RSSI signal inputs. The parameter optimizer 1209 may alter one or both of the path loss parameter and intercept used in the RF module implemented by RF module engine 1206' with the output of the peak analyzer being provided to the parameter optimizer to determine if a change in the parameter or parameters has increased the maximum peak achieved by combining the probability surfaces as performed by combiner 1207'. In increase in the combined peak indicates that the change in parameters has increased the quality of the combined result and thus reflects an improvement in the accuracy of the RF model parameters. Decision step 1211 decides based on the output of the peak analyzer where an improvement in the achieved peak has been obtained which would merit replacing of the parameters used in the RF module engine 1206 with the updated parameters output by the parameters optimizer. If a decision is made in step 1211 to update the model parameters, the updated model parameters are supple dot the RF module 1206 however if in step 1213 the decision is not to use updated model parameters operation of the RF model engine 1206 continues with the parameters that have been in use by the engine 1206 as indicated by step 1213.

In some embodiments the update loop may operate at a rate much faster than the lower location determination path so that multiple different parameters values can be tested in the same amount of time the lower path makes a single location determination. However the relative rates of the module update path to the normal location estimation path is not critical.

It is worthy to note that in some embodiments while the RF model implemented by engine 1206 starts out using model parameters which are not based on measurements made at the area where the wireless terminal may be located, over time as RSSI values are reported the parameter values are updated and refined based on the received RSSI value providing a self learning approach which can be used to update and refine the model parameters for a particular location from which RSSI information is received.

While the above discussion relates to a first approach of RF modeling that is used in embodiments, another approach that can be used in some embodiments will now be discussed. In the second approach, first each location is determined using a set of beams, e.g., received beacons. Let us denote B to be the collection of the set of beacons transmitted on beams used to determine location estimates. Each set of beams in the collection yields a location estimate based on the beacon that is or could be received corresponding to the beam, by combining the probability surfaces generated from a PLE and intercept, to generate a highest probability.

In one implementation, for each set of beams in B the "machine learning" process iterates through intercept and PLE values. The per beam probability surfaces are generated, and combined to create a location estimate based on a received beacon signal strength. Each beam has a probability at the location estimate. The highest probability in the surface given only the beam and RSSI of the received beacon signal is determined. The ratio of the highest probability divided by the probability at the location estimate yields a per beam error term. The per beam error terms are summed for all beams that contributed to the single location estimate, and the attempted PLE/intercept value.

The error terms of all attempted locations are summed for each PLE/Intercept value, yielding a table of PLE/Intercept error terms. Each PLE/Intercept error term is generated from the same collection of beams. The PLE and intercept with the lowest error term is identified as that PLE and intercept that yield the most accurate location estimates.

Figure 13:
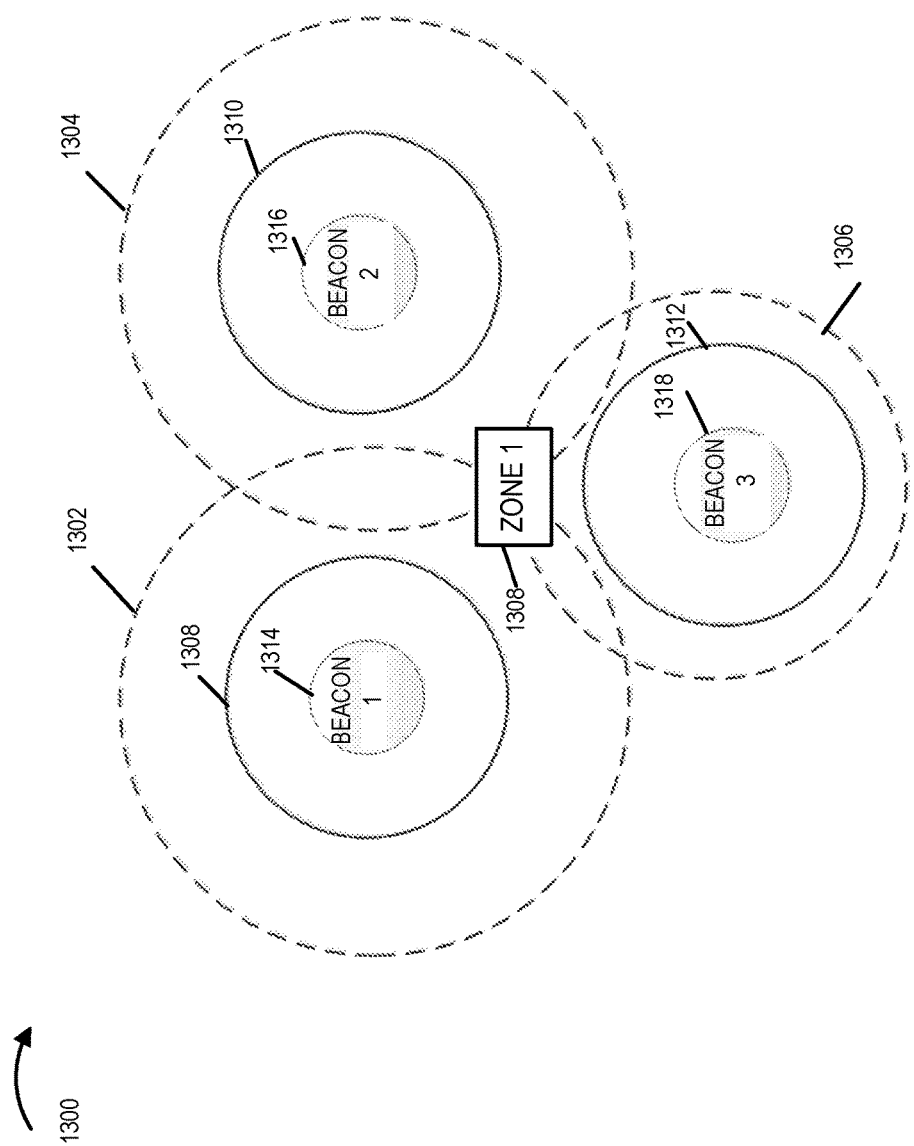
FIG. 13 illustrates an exemplary coverage area diagram where three different base stations transmit beacons which can be detected at a zone corresponding to the intersection of the overlapping probability surface of the three different base stations.

FIG. 13 illustrates an exemplary coverage area diagram 1300 where three different base stations 1314, 1316, 1318 transmit beacons which can be detected at a zone (Zone 1 1308) corresponding to the intersection of the overlapping coverage areas of the three different base stations.

A probability surface applicable to the environment shown in FIG. 13 with different probabilities with respect to the base station transmitting beacon 1 can and in some embodiments is created with the probability being the highest where detection of zone 1 is expected to occur based on a comparison of the expected received signal strength in zone 1 to the various signal strength values that may be measured.

Figure 14:
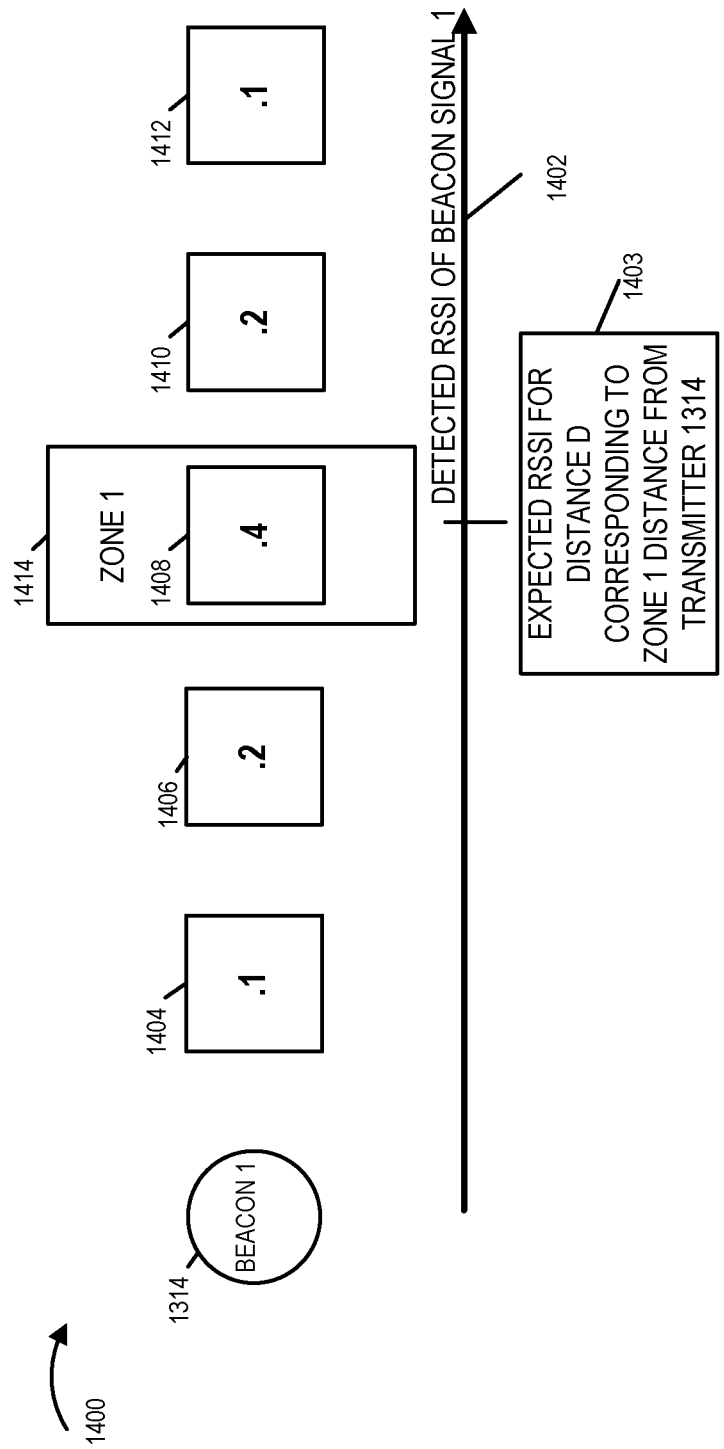
FIG. 14 illustrates a probability surface with different probabilities with respect to the base station transmitting beacon 1 with the probability being the highest where detection of zone 1 is expected to occur based on a comparison of the expected received signal strength in zone 1 to the various signal strength values that may be measured.

FIG. 14 illustrates a pattern 1400 of probability values 1404 (0.1), 1406 (0.2), 1408 (0.4), 1410 (0.2), 1412 (0.1). The different probably values indicate a probability that a device which receives a beacon signal from beacon transmitter 1314 and measures a received signal strength (RSSI) corresponding to a point on the line 1402 is in Zone 1. RSSI values decrease in the direction of the arrow on line 1402 as distance from the transmitter 1314 increases. The received signal strength indicator (RSSI) corresponds to distance with the RSSI decreasing the further away a receiver is from the beacon transmitter 1314 as the signal strength decreases the further away a receiving device is from the transmitter 1314. When a received beacon signal has a received signal strength corresponding to the expected RSSI for the distance Zone 1 as indicated by box 1403 from the beacon transmitter 1314, the probability that the receiving device is in Zone 1 will be 0.4

FIG. 14 may be considered to be a probability surface for different distances from Beacon 1 transmitter 1400 with regard to the probability of a device receiving a beacon signal having RSSI on line 1402 being in Zone 1. Similar probability surfaces may be generated for Beacon transmitter 2 1316 and beacon transmitter 3 1318.

By considering the probabilities that a device determines for each of the individual transmitters, an overall probability that a device receiving beacon signals 1, 2 and 3 is in Zone 1 can be generated by combining the probabilities obtained based on received RSSIs for beacons 1, 2 and 3 from the corresponding probability surfaces that indicate for a given RSSI the probability that the receiving device is in Zone 1.

Figure 15:
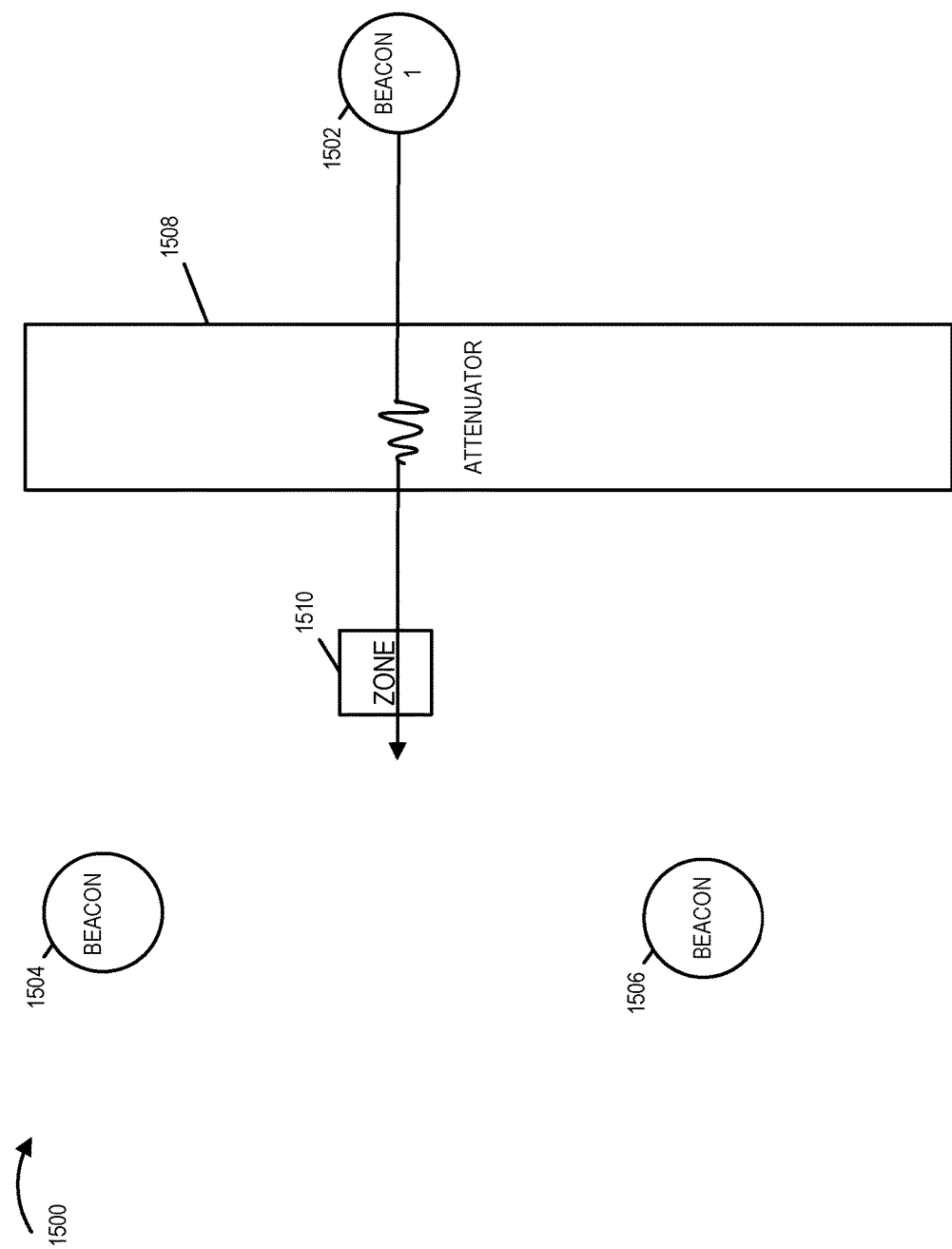
FIG. 15 is an illustration of how an attenuator such as a wall may be located between a base station transmitting a beacon and a zone in which the beacon signal may be received subject to the attenuation caused by the presence of the attenuator.

FIG. 15 is an illustration 1500 of how an attenuator 1506 such as a wall may be located between a base station, e.g., access point 1502, transmitting a beacon and a zone 1510 in which the beacon signal may be received subject to the attenuation caused by the presence of the attenuator 1508. The attenuator 1508 will reduce the energy received form the beacon transmitter 1502 but not the strength of beacon signals received from access points 1504 and 1506 which have an unobstructed transmission path to zone 1510. The known position of the attenuator and its attenuation characteristics maybe taken into consideration when applying a path loss model to a beacon signal transmitted by transmitter 1502 with the relative energy received from beacon transmitters 1504, 1506 as compared to the energy received from beacon 1502 allowing for a determination as to what side of attenuator 1508 the wireless terminal measuring the received signal energy of the beacons transmitted by the different access points is located on.

Figure 16:
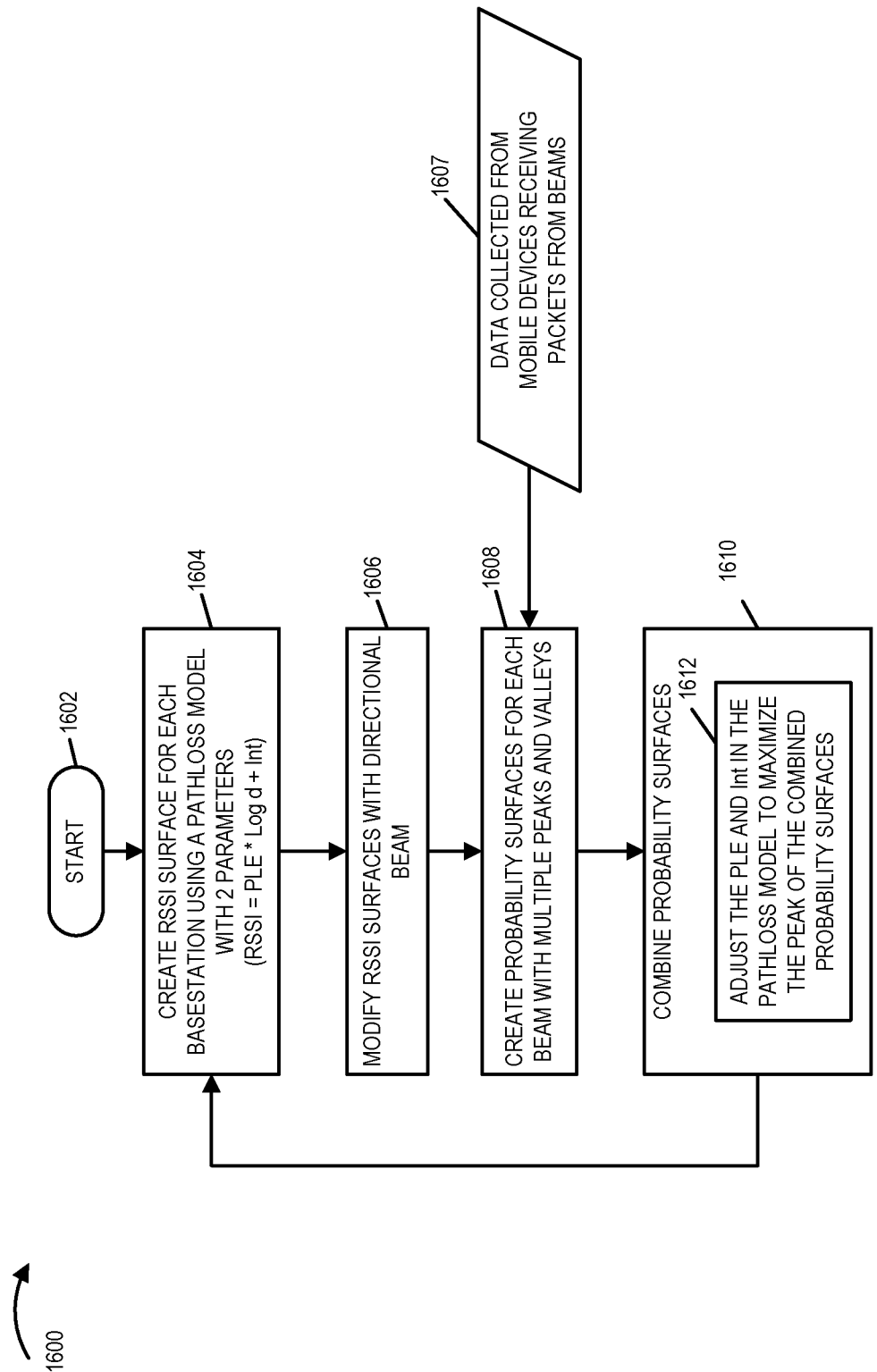
FIG. 16 is a flow chart showing computation of values used in a path loss model based on received RSSI information.

FIG. 16 illustrates a method 1600 which includes various exemplary steps which may be used in some but not all embodiments as part of the process of creating and updating probability surfaces that can be used to determine whether or not a wireless terminal that receives one or more beacon signals and reports the RSSI information for the received beacon signals to a zone correlation in the server 120 or wireless terminal making the received signal measurements, is in a zone of interest.

The method begins in start step 1602. Then in step 1604 an RSSI surface is created for each access point, e.g., assuming an omni-direction antenna pattern, using a path loss model including at least two parameters (PLE and INT) which may be varied for a given distance d, where PLE stands for path loss exponent and Int refers to an Intercept.

In step 1606 RSSI the general RSSI surfaces created in step 1604 are modified for individual beams taking into consideration the directional characteristics of the particular beam. Data collected from mobile devices receiving beacons and packets of information 1607 communicated in such signals are used in step 1608 to create probability surfaces for each beam with the surface for an individual beam including multiple peaks and valleys. In step 1610 the probability surfaces for a beam are combined to identify values for PLE and INT which result in a path loss model, which when used for multiple beams, maximizes a peak which will be achieved when multiple probability surfaces are combined.

The process shown in FIG. 16 is iterative in nature with operation proceeding from step 1610 to step 1604 with the model parameters being further refined over time as additional data 1607 is collected and reported.

The operation of the RF module engine 1206 can be understood taking into consideration the exemplary RSSI path loss model shown below:

$$Rssi = PLE * \log 10d + intercept$$

Here, "d" is a distance value from the transmitter with units, like meters. The intercept is a constant which maybe based on transmission angle, distance from the transmitter to the ground and/or other factors. Consider for example if the intercept is the value at 1 meter, as log 10(1)=0. PLE values may range from −20 (free space) to −32 (severe attenuation). Intercept for Bluetooth signals is normally about −59.

For the purposes of understanding, let us assume the path loss formula is perfect. That is, when you are 1 meter away, the RSSI is the intercept (−59)

When you are 10 meters away, the RSSI is the PLE*1+ Intercept. If the PLE is −28, and the intercept is −59, for instance, the RSSI at 10 meters would always be −87. Forget about walls, and such, for the moment.

Now, it is possible that different environments have different PLEs. So let's start with the idea that Intercept is fixed and always correct, and path loss varies in environments, to a constant value. Consider the diagram shown in FIG. 13 which shows omni directional beacon transmitters and a zone, ZONE 1.

The PLE of each of the dark (solid) lines 1308, 1310. 1318 is −28, and the PLE of each of the dotted lines 1302, 1304, 1306 is −22.

In the perfect world, a PLE of −28, the Location engine would yield no answer with respect to Zone 1 which is the intersection location of the three circles. The three dark lines do not intersect given such a PLE, and so the actual location is unknown. However, by iterating through PLE values, it would be possible to find the intersection with a PLE of −22. In this perfect world case, incorrect PLE values yield no answer at all, but correct ones yield an answer.

Also, in the perfect world, it is possible to determine both the intercept and the PLE by taking two different distances. Only a single pair of PLE and intercept will provide locations for two distinct locations.

Let us add one variable. Let us suppose that the path loss estimate (PLE) is perfect, and the intercept is perfect, but that the RSSI reading is imperfect. Randomly, in the real world, it varies due to power fluctuations, receiver issues, or other completely random reasons. So in the real world case, upon receipt of an RSSI reading, the actual distance is uncertain. Because of this, the actual distance from the beacon transmitter is probabilistic. The diagram in FIG. 14 shows the probability of being in Zone 1 given an RSSI value which maybe reported from different locations relative to beacon transmitter 1402. Note that the probability corresponding to a high received RSSI peaks at 0.4 when a device is located at the distance of Zone 1 1414 from beacon transmitter 1314.

There are various ways to model the variation in RSSI, Gaussian, Rayleigh, etc. In one implementation a Gaussian variation in the RSSI is used in the module.

A single RSSI reading, then, can place likely locations for the tag, based on the path loss model, and the probability function, to locations in an "n" dimensional space. In various embodiments the objective is to locate a wireless terminal within a plane, so construct distances to the zone in 3 space, and determine the probability in a plane, for each zone location given a reported RSSI value and knowledge of which beam was used to transmit the beacon signal to which the RSSI value corresponds.

The multiple probability planes corresponding to different beacons are combined using a mathematical function, to determine the most likely location, e.g., zone location, of the device.

An exemplary probability surface for a single high RSSI reading generated for a beacon signal transmitted from a directional antenna can be represented on a map using shading to represent probability of a given RSSI value. Dark, areas can be used in such a map to indicate areas where there is a high likelihood of a high RSSI reading. Lighter shades/colors indicate possible locations, but with lower probabilities for a high RSSI reading. Other readings (RSSI measurements and corresponding beacon information) from other beacons, with their corresponding probability surfaces, are combined mathematically to help locate the device to its most likely position, e.g., zone.

These combinations yield a location result. In general, due to errors, each "most likely" location is adjusted by other beacon measurements, and so each location determination is slightly off. Each set of beacon signal measurements has an error and thus the location determination has an "Error" associated with it as well.

Consider once again the diagram shown in FIG. 13. In the FIG. 13 case, a wrong Path Loss Estimate (PLE) will give low probability to the dotted line, but the Zone correlation Engine will still yield the actual location as the highest probability because the mathematically computed location is still the actual. However, each individual location determination will be off, because the PLE is incorrect. In the exemplary case, with three equidistant beacon transmitters, there is only one right answer.

Upon creating a location estimate, each beacon signal will have an error value to the computed zone location, where it ideally would place the zone (the dark line) vs. where it actually places the tag (the dotted line). This yields a discrepancy between where each beacon signal would place the location, and where the beacons, collectively, indicate it is. The discrepancy can be used to create an error surface that is a function of the RF model e.g. PLE/INT. By finding the minimum on this error surface the RF model that minimizes the location error can be determined. This approach can eliminate the need for manual site surveys. In a world of consistent PLE, and intercept, selecting the PLE and intercept that minimizes the error over many estimated data points minimizes location error overall, despite that the actual location is not known. Experimentally, in some experiments the computed PLE and intercept values are within 5% of optimal values over some 4K samples.

The above discussion explains how to optimize two values, e.g., a path loss value and an intercept. The above discussion assumes a constant, the RSSI variation expected.

It is possible to use the guiding path loss equation, to determine environmental variables.

As an example, consider the diagram shown in FIG. 13.

In the FIG. 15 example Beacon signal 1 transmitted from the access point 1502 represented by a circle in which the phrase Beacon 1 is placed, will have reduced RSSI through the attenuator 1508, and as such will view the perceived location of the beacon transmitter 1502 as further away. It will have the general effect of increasing the overall PLE of the network.

Meanwhile, assume the two other beacon transmitters 1504, 1506 shown in FIG. 15 are not subject to the effect of the attenuator 1508. In such a case the un-attenuated beacon signals from beacon transmitters 1504, 1506 will have the property of pushing the perceived beacon signal closer to the attenuating obstacle given use of the same path loss estimate for all three beacon transmitters, yielding an inconsistency in the error, statistically over many samples.

It is possible to determine that the beacon signal transmitted by beacon transmitter 1502 has been attenuated at specific points in the transmission path. The location of the attenuation can be determined by looking at errors in the probability surfaces, and noting discontinuities in error values over many samples, and attributing significant error to the beacon transmitted by beacon transmitter 1502. The final variable, the distribution of error, can similarly be determined through machine learning.

It is possible to determine the likelihood, statistically, of many samples to a given location. That is, the distribution of error. For instance, very high RSSI values indicate accurate locations of beacons with small error. It is possible to use these high probability locations to determine the variations in distant readings, and statistically, with large numbers, to determine the overall probability distribution given less reliable values.

FIG. 16 is conceptual diagram showing how the path loss model parameters may be updated over time based on received RSSI values while the path loss model initially starts out using values for parameters in the path loss module which are determined without the use of signal measurements from the area where the devices and zones are located. However, over time the modules parameters are updated based on RSSI measurements made by wireless devices at the location.

In some embodiments multiple APs capable of transmitting beacons on different antenna beams are used at a location, e.g., store. Individual antenna beams transmit beacons into regions corresponding to different beams. Beacons provide information that is relevant to the geographic region into which the beacons are transmitted. The information may be included directly in the beacon signal or information in the beacon signal such as a beacon identifier, alone or in combination with received signal strength information, can be mapped, e.g., directly or via a zone determination operation to information relevant to the geographic region into which the beacon or beacons are transmitted. For example, a beam covering a tie rack may advertise ties while a beam covering a coffee counter may advertise coffee. The APs maybe Bluetooth APS which transmit BTLE beacons. The APS maybe mounted in a ceiling, e.g., of a store or other building. The APS can be configured remotely, e.g., via signals received from a device in the cloud or locally via signals received from a device, e.g., UE device, located in the store. Configuration may include indicating what area, e.g., zone, of the store is to be covered by a beacon and what information is to be transmitted on the beacon or provided to a wireless terminal when the wireless terminal is determined to be in the zone based on one or more received beacon signals alone or in combination with received signal strength information. In some embodiments an information database is maintained and included information corresponding to a zone to be provided to a wireless terminal when, based on one or more received beacon signals, it is determined that the wireless terminal is in the zone.

Figure 17A:
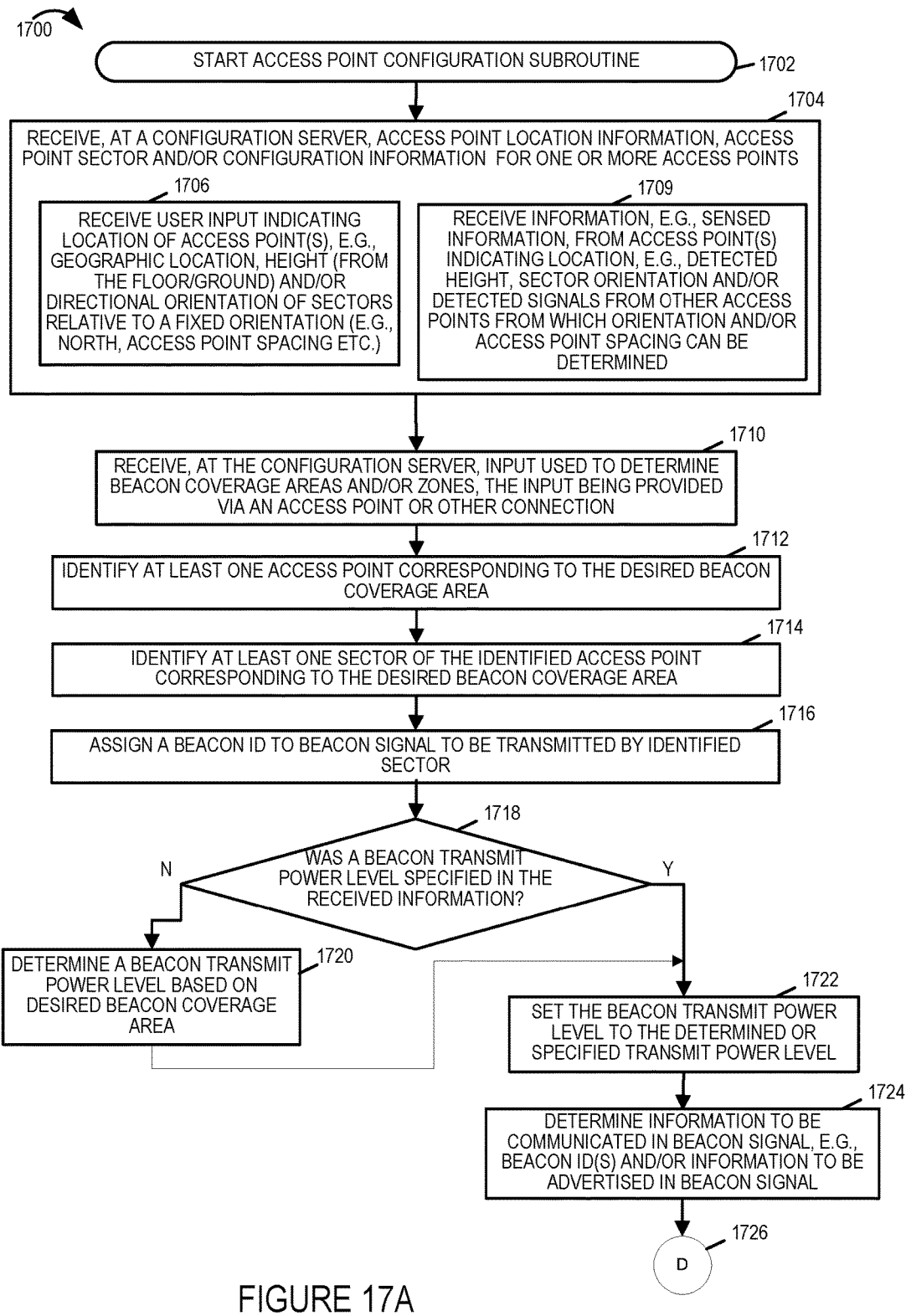
FIG. 17A is a first part of FIG. 17.

FIG. 17, which comprises the combination of FIGS. 17A and 17B illustrates the steps of an access point configuration subroutine 1700 which can be called to configure an access point, e.g., an actual access point, used to transmit one or more beacon signals. The access point maybe a sectorized access point, e.g., a Bluetooth access point, a WiFi access point of an access point of a different type.

The method 1700, which may be implemented by configuration server 120, starts in step 1702 when called by another routine or device, e.g., by step 824 of the method shown in FIG. 8. Operation proceeds from start step 1702 to step 1704. In step 1704 the configuration server receives access point location, access point sector information and/or other configuration or capability information for one or more access points. The information for an individual access point may include such things as height from ground or the floor over which the access point is mounted, the number of sectors the access point includes based on a sectorized antenna or beam forming capability, the orientation of the access point and sectors, e.g., as measured by a compass included in the access point or reported by an information provider, the frequency band or bands into which the access point transmits, maximum transmit power and one or more protocols, e.g., WiFi, Bluetooth, iBeacon, etc., supported by the access point.

Step 1704 includes in some embodiments one or both of steps 1706 and 1709. In step 1706 user input indicating the location of one or more access points is received along with user provided access point capability and/or configuration information of the type discussed above. The information maybe transmitted to the configuration server 120 via an access point with the information being entered by the user operating a WT 504 or other control device capable of communicating the information to the configuration server. In step 1709 the access point information is received from an access point. The information may include sensed position and orientation information as well as device capability and/or configuration information which was preloaded into the access point or which are known based on device type identification information stored in the access point and supplied to the configuration server 120.

Operation proceeds from step 1704 to step 1710 wherein the configuration receives input used to determine beacon coverage areas ne/or zones. The input may include information about users designation of desired beacon transmitter locations indicated on a floor plan or map along with corresponding zone information which may be communicated from a control device 504 to the configuration server via an access point. Alternatively or in addition the information received in step 1710 may be received signal information such as information indicating a location or sector from which a signal was received indicating a desire to place a beacon transmitter at the location from which the signal was received. Additional information that maybe and sometimes is received in step 1710 includes information such as a beacon identifier to be assigned to the beacon signal to be transmitted and/or information about a transmission schedule or beacon signal content to be transmitted. However, such information is optional and not provided in all embodiments.

Operation proceeds from step 1710 to step 1712 wherein the configuration server 120 identifies at least one access point corresponding to the desired beacon coverage area which can transmit a beacon signal into all or at least a portion of the beacon coverage area. Then in step 1714 a sector is identified for use in transmitting the beacon signal from the identified access point. The sector will normally be a sector which is facing the desired beacon coverage area. With the access point and sector transmitter to be used for transmitting a beacon having been determined, operation proceeds to step 1716 in which a beacon ID is assigned to a beacon signal to be transmitted by the identified sector.

Operation then proceeds to step 1718 wherein a check is made to determine if a power level was specified in received information for the beacon signal to be transmitted. If an step 1718 it is determined that a transmit power level was specified, operation proceeds to step 1722. However, if in step 1718 it is determined that a transmit power level was not specified for the beacon signal to be transmitted, operation proceeds to step 1720 in which a transmit power level is determined which when used by the identified sector transmitter of the identified access point will result in beacon signal coverage of the desired beacon signal coverage area.

Operation proceeds from step 1720 to step 1722. In step 1722 the beacon transmit power to be used for the beacon signal to be transmitted is step to the power level determined in step 1720 or specified in the received information. Operation then proceeds to step 1724 in which the information to be communicated in the beacon signal is determined. The information maybe and sometimes is one or more beacon identifiers. The information may in some but not all embodiments, include information corresponding to goods or services which are to be advertised and which correspond to the coverage area of the beacon signal, e.g., can be obtained from a location within the beacon coverage area or near the beacon coverage area.

Operation proceeds from step 1724 to step 1728 via connecting node D 1726. In step 1728 a beacon transmission schedule is determined. In some embodiments the beacon transmission schedule is a function of a sale schedule or when particular items or services are to be offered in the area into which the beacon is to be broadcast. Zone information in some embodiments is also determined and associated, in step 1729, with beacon signal to be transmitted. This allows the beacon ID to be associated with information corresponding to a zone when receipt of a beacon signal is reported, e.g., to a zone correlation engine. The beacon ID to zone correlation information maybe stored in the configuration server 120 and distributed to various devices which include zone correlation engines which correlate received beacon information to zones and information corresponding to the identified corresponding zone or zones.

Operation proceeds from step 1729 to step 1730 in which the beacon signal information is stored in memory. Then in step 1732 the beacon signal information to be communicated to the access point which has been selected for transmission of the beacon signal is stored. Then in step 1736 the information is communicated, e.g., transmitted from the configuration server 120 to the access point 130, 132 or 136 to be configured. In this manner the access point to transmit a beacon signal is supplied with the sector information indicating the sector or sectors into which a beacon signal is to be transmitted, the transmit power level, the information to be transmitted in the beacon signal, the beacon signal transmit schedule and in embodiments where multiple transmit frequencies or beacon signal types are supported the frequency and/or type of beacon signal to be transmitted. For access points which support beam forming capability information on the antenna weights and/or antenna identifiers used to control beam forming operations may also be communicated to the access point which is to transmit the beacon signal.

Operation proceeds from step 1736 to step 1738 which a return step. Operation proceeds back to the routine which called the access point configuration subroutine 1700 where operation can continue with the routine 1700 being potentially called multiple times to configure different access points to transmit different beacon signals or the same access to transmit multiple different beacon signals, e.g., from different sector antennas or with different transmit power levels, frequencies or signal formats.

Figure 18A:
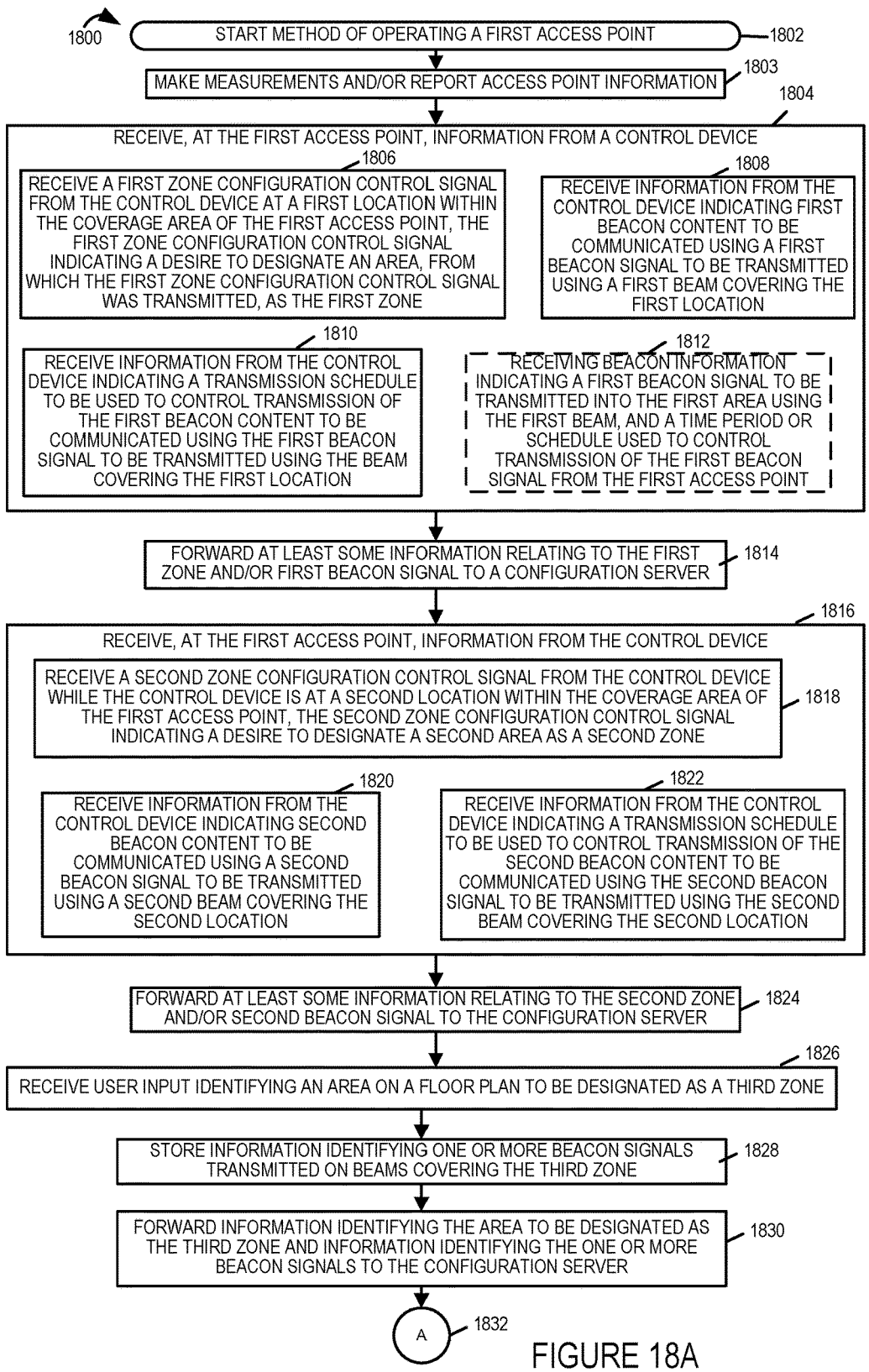
FIG. 18A is a first part of FIG. 18.
Figures 18, 18A, 18B:
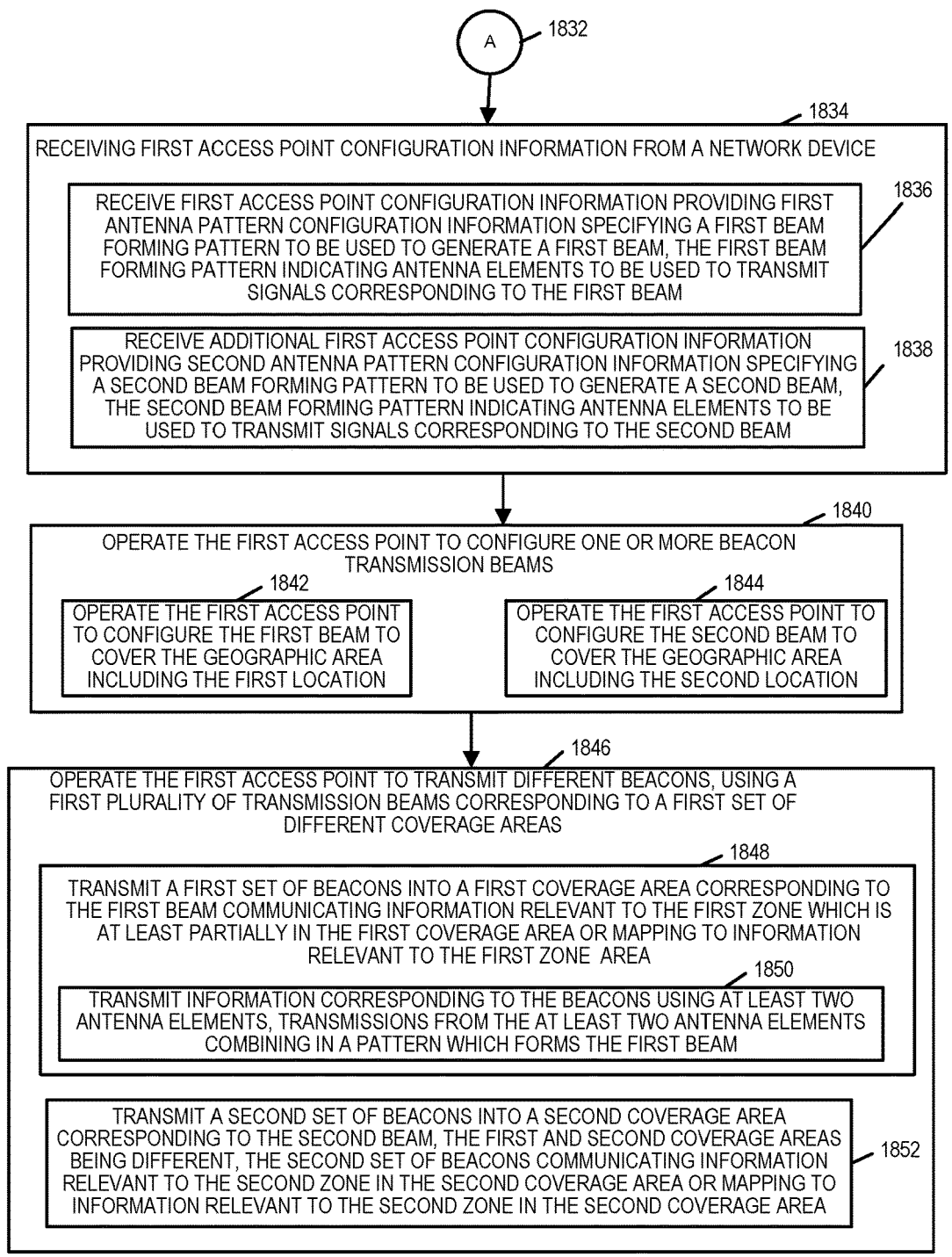
FIG. 18 which comprises the combination of FIGS. 18A and 18B illustrates a method of operating an access point in accordance with one exemplary embodiment.
FIG. 18B is a second part of FIG. 18.

FIG. 18 illustrates the steps of a method 1800 of operating an access point, e.g., a first access point 130, to communicate access point configuration information to a configuration server, communicate user provided control input and to transmit beacon signals in accordance with various features.

The method starts in step 1802 with the access point implementing the method being powered on. Operation proceeds from step 1802 to step 1803 in which the access point makes various measurements, e.g., height from ground or floor, orientation of access point and sectors based on measurement made by internal compass, measurements of signals received from neighboring access points including sector on which an individual signal was received and received signal strength to allow distance estimates and relative orientation with respect to neighboring access point to be determined. In addition the access point reports the results of the measurements to another device, e.g., configuration server 120, along with access point capability information and/or type which, in some cases includes information about the number of sectors, maximum supported transmit power, supported transmission protocols and/or frequencies. Having provided location and capability information to the configuration server 120 the access point, e.g., access point 130 is ready to receive configuration information, e.g., from a control device such as the configuration server 120.

Operation proceeds from step 1803 to step 1804. In step 1804 the first access point receives information from a control device, e.g., WT 504 which can provide beacon signal and/or zone configuration information to be communicated to the control server 120 that can be used to control the configuration of the first access point 130. Receiving information in step 1804 can include receiving a first zone configuration control signal from a control device such as WT 504 at a first location within the coverage area of the first access point as indicated in sub step 1806. The first zone configuration control signal may and sometimes does indicate a desire to designate an area, from which the first zone configuration control signal was transmitted as a first zone. Thus, by transmitting a signal from a location in the coverage area of an access point, the WT 504 can signal to the access point a desire to configure a zone, which will be covered by at least one beacon signal. The zone configuration signal may indicate a desire to transmit a beacon signal covering the indicated zone. In step 1808 the access point receives information, e.g., a beacon ID or other information to be included as content in a first beacon signal to be transmitted in to the first zone. The information maybe indicated as being for transmission using a first beam covering the first location where the beam may correspond to a sector or be formed by transmission from multiple sector transmitters of the first access point. In addition to the signal indicating a desire to configure a zone into which a beacon signal is or will be transmitted, the first access point in step 1810 receives information from the control device WT 504 indicating a transmission schedule to be used to control transmission of a beacon signal including first beacon content to be communicated using the first beacon signal transmitted using a access point transmission beacon covering the first location from which the control signal is transmitted to the access point. Step 1812 which is included in some embodiments includes the access point receiving beacon information indicating a first beacon signal to be transmitted into the first area using the first beam and a time period or schedule to be used to control transmission of the first beacon signal from the first access point.

With the control information received from the wireless terminal 504 used to send control signals to the first access point 130 to be configured, operation proceeds to step 1814 in which the first access point forwards all or at least some of the zone/beacon/access point configuration information to the configuration server 120 for use in configuring the first access point. Thus, in cases where the WT 504 is located within the coverage area of the first access point 130 the first access point 130 can act as a conduit for the control information with the information being received and forwarded to the configuration server 120.

In addition to receiving configuration used to control configuration of a first zone the access point 130 can and does receive configuration information from the control device used to configure other zones and sectors of the first access point. Such signals may be sent as a user walks with the device 504 through the area covered by the first access point.

Operation proceeds from step 1814 to step 1816. In step 1816 the access point receives, from the control device 504, information for configuration a second zone, e.g., corresponding to a coverage area of a beacon which can be transmitted from a second sector of said first access point. In substep 1818 the first access point receives a second zone configuration control signal from the control device 504 while the control device 504 is at a second location where the second location is within the coverage area of the first access point but is a different location than the first location, e.g., a location corresponding to the coverage area of a second sector. The user while present at the second location may send a signal to the access point via WT 504 to signal that a zone is to be established corresponding to the second location and a beacon transmission should be associated with the zone. Thus, the second zone configuration control signal indicates, at least in some embodiments a desire to designate a second area, e.g. an area of a predetermined or indicated size centered around the second location, as a second zone.

Step 1816 may also include substep 1820 in step 1820 information is received from the control device 504 indicating second beacon content to be communicated by a second beacon signal which is to be transmitted using a second beam covering the second location, e.g., a beam corresponding to a second sector of the first access point. Step 1816 also may and sometimes does include step 1822. In step 1822 information is received from the control device 504 indicating a transmission schedule to be used to control transmission of the second beacon signal and thus the content to be communicated by the second beacon signal. Thus, when transmission is implemented according to the second schedule the information, e.g., beacon Id mapping to information to be advertised or the actual information to be advertised, will be communicated by the second beacon signal according to the second schedule.

Operation proceeds from step 1816 to step 1824 in which at least some of the information received in step 181 is communicated to the configuration server 120. Thus as a manager moves from location to location he may signal to the access point covering an area that a beacon signal and/or zone is to be established for the area from which the signal is transmitted with the information being relayed to the configuration server along with, optionally, information identifying the access point which received the signal, sector of the access point which received the signal and received signal strength. From this information and the known location of the access point and potentially information from other access points which also detected one or more signals from the control device 504, the configuration server can determine the location of the zone and/or beacon coverage area to be configured.

As an alternative to receiving control signals transmitted from the physical locations where a user of the control device 504 would like to place a zone and beacon coverage area, similar to the way a user would place and configure an actual beacon transmitter, a user of the WT 504 or another control device can designate a zone and/or beacon coverage area on a map and configure the zone with the related configuration information and location of the beacon coverage area and corresponding zone being communicated to the configuration server 120 by way of a message sent through an access node or another network connection. In step 1826 the first access point may and in some embodiments does receive such configuration information from the control device 504. In step 1826 the first access point receives user input identifying an area on a floor plan to be designated as a zone, e.g., a third zone or another zone, into which a beacon signal is to be transmitted. As should be appreciated "third" in this context is simply used as a zone identifier and another identifier such as "first" could be used if first and second zone information has not already been received by the time step 1826 is implemented.

Following step 1826*m* the information received in step 1826 is stored, e.g., in memory along with information received from the control device 504 identifying one or more beacon signals to be transmitted using one or more beams covering all or a part of the third zone.

Operation proceeds from step 1828 to step 1830. In step 1830 information received and stored, e.g., in steps 1826 and 1828, is forwarded to the configuration server. The information indicates the location of the third zone, the information to be transmitted into the third zone with one or more beacon signals and optionally a desired transmit schedule. Thus, the configuration server 120 may be provided with map based beacon and zone configuration information from control device 504 which can forward such information to the control server 120 via an access point or another network node.

Operation proceeds from step 1830 to step 1834 via connecting node 1832. Thus, by the time step 1834 is performed various information relating to configuring one or more beacon signals and corresponding zones has been communicated to the configuration server 120. The configuration server 120 determines how to configure one more access points based on the received configuration information indicating desired zone, beacon coverage areas and the beacon IDs or information to be communicated by each of the coverage areas. As noted above a coverage area may correspond to an area which is at least partially covered by a beacon transmitter, e.g., an access point sector transmitter of a Bluetooth, WiFi or other type of base station.

In step 1834 the first access point 130 receives access point configuration information from a network device, e.g., control server 120. Step 1834 may and sometimes does includes steps 1836 and 1836. In step 1836 the first access point receives first access point configuration information providing first antenna pattern configuration information specifying a first beam forming pattern to be used to generate a first beam, the first beam forming pattern. In at least some embodiments the information received in step 1836 indicates which antenna elements are to be used to transmit signals corresponding to the first beam. Step 1836 is used where multiple sectors antennas may transmit at the same time with the sector antennas operating together to form a transmission beam that can be used to transmit one or more beacon signals. A single or multiple sector antennas can be used to form a beam.

In step 1838 first access point configuration information which provides information corresponding to a second antenna pattern to be used to generate a second beam is received. The second antenna pattern information may specify a different set of antennas, e.g., sector antennas, to be used in combination to form the second beam. The information received regarding the second beam indicates at least a second set of antenna elements to be used to form the second beam. The second set of antenna elements includes at least one antenna element, e.g., sector transmitter of the first access point, which is different from the antenna elements included in the set used to form the first beam.

Operation proceeds from step 1834 to step 1840 where the first access point configures one or more beacon transmission beams based on the received information. This may include setting switches which cause the first set of antenna elements to be used for transmission or reception when the first beam is to be used and setting switches which cause the second set of antenna elements to be used for transmission or reception when the second beam is to be used.

Step 1840 includes in some embodiments step 1842 which involves operating a first access point to configure the first beam to cover a geographic are including the first location, e.g., a geographic area corresponding to a portion or all of the first zone. Step 1840 may and in some embodiments also includes step 1844 which involves operating the first access point 130 to configure the second beam to cover a geographic are including the second location, e.g., a geographic area corresponding to a portion or all of the second zone. As part of step 1840 beacon transmission schedule information may also be stored so that the first access point 130 knows when to use the first and second beam configurations for transmitting beacon signals. The content of the beacon signal, type of beacon signal and frequency on which a beacon signal is to be transmitted can also be received by the first access point from the configuration server 120 and stored in the first access point, e.g., as part of step 1840.

Operation proceeds from step 1840 to step 1846. In step 1846 the first access point is used to transmit different beacons, e.g., using different beams, into different coverage areas, e.g., corresponding to different zones and/or beacon signals.

Step 1846 includes in some embodiments step 1848. In step 1848 the first access point transmits a first set of one or more beacon signals into a first coverage area corresponding to a first beam. The beacon signals communicate information, e.g., directly in the beacon signal or indirectly by providing a beacon ID which maps to information, relevant to the first zone. In at least some embodiments the first access point is at least partially in the first coverage area with the beacon signals providing information that is relevant to the first zone area.

Step 1848 includes in at least some beam forming embodiments, step 1850 which includes transmitting information using at least two antenna elements, transmission of the at least two antenna elements combining in a pattern which forms the first beam. In other embodiments the first beam may correspond to a single antenna element, e.g., sector transmitter.

Step 1846 may and sometimes also does include step 1852. In step 1852 the first access point transmits a second set of one or more beacon signals into the second coverage area corresponding to the second beam. The first and second coverage area are different in some embodiments, the second set of beacon signals may, and in some embodiments does communicate information relevant to the second zone to which the second coverage area corresponds. The information relevant to the second zone, such as information about goods or services available in the second zone maybe communicated directly in the beacon signals or by the beacon signal communicating a beacon ID or other identifier which maps to and thus can be used to retrieve, e.g., from a database, the information being communicated.

While step 1846 involves the transmission of beacon signals from the first access point 130, it should be appreciated that the first access point can receive additional configuration information and be configured to transit into multiple zones at different times, e.g., using sets of antennas corresponding to one or more different sectors of the first base station to form different beams as needed. To convey the idea of the ongoing operation, operation is shown proceeding from step 1846 back to step 1804 via goto node 1848.

While FIG. 18 shows the operation of a first access point 130, it should be appreciated that the system includes multiple access points 130, 132, 136 which each access point being capable of implementing the method shown in FIG. 18 and being configured to transmit beacon signals into coverage area which the access point can reach with transmitted signals. Thus the method of FIG. 18 is sometimes used to configure a second access point 132 in which case the references to "first access point" in FIG. 18 would be interpreted as referring to the second access point 132.

It should be appreciated that in some embodiments the access point configured in accordance with the method of FIG. 18 is a Bluetooth sectorized access point which may and sometimes does transmit BLE beacon signals. The access point maybe such as the one described with regard to any one or more other figures in this application. The first access point may, and in some embodiments does include at least 3 but often several more sectors. In some embodiments to facilitate a high level of directivity the access point includes at least 6 sectors but sometimes 9 or more sectors. The antenna element of each sector can be used independently or multiple sector antennas can be used in combination to from a beam allowing for a wide range of beam forming options and coverage areas.

FIG. 19 illustrates a set 1900 of beacon and zone information generated and maintained by the configuration server 120 in some embodiments. The set of information includes for each of a plurality of beacon signals 1 to K various information which can be used to configure a transmitter to transmit the beacon signal in the case of a real beacon signal or which can be used to predict the receipt of a virtual beacon signal in the case of a signal which is not transmitted but which is to be indicated as being received when a device is within the coverage area of the virtual beacon signal.

Each row 1920, 1922, 1924, 1926, 1930 corresponds to a different beacon signal with the particular beacon signal to which the row corresponds being identified by the beacon identifier included in the third column, 1906, of the row. Thus, for example the first row 1920 corresponds to beacon 1 while row 3 corresponds to the beacon identified by beacon identifier Beacon 3. For each beacon signal various information is included. The first column 1902 includes a beacon transmitter used to transmit the beacon signal listed in the third column of the corresponding row. For example the transmitter identified by the identifier TX1 is used to transmit Beacon signal identified by beacon signal identifier Beacon 1. The second column of each row indicates the location, e.g., by coordinates in space or by GPS coordinates of the transmitter identified in column 1 of the same row. The location information may, and sometime does, allow the determination of the position of the transmitter within a building or above a floor or the ground. The fourth row 1908 indicates beacon content for the beacon of the particular row. The beacon content may include information in addition to the beacon identifier or be limited to one or more beacon IDs. The fifth column of a row indicates the type of beacon to which the row corresponds. This allows the transmitter to determine the format of the beacon signal to be transmitted. The sixth row 1912 indicates a frequency band in which the beacon signal of the row is transmitted. Different frequency bands may be used for different types of beacon signals and/or an access point may support multiple frequency bands making frequency band information 1912 useful with regard to informing an AP as to what frequency band to use for the beacon signal to which the row corresponds. Transmission power level information for the beacon identified in a row is specified in the seventh column 1914 of FIG. 19. The eight column 1916 is included in systems which support the use of real and virtual beacons and indicates whether the beacon in the row to which the indicator corresponds is a real or virtual beacon. In the case of a virtual beacon no beacon signal transmission are to take place and the identified transmitter in many cases will not be a real transmitter while in some cases the identified transmitter may be a real transmitter but is not transmit a signal corresponding to the virtual beacon. The last column 1917 indicates a zone to which a beacon corresponds. Multiple beacons may correspond to, and sometime do correspond to, the same zone but in many cases beacons correspond to different zones.

All or some of the information shown in FIG. 19 is maintained, updated and distributed by the configuration server 120 in some embodiments. Real access points can use the configuration information to determine what beacon signals to transmit, e.g., with different sector transmitters or different beams corresponding to different transmitter identifiers. A zone correlation engine can use the information in table 1900 to determine based on reports of received beacon signals and/or corresponding received beacon signal strength which zone a WT 504 is in at a given time and to then provide information corresponding to the zone.

Modules and/or apparatus used to determine the receipt of virtual beacon signals can use the information in table 1900 along with position information of a wireless terminal and a path loss model to determine when receipt of a virtual beacon signal should be declared and reported to another device or module.

Numerous other uses of the information included in table 1900 are possible. In some embodiments each row further include an entry indicating a beacon transmission time schedule of the beacon signal of the row in which the schedule is included.

Virtual beacons will now be discussed further with reference to the exemplary system shown in FIG. 20.

Figure 20:
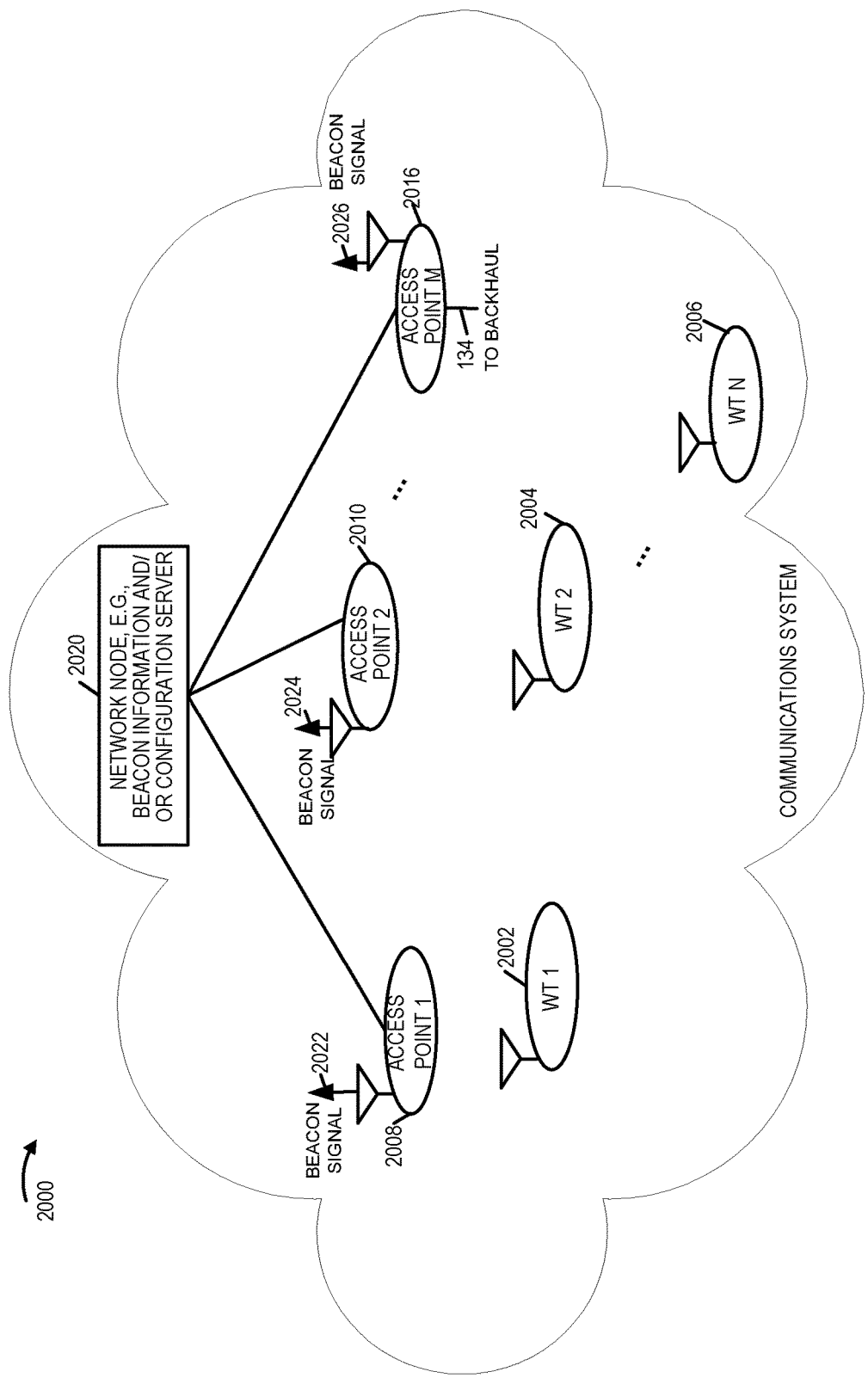
FIG. 20 illustrates an exemplary communications system in accordance with one exemplary embodiment in which virtual beacon signals maybe used.
Figure 21:
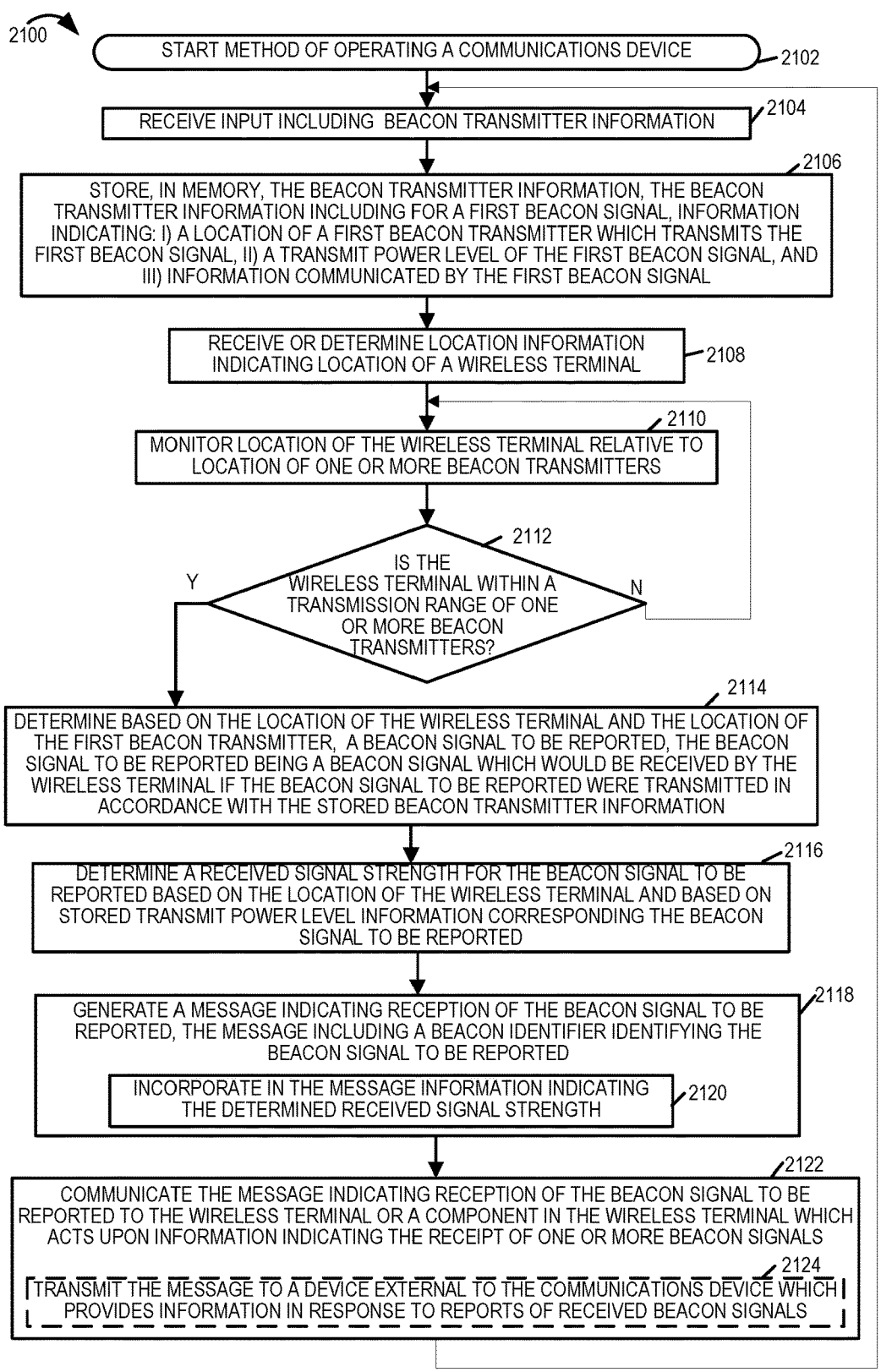
FIG. 21 a flowchart of an exemplary method of operating a wireless communications device, in accordance with an exemplary embodiment.

FIG. 20 illustrates an exemplary communications system 2000 implemented in accordance with various exemplary embodiments. The system 2000 supports the use of virtual beacon signals in addition to, or as an alternative to, actual beacon signals. Exemplary communications system 2000 includes a plurality of communications devices including a plurality of access points, wireless terminal devices and network nodes. FIG. 21 shows the communications devices in the system include a wireless terminal (WT) 1 2002, WT 2004, . . . , WT N 2006, access point 1 2008, access point 2 2010, . . . , access point M 2016, and a network node 2020. The communications devices of the system 2000 support communications and signaling using a variety of protocols including LTE Direct, WiFi, Bluetooth etc. Some of the communications devices, e.g., WT 2002, 2004, . . . , 2006 are mobile communications devices, e.g., mobile wireless terminals such as handheld mobile communications devices. Some other devices, e.g., access points 2008, 2010, . . . , 2016 may be fixed location devices including a wireless interface supporting transmitting/receiving wireless signals and a wired interface providing coupling to a backhaul network.

As illustrated, in some embodiments the access points 2008, 2010, 2016 and the network node 2020 are coupled via a backhaul network, e.g., backhaul network. The network node 2020 is a node in the core network and is coupled to access points and/or other network nodes via the backhaul. The network node 2020 in some embodiments is a beacon information and/or configuration server which may be, and in some embodiments is, configured to implement the methods of the present invention discussed in flowchart 2100. In some embodiments the node 2020 provides beacon transmitter information indicating location and/or other information relating to actual and/or virtual beacon transmitters (e.g., access points transmitting beacon signals) in the system to the wireless terminal WT 2002, 2004, . . . , 2006.

In various embodiments one or more access points in system 2000 operate as beacon transmitters and may transmit, e.g., broadcast, beacon signals including information. Exemplary information in a beacon signal may include, e.g., device information, product advertisement, service advertisement, an offer of service, an offer of a product, location information, etc. For the purpose of illustration in FIG. 20, access point 1 2008 is shown transmitting a beacon signal 2022, access point 2 2010 is shown transmitting a beacon signal 2024 and access point M 2016 is shown transmitting a beacon signal 2026, which may be detected by other devices in its vicinity or transmission range of the access points. In some embodiments the location of one or more beacon transmitters is known to the network node 2020 which may and in some embodiments does share the location information with the wireless terminals in the system. Devices may also transmit other types of signals, e.g., traffic data signals including user data including, e.g., voice, text, and/or image data, to one or more of other communications devices in the communications system 2000. In some embodiments the communication between the network node 2020 and mobile wireless terminals is via the one or more access points in the system 2000. In some embodiments at least some of the access points 2008, 2010, 2016 provide access to the Internet and/or other network nodes via a wired or fiber network connection.

In accordance with one aspect of the invention, the system 2000 and the devices therein support both real and virtual beacons. While a real beacon is actually transmitted from a beacon transmitting device such as the access points, a virtual beacon as the name suggests is virtual and is not actually transmitted from a beacon transmitter. Thus while various access points are shown in FIG. 1, for virtual beacon signals an actual beacon transmitter need not be present at the location corresponding to the access point. While a virtual beacon signal is not actually transmitted or received, in accordance with the features of some embodiments a device such as a wireless terminal (e.g., any of the wireless terminals WT 2002, WT 2004, . . . , WT 2006) may get a misrepresentation, e.g., indication via a message, making it believe that a beacon signal has been received and the wireless terminal may then report receipt of the beacon signal (e.g., virtual beacon) to a network device such as node 2020 or a component within the wireless terminal which takes further actions. The wireless terminal reporting the reception of the beacon signal may not even know that an actual beacon has not been received and the wireless terminal has been tricked into believing that a beacon signal has been received. In some embodiments the wireless terminal operates as a virtual beacon reception determination device.

FIG. 21 illustrates a flowchart 2100 of an exemplary method of operating a communications device, in accordance with an exemplary embodiment. In some embodiments the exemplary communications device implementing the method of flowchart 2100 is a wireless terminal such as any one of the wireless terminals of system 2000. In various embodiments, the wireless terminal is a handheld device that does not operate as an access point, e.g., base station. In some embodiments the exemplary communications device implementing the method of flowchart 2100 is a network node such as the network node 2020.

Operation starts in step 2102, where the communications device is powered on and initialized and proceeds to step 2104. In step 2104, the communications device receives input including beacon transmitter information. The beacon transmitter information in some embodiments includes a set of information, for a plurality of beacon transmitters and/or beacon signals, indicating one or more of the following: beacon transmitter identity, beacon transmitter location, whether the beacon transmitter is real or virtual, beacon signal identifier, beacon signal content (whether beacon is virtual or real), transmit power level, frequency band used for transmission etc. The information may be provided to the communications device in a variety of ways, e.g., entering the beacon transmitter information manually, providing the information to the communications device over the air from a management/configuration device etc.

Operation proceeds from step 2104 to step 2106. In step 2106 the beacon transmitter information is stored in a memory, e.g., as information in table 1900. In some embodiments the beacon transmitter information includes, for a first beacon signal, information indicating: i) a location of a first beacon transmitter which transmits the first beacon signal, ii) a transmit power level of the first beacon signal; and iii) information communicated by the first beacon signal. An exemplary beacon transmitter information table 1900 is shown in FIG. 19 and discussed above in detail. In some embodiments the first beacon transmitter is a virtual beacon transmitter.

Operation proceeds from step 2106 to step 2108. In step 2108 the communications device receives or otherwise determines location information indicating a location of a wireless terminal, e.g., wireless terminal which is to report reception of a beacon signal. In some embodiments the communications device is the wireless terminal itself which is to report receipt of a beacon, e.g., virtual beacon, and may either determine its own location, e.g., based on GPS signals or other received signals/information from other devices, or may receive information from a network node indicating the location of the wireless terminal. Regardless of the approach of location determination, the location of a wireless terminal is determined and considered. Operation proceeds from step 2108 to step 2110. In step 2110 the communications device monitors the location of the wireless terminal relative to locations of one or more beacon transmitters, e.g., beacon transmitters identified in the stored information. In various embodiments the monitoring for wireless terminal location is performed to determine whether the wireless terminal is in proximity and/or transmission range/coverage area of the one or more known beacon transmitters, e.g., such as those corresponding to which beacon transmitter information is stored. It should be appreciated that such determination can be made since the location of one or more beacon transmitters is included in the beacon transmitter information.

Operation proceeds from step 2110 to step 2112. In step 2112 the communications device determines whether the wireless terminal is in the transmission range of or more known beacon transmitters (virtual or real). If in step 2112 it is determined, based on the location of wireless terminal and the location of one or more beacon transmitters, that the wireless terminal is not in the transmission range of one or more beacon transmitters the operation proceeds from step 2112 back to step 2110 and the monitoring of wireless terminal location in comparison to the location of beacon transmitters continues. If in step 2112 it is determined, based on the location of wireless terminal and the location of one or more beacon transmitters, that the wireless terminal is in the transmission range of one or more beacon transmitters the operation proceeds from step 2112 to step 2114. In step 2114 the communication device determines, based on the location of the wireless terminal and the first beacon transmitter, a beacon signal to be reported, the beacon signal to be reported being a beacon signal which would be received by the wireless terminal if the beacon signal to be reported were transmitted in accordance with the stored beacon transmitter information. For example, during monitoring in step 2110 of the wireless terminal location relative to location of beacon transmitters may detect, based on the location of the wireless terminal at the given time, that the wireless terminal is in the transmission range of a known beacon transmitter (whether real or virtual). Based on the location comparison it can be determined which beacon transmitter has the wireless terminal in its transmission range since the location of beacon transmitters is indicated in the stored beacon transmitter information. Further based on the stored information it can also be determined what type of beacon signal and beacon content is expected from the beacon transmitter which has the wireless terminal in its transmission range. Thus in step 2114 the communication device identifies the beacon signal to be reported based on the location of the wireless terminal and the stored beacon transmitter information which indicates the location and other information corresponding to the beacon transmitter and beacon signal to be reported.

Operation proceeds from step 2114 to step 2116. In step 2116 the communications device determines a received signal strength for the beacon signal to be reported based on the location of said wireless terminal and based on stored transmit power level information corresponding the beacon signal to be reported. In some embodiments the communications device uses the indicated transmission power level corresponding to the beacon signal to be reported (virtual or real) indicated in the stored information and a path loss model to determine the received signal strength for the beacon signal to be reported. A predetermined path loss model and stored information about the virtual beacon transmitter power allows, based on the distance between the virtual beacon transmitter and the location of the wireless terminal, the wireless terminal or another device to determine the estimated received signal strength of a beacon that would have been received if transmitted by the virtual transmitter. In some embodiments the communications device includes a path loss determination device configured to calculate the path loss between the wireless terminal reporting the reception of virtual beacon signal and the virtual beacon transmitter. Those skilled in the art would readily appreciate that using the wireless terminal location, stored transmit power level information corresponding the beacon signal to be reported and the path loss, the received signal strength for the beacon signal to be reported can be determined.

Operation proceeds from step 2116 to step 2118. In step 2118 the communications device generates a message indicating reception of the beacon signal to be reported, the message including a beacon identifier identifying the beacon signal to be reported. In some embodiments the step 2118 of generating the message indicating reception of the beacon signal to be reported includes step 2120 of incorporating, in the message, information indicating the determined received signal strength. Thus in some embodiments the generated message indicating reception of the beacon signal to be reported includes a beacon identifier identifying the beacon signal whose reception is being reported and the determined received signal strength (e.g., determined in step 2116). In some embodiments the message reports receipt of a beacon signal which was not actually received by the wireless terminal, e.g., in the case of virtual beacons.

Operation proceeds from step 2118 to step 2122. In step 2122 the communications device communicates the message indicating reception of the beacon signal to be reported to the wireless terminal or a component in the wireless terminal which acts upon information indicating the receipt of one or more beacon signals. In some embodiments the communications device is a network device (e.g., located external to the wireless terminal) in the core network which receives wireless location information from the wireless terminal or determines the location of the wireless terminal from a signal received from another device. Thus in some embodiments where the communications device implementing the method 2100 is the network node, e.g., node 2020, the communications device performs virtual beacon reception determination operation for a wireless terminal. In some such embodiments the network node sends the generated message indicating reception of the beacon signal to be reported, to the wireless terminal. Following receipt of the message from the communications device the wireless terminal, in some embodiments, proceeds to take an action that it would take upon receiving an actual beacon signal.

In some other embodiments where the communications device implementing the method is the wireless terminal itself, e.g., operating as the virtual beacon reception determination device, the communications device sends the message indicating reception of the beacon signal to be reported to a component in the wireless terminal which acts upon information indicating the receipt of one or more beacon signals. The component may be a device, application specific integrated circuit (ASIC), processor or module within the wireless terminal that takes action in response to receipt of beacon signals. In some embodiments step 2122 further includes step 2124 which is shown in a dashed box as an optional step. In step 2124 the communications device transmits the generated message, e.g., via a transmitter, to a device external to the communications device which provides information in response to reports of received beacon signals. Such an external device that provides information in response to reports of received beacon signals may be, e.g., a location server, an advertisement server etc. Messages reporting receipt of a virtual beacon signal may, and in some embodiments do, indicate distance, in addition to received signal strength, to the virtual beacon transmitter and optionally also direction to the virtual beacon transmitter.

Figure 22:
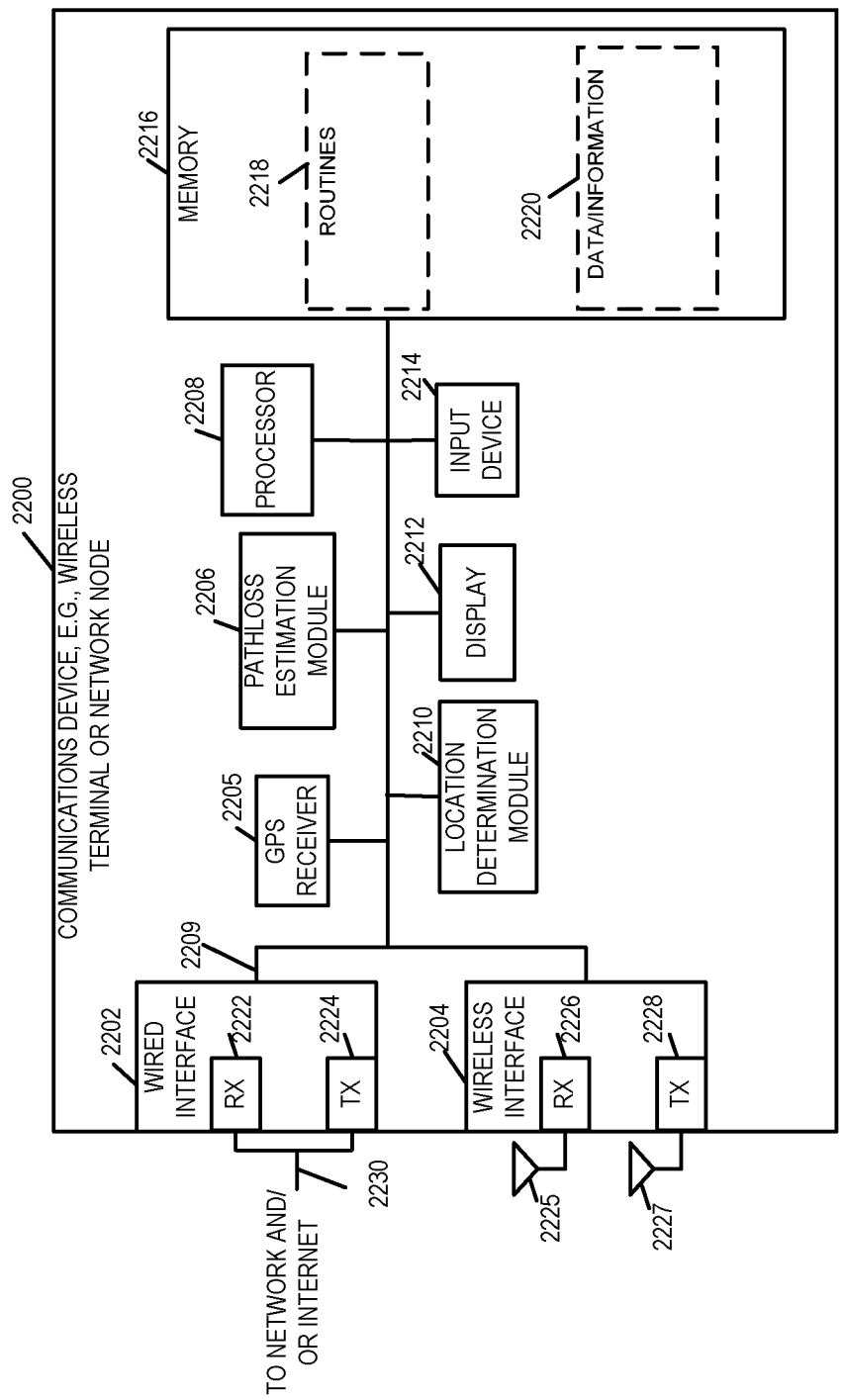
FIG. 22 illustrates an exemplary communications device, e.g., wireless terminal or a network node, in accordance with an exemplary embodiment.

FIG. 22 illustrates an exemplary communications device 2200 implemented in accordance with some embodiments which is capable of detecting receipt of beacons and reporting the receipt of beacon signals to one or more devices. Exemplary communications device 2200 can be used as the network node 2020 shown in FIG. 20. The exemplary communications device 2200 can also be used as any of the wireless terminal 2002, 2004, . . . , 2006 of FIG. 20. The communications device 2200 may, and sometimes does, implement a method in accordance with flowchart 2100.

The communications device 2200 includes a processor 2208 and memory 2216 coupled together via a bus 2209 over which the various elements may interchange data and information. Memory 2216 includes routines 2218 and data/information 2220. The communications device 2200 further includes a wired interface 2202, a wireless interface 2204, a GPS receiver 2205, a path loss determination device 2206, a location determination device 2210, a display 2212 and a input device 2214. In some embodiments, one or more of the devices/modules 2205, 2206, 2210, are included in processor 2208. In some embodiments, one or more of portions of one or more of modules 2206, 2210 are included in processor 2208. In some embodiments one or more modules of communications device are, implemented fully in hardware within the processor 2208, e.g., as individual circuits. In other embodiments some of the modules are implemented, e.g., as circuits, within the processor 2208 with other modules being implemented, e.g., as circuits, external to and coupled to the processor. Alternatively, rather than being implemented as circuits, all or some of the modules may be implemented in software and stored in the memory 2216 of the device 2200 with the modules controlling operation of the communications device 2200 to implement the functions corresponding to the modules when the modules are executed by a processor, e.g., processor 2208.

Via the wired interface 2202 the communications device 2200 can be coupled to the communications network, external device and/or internet. The interface 2202 in some embodiments includes receiver 2222 and a transmitter 2224. In addition to receiver 2222 and a transmitter 2224 the interface 2202 further includes an optical interface and/or a power line interface for communicating with various devices and system elements. The wired interface 2202 is capable of transmitting/receiving information over a wired link. In some embodiments the wired 2202 is coupled to other nodes and/or a backhaul via link 2230. In some embodiments the wired and/or optical interface 2202 is an Ethernet interface.

The communications device 2200 further includes a wireless interface 2204 via which the communications device 2200 communicates with wireless devices. The wireless interface 2204 includes a wireless receiver module 2226 coupled to receive antenna 2225, via which the communications device 2200 receives radio signals. The radio signals include, e.g., beacon signals. The wireless interface 2204 further includes a wireless transmitter 2228 coupled to transmit antenna 2227 via which the device 2200 transmits radio signals. In some embodiments, the same antenna is used for both input and output wireless communications signaling. In some embodiments the wireless interface 2204 is a WAN (wide area network) radio module. In some embodiments the wireless interface 2204 includes a plurality of wireless transmitter/receiver modules capable of transmitting and receiving variety of wireless signals, e.g., WiFi signals, LTE direct beacon signals, iBeacons, Bluetooth beacons etc. Various other types of radio modules may be used in the wireless interface in some embodiments. Thus in some embodiments, the different radio modules in the wireless interface correspond to different communications technologies, different communications protocols and/or different frequency bands. While a variety of radio modules may be used in the communications device 2200 in some embodiments, in accordance with one aspect of the invention even when the communications device 2200 does not actually include a particular type of wireless receiver which would otherwise be needed to receive the particular type of beacon signal, it can still claim to have received a beacon (e.g., virtual beacon signal). The receivers included in the interfaces 2204, 2206 are configured to receive signals (e.g., control signals, beacon signals etc.) and process them to recover information and/or data communicated in a received signal.

In some embodiments the communications device 2200 receives input (e.g., via interface 2202, interface 2204 and/or input device 2214) including beacon transmitter information. In various embodiments the processor 2208 is configured to control the device 2200 to store, in memory 2216, the beacon transmitter information. In some embodiments the beacon transmitter information includes, for a first beacon signal, information indicating: i) a location of a first beacon transmitter which transmits the first beacon signal, ii) a transmit power level of the first beacon signal; and iii) information communicated by the first beacon signal. In some embodiments the first beacon transmitter is a virtual beacon transmitter. The beacon transmitter information may be stored as part of data/information 2220 in memory 2216. In addition to the data/information 2220 the memory 2216 in some embodiments includes routines 2218 including control and communications routines.

The GPS receiver 2205 is configured to receive GPS signals and provide GPS position coordinates as an input to the location determination module 2210. The location determination module 2210 is configured to determine the location of the communications device based on, e.g., the GPS data received from the GPS receiver 2205 or based on signals/information received from other devices. In some embodiments the communications device 2200 is a network node and the location determination module 2210 is configured to determine the location of a wireless terminal, e.g., based on the signals received from the wireless terminal or based on information received from other devices. In some embodiments the communications device 2200 is a wireless terminal. In some such embodiments the location determination module 2210 is configured to determine the wireless terminal location, e.g., based on GPS data acquired by the GPS receiver 2205 and/or based on signal from other devices, or based on location information communicated to the wireless terminal from a network node such as network node 2020 or an access point. Thus it should be appreciated that the location information of the wireless terminal may be determined or received from another device.

The input device 2214 may includes a keypad, microphone, touch-sensitive device via which input data can be provided to the communications device 2200. In some embodiments the processor 2208 is configured to monitor location of the wireless terminal relative to the location of one or more beacon transmitters (virtual and/or real), e.g., by comparing wireless terminal's current location with the location of one or more beacon transmitters indicated in the stored beacon information. In various embodiments the processor 2208 is further configured to determine whether the wireless terminal is in the transmission range of one or more beacon transmitters at a given time.

In various embodiments the processor 2208 is further configured to determine, based on the location of a wireless terminal and the location of the first beacon transmitter, a beacon signal to be reported, the beacon signal to be reported being a beacon signal which would be received by the wireless terminal if the beacon signal to be reported were transmitted in accordance with the stored beacon transmitter information. In some embodiments the processor 2208 is further configured to determine a received signal strength for the beacon signal to be reported based on the location of the wireless terminal and based on stored transmit power level information corresponding the beacon signal to be reported. In some embodiments the processor 2208 is further configured to generate the message indicating reception of the beacon signal to be reported, the message including a beacon identifier identifying the beacon signal to be reported. In some embodiments the processor 2208 is further configured to incorporate in the message information indicating the determined received signal strength generate.

The processor 2208 is further configured to communicate, e.g., via an interface of the device 2200 and/or bus 2209, a message indicating reception of the beacon signal to be reported to the wireless terminal or a component in the wireless terminal which acts upon information indicating the receipt of one or more beacon signals. In some embodiments the processor 2208 is further configured to transmit, via a transmitter such as transmitter 2228, the message to a device external to the communications device 2200 which provides information in response to reports of received beacon signals.

Figure 23A:
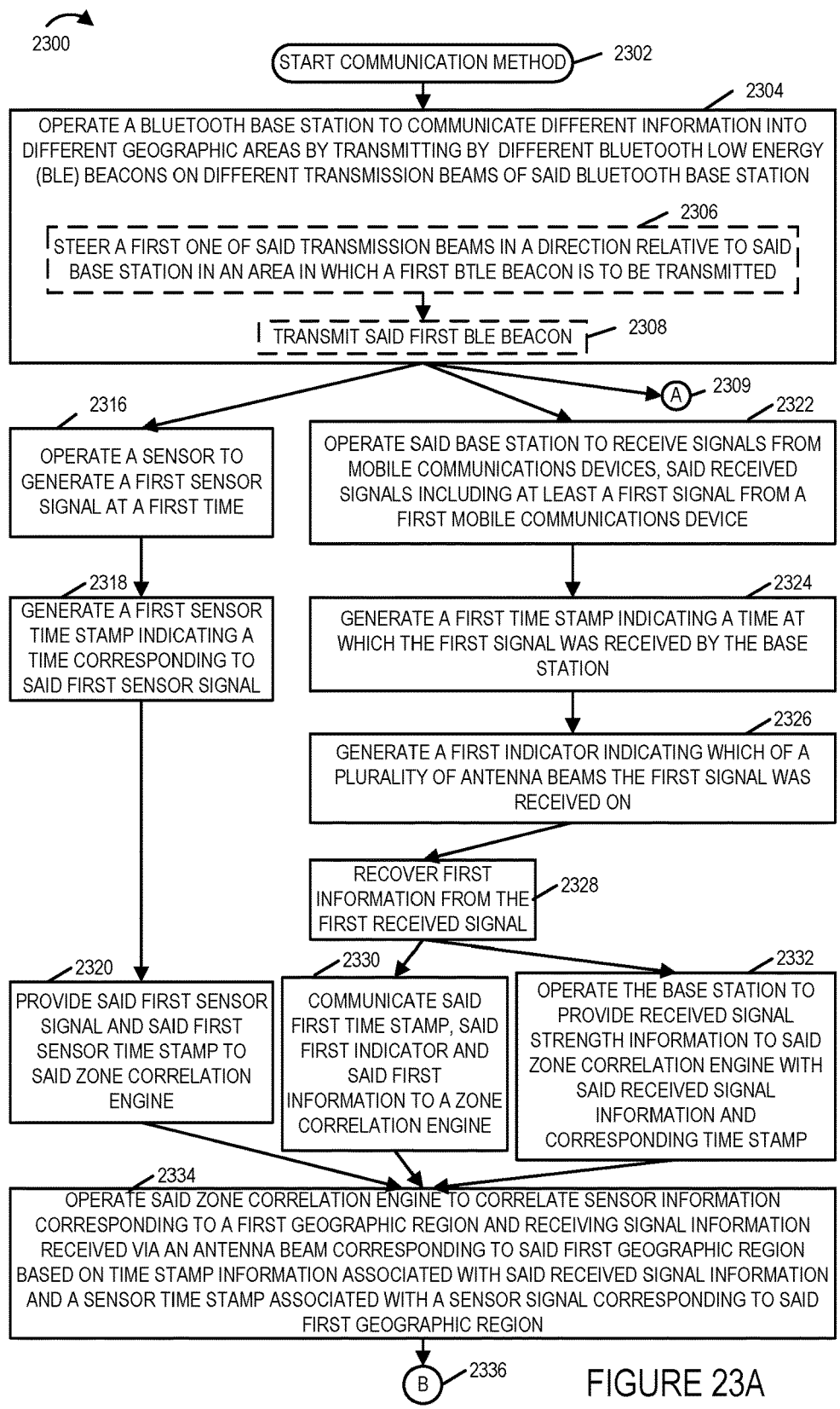
FIG. 23A is a first part of the flowchart of FIG. 23.
Figures 23, 23A, 23B:
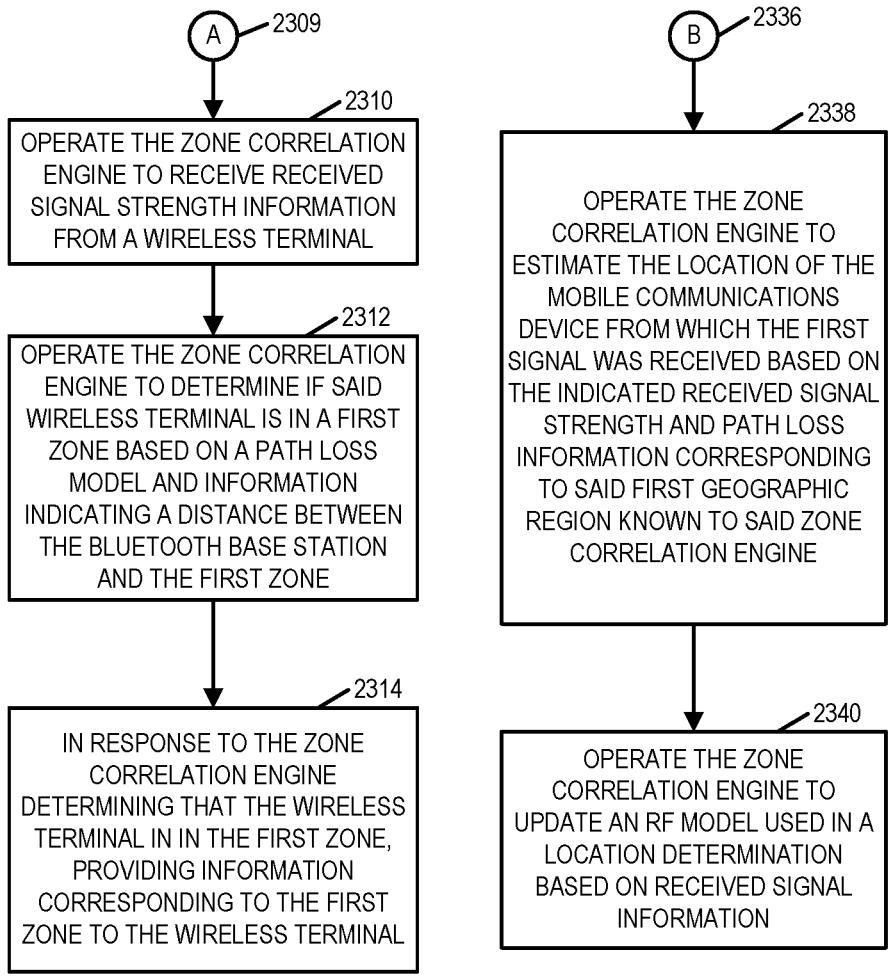
FIG. 23 is illustrates an exemplary communications method in accordance with one embodiment.
FIG. 23B is a second part of the flowchart of FIG. 23.

FIG. 23, comprising the combination of FIG. 23A and FIG. 23B, is a flowchart 2300 of an exemplary communications method in accordance with various embodiments. Operation starts in step 2302 and proceeds to step 2304. In step 2304 a Bluetooth base station is operated to communicate different information into different geographic areas by transmitting different Bluetooth low energy (BLE) beacons on different transmission beams of said Bluetooth base station. In some embodiments, the Bluetooth base station is a sectorized base station. In some such embodiments, the sectorized base station includes a single transmitter chain and transmits into at most a single sector of said base station at any given time.

In various embodiments, the transmission beams of said Bluetooth base station are steerable. In some embodiments, step 2304 includes steps 2306 and 2308. In step 2306 the Bluetooth base station steers a first one said transmission beams in a direction relative to said base station in an area in which a first Bluetooth low energy (BLE) beacon is to be transmitted. In some such embodiments, the first area is an area where a good or service advertised by said first beacon can be obtained. In some embodiments, different individual beams transmit different information which is relevant to the particular geographic area into which the particular beam is transmitted. Operation proceeds from step 2306 to step 2308, in which the Bluetooth base station transmits the first Bluetooth low energy (BLE) beacon.

Operation proceeds from step 2304 to step 2316, to step 2322, and, via connecting node A 2309 to step 2310. In step 2310 a zone correlation engine is operated to receive received signal strength information from a wireless terminal. Operation proceeds from step 2310 to step 2312 in which the zone correlation engine is operated to determine if said wireless terminal is in a first zone based on a path loss model and information indicating a distance between the Bluetooth base station and the first zone. Operation proceeds from step 2312 to step 2314. In step 2314, in response to the zone correlation engine determining that the wireless terminal is in the first zone, the zone correlation engine is operated to provide information corresponding to the first zone to the wireless terminal.

Returning to step 2316, in step 2316 a sensor is operated to generate a first sensor signal at a first time. Operation proceeds from step 2316 to step 2318. In step 2318, a first sensor time stamp is generated indicating a time corresponding to the first sensor signal. Operation proceeds from step 2318 to step 2320, in which the first sensor signal and said first sensor time stamp are provided to said zone correlation engine.

Returning to step 2322, in step 2322 said Bluetooth base station is operated to receive signals from mobile communications devices, said received signals including at least a first signal from a first mobile communications device. Operation proceeds from step 2322 to step 2324, in which the Bluetooth base station generates a first time stamp indicating a time at which the first signal was received by the base station. Operation proceeds from step 2324 to step 2326, in which the Bluetooth base station generates a first indicator indicating which of a plurality of antenna beams the first signal was received on. Operation proceeds from step 2326 to step 2328 in which the Bluetooth base station recovers first information from the first received signal. Operation proceeds from step 2328 to step 2330 and 2332.

In step 2330 the Bluetooth base station communicates said first time stamp, said first indicator, and said first information to a zone correlation engine. In step 2332 the Bluetooth base station provides received signal strength information to said cone correlation engine with said received signal information and the corresponding time stamp. Operation proceeds from steps 2320, 2330 and 2332 to step 2334. In step 2334 the zone correlation engine correlates sensor information corresponding to a first geographic region and received signal information received via an antenna beacon corresponding to said first geographic region based on time stamp information associated with said received signal information associated with said received signal information and a sensor time stamp associated with a sensor signal corresponding to said first geographic region. In some embodiments, the received signal information is obtained from a Bluetooth low energy (BLE) signal that was received by said Bluetooth base station and said sensor signal is one of a video or audio signal corresponding to said first geographic region.

In some embodiments, the zero correlation engine is located in one of a wireless terminal or a Bluetooth base station. In some other embodiments, the zero correlation engine is located in a network node that is coupled to said Bluetooth base station by a communications network, e.g., is located in the cloud.

Operation proceeds from step 2334, via connecting node B 2336, to step 2338. In step 2338 the zone correlation engine is operated to estimate the location of the mobile communications device from which the first signal was received based on the indicated received first signal strength and path loss information corresponding to said first geographic region known to said correlation engine. Operation proceeds from step 2338 to step 2340. In step 2340 the correlation engine is operated to update an RF model used in a location determination based on received information.

Figure 24:
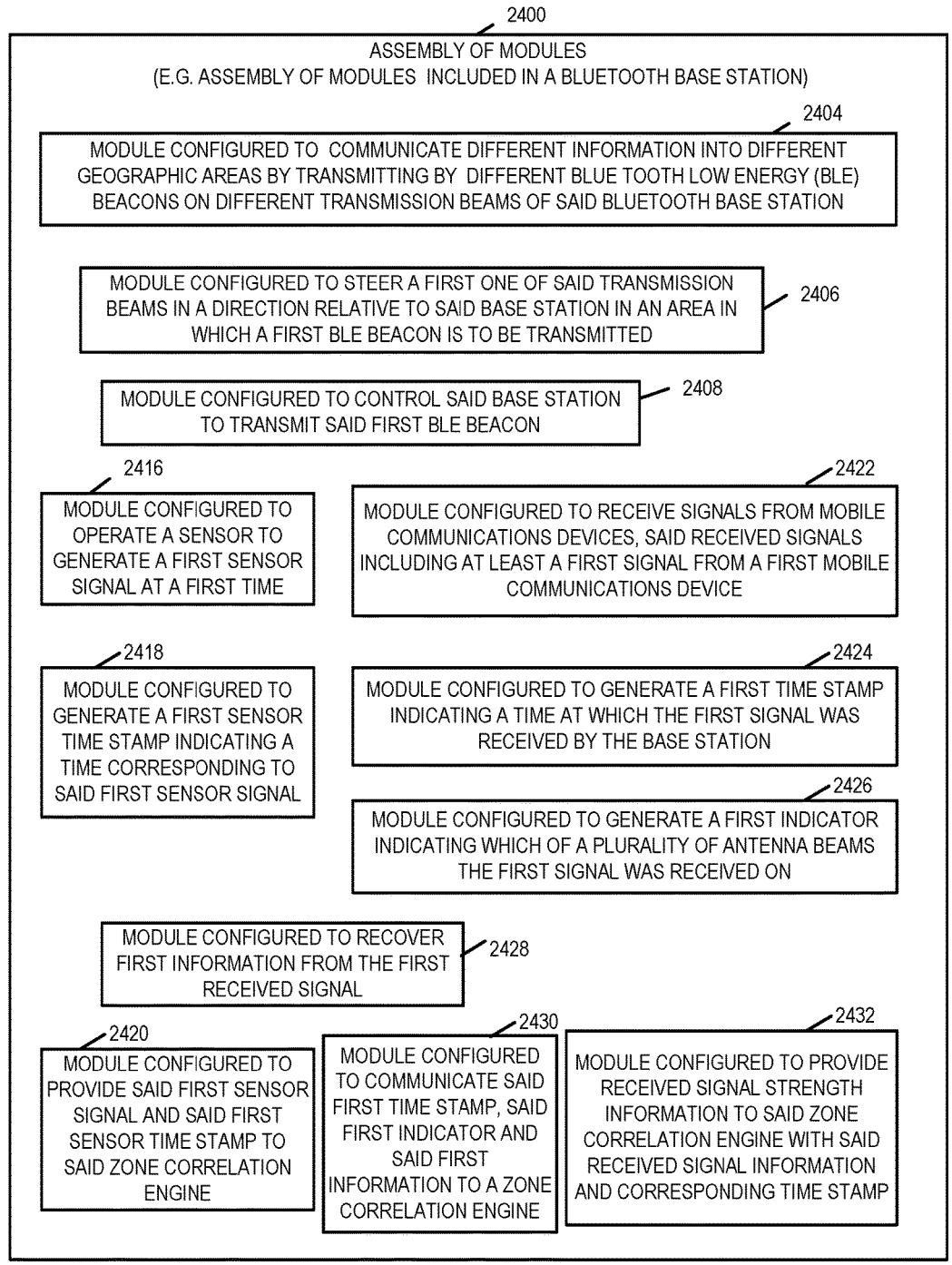
FIG. 24 is an assembly of modules which may be included in an exemplary base station, e.g., an access point of any one of the other figures, in accordance with an exemplary embodiment.

FIG. 24 is a drawing of an assembly of modules 2400 in accordance with an exemplary embodiment. Assembly of module 2400 is, e.g., included in a Bluetooth base station, in accordance with an exemplary embodiment. The Bluetooth base station including assembly of module 2400 is, e.g., one of access points of FIG. 1-7, and/or a base station transmitting a beacon shown or described with respect to any of the FIGS. 1-25, and/or a Bluetooth base station implementing various steps of the method of flowchart 2300 of FIG. 23. In one example, the base station including assembly of modules is access point 700 of FIG. 7 including processor 700 and routines 730.

The modules in the assembly of modules 2400 can, and in some embodiments are, implemented fully in hardware within a processor, e.g., as individual circuits. The modules in the assembly of modules 2400 can, and in some embodiments are, implemented fully in hardware within an assembly of modules external to the processor, e.g., as individual circuits corresponding to the different modules. In other embodiments some of the modules are implemented, e.g., as circuits, within the processor with other modules being implemented, e.g., as circuits within and assembly of modules, external to and coupled to the processor. As should be appreciated the level of integration of modules in the processor and/or with some modules being external to the processor may be one of design choice.

Alternatively, rather than being implemented as circuits, all or some of the modules may be implemented in software and stored in the memory of a device, with the modules controlling operation of device to implement the functions corresponding to the modules when the modules are executed by a processor. In some such embodiments, the assembly of modules 2400 is included in a memory. In some such embodiments, the assembly of modules is included as part of the routines in memory. In still other embodiments, various modules in assembly of modules 2400 are implemented as a combination of hardware and software, e.g., with another circuit external to the processor providing input to a processor which then under software control operates to perform a portion of a module's function. While shown in various embodiments as a single processor, e.g., computer, it should be appreciated that the processor may be implemented as one or more processors, e.g., computers.

When implemented in software the modules include code, which when executed by the processor, configure the processor to implement the function corresponding to the module. In embodiments where the assembly of modules 2400 is stored in memory, the memory is a computer program product comprising a computer readable medium comprising code, e.g., individual code for each module, for causing at least one computer, e.g., a processor, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 24 control and/or configure the device or elements therein such as a processor, to perform the functions of corresponding steps illustrated in a method, e.g., the method of flowchart 2300 of FIG. 23.

Assembly of module 2400 includes a module 2404 configured to communicate different information into different geographic areas by transmitting different Bluetooth low energy (BLE) beacons on different transmission beams of said Bluetooth base station, a module 2406 configured to steer a first one of said transmission beams in a direction relative to said base station in a area in which a first BLE beacon is to be transmitted, and a module 2408 configured to control said base station to transmit said first BLE beacon.

Assembly of modules 2400 further include a module 2416 configured to operate a sensor to generate a first sensor signal at a first time, a module 2418 configured to generate a first sensor time stamp indicating a time corresponding to a first sensor signal, and a module 2420 configured to provide said first sensor signal and said first sensor time stamp to a zone correlation engine.

Assembly of module 2400 further includes a module 2422 configured to receive signal form mobile communications devices, said received signal including at least a first signal form a first mobile communications device, a module 2424 configured to generate a first time stamp indicating a time at which the first signal was received by the base station, a module 2426 configured to generate a first indicator indicating which of a plurality of antenna beams the first signal was received on, a module 2428 configured to recover first information from the first received signal, a module 2430 configured to communicate said first time stamp, said first indicator, and said first information to a zone correlation engine, and a module 2432 configured to provide received signal strength information to said zone correlation engine with said received signal information and corresponding time stamp.

Figure 25:
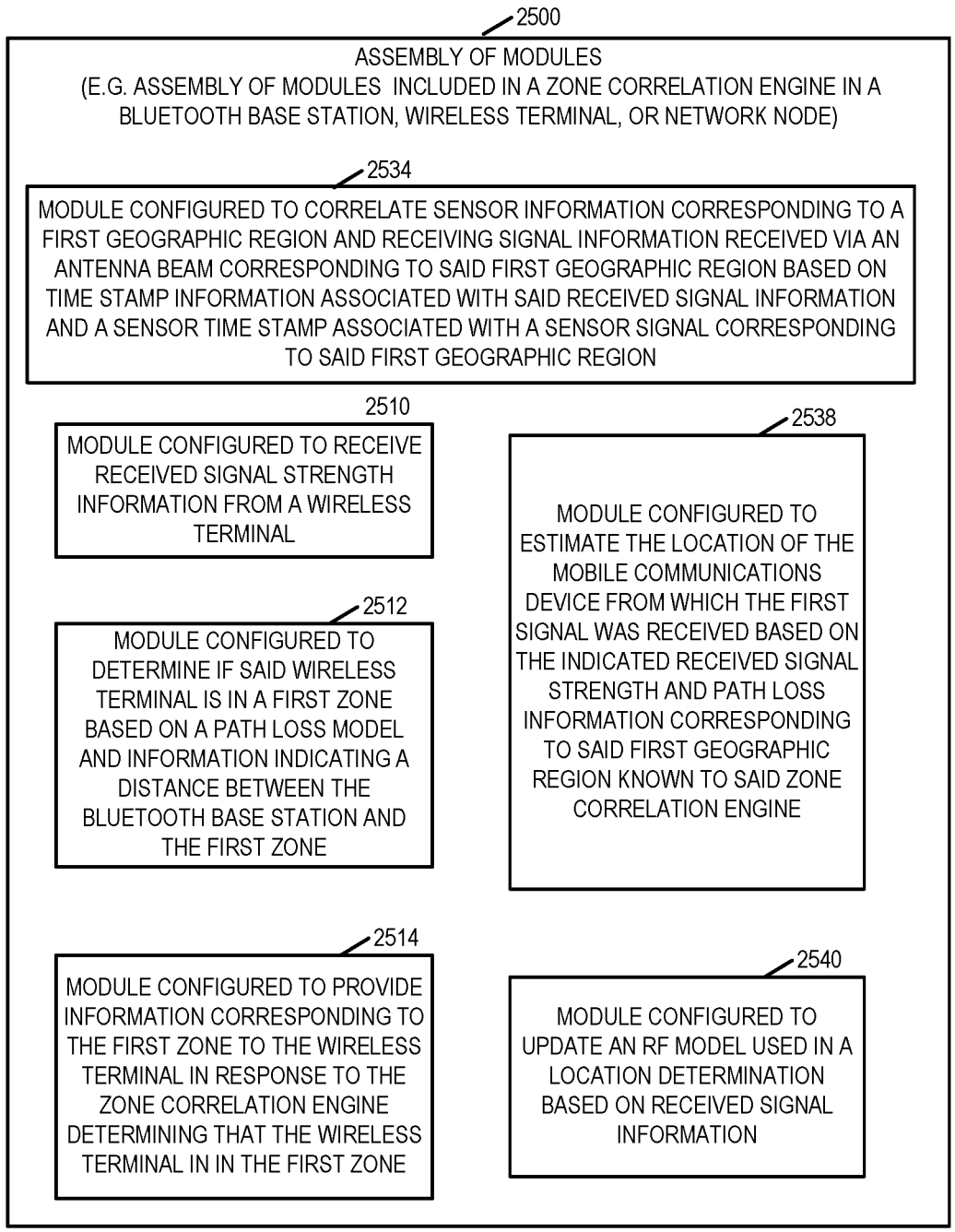
FIG. 25 is an assembly of modules which may be include in an exemplary zone correlation engine shown in any one of the other figures in accordance with an exemplary embodiment.

FIG. 25 is a drawing of an assembly of modules 2500 in accordance with an exemplary embodiment. Assembly of module 2500 is included in a zone correlation engine, e.g., a zone correlation engine in a Bluetooth base station, in a wireless terminal, e.g., a UE device which may be a mobile communications device, or in a network node, in accordance with an exemplary embodiment. In one embodiment, a network node, including the zone correlation engine including the assembly of modules 2500, is coupled to a Bluetooth base station. The zone correlation engine including assembly of module 2500 is, e.g., zone correlation engine 1021 of FIG. 10, zone correlation engine 1131 of UE device 1100 of FIG. 11, zone correlation engine 1200 of FIG. 12, a zone correlation engine implementing various steps of the method of flowchart 2300 of FIG. 23, and/or a zone correlation engine described in any of FIGS. 1-25. In one embodiment, the zone correlation engine including assembly of modules 2500 is zone correlation engine 1021 of device 1000 of FIG. 10. In another embodiment the zone correlation engine including assembly of module 2500 is zone correlation engine 1111 of UE device 1100 of FIG. 11, zone correlation engine 1131 of routines 1130 included in memory 1112 of UE device 1100. In still other embodiments, portions of assembly of modules 2500 are included in zone correlation engine 1111 and other portions of assembly of module 2500 are included in zone correlation engine 1131. In still other embodiments, the zone correlation engine including assembly of modules 2500 is included in access point 700, e.g., in processor 706, in routine 730 in memory 712, and/or as external hardware modules, e.g., circuits, coupled to processor 706.

The modules in the assembly of modules 2500 can, and in some embodiments are, implemented fully in hardware within a processor, e.g., as individual circuits. The modules in the assembly of modules 2500 can, and in some embodiments are, implemented fully in hardware within an assembly of modules external to the processor, e.g., as individual circuits corresponding to the different modules. In other embodiments some of the modules are implemented, e.g., as circuits, within the processor with other modules being implemented, e.g., as circuits within and assembly of modules, external to and coupled to the processor. As should be appreciated the level of integration of modules in the processor and/or with some modules being external to the processor may be one of design choice.

Alternatively, rather than being implemented as circuits, all or some of the modules may be implemented in software and stored in the memory of a device, with the modules controlling operation of device to implement the functions corresponding to the modules when the modules are executed by a processor. In some such embodiments, the assembly of modules 2500 is included in a memory. In still other embodiments, various modules in assembly of modules 2500 are implemented as a combination of hardware and software, e.g., with another circuit external to the processor providing input to a processor which then under software control operates to perform a portion of a module's function. While shown in various embodiments as a single processor, e.g., computer, it should be appreciated that the processor may be implemented as one or more processors, e.g., computers.

When implemented in software the modules include code, which when executed by the processor, configure the processor to implement the function corresponding to the module. In embodiments where the assembly of modules 2500 is stored in memory, the memory is a computer program product comprising a computer readable medium comprising code, e.g., individual code for each module, for causing at least one computer, e.g., a processor, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 25 control and/or configure the device or elements therein such as a processor, to perform the functions of corresponding steps illustrated in a method, e.g., the method of flowchart 2300 of FIG. 23.

Assembly of modules 2500 includes a module 2534 configured to correlate sensor information corresponding to a first geographic region and receiving signal information received via an antenna beam corresponding to said first geographic region based on time stamp information associated with said received signal information and a sensor time stamp associated with a sensor signal corresponding to said geographic region, a module 2536 configured to estimate the location of the mobile communications device from which the first signal was received based on the indicated received signal strength and path loss information corresponding to said first geographic region known to said correlation engine, and a module 2540 configured to update an RF model used in a location determination based on received signal information.

Assembly of modules 2500 further includes a module 2510 configured to receive received signal strength information from a wireless terminal, a module 2512 configured to determine if said wireless terminal is in a first zone based on a path loss model and information indicating a distance between the Bluetooth base station and the first zone, and a module 2514 configured to provide information corresponding to the first zone to the wireless terminal in response to the zone correlation engine determining that the wireless terminal is in the first zone.

The techniques of various embodiments may be implemented using software, hardware and/or a combination of software and hardware. Various embodiments are directed to apparatus, e.g., mobile nodes such as mobile wireless terminals, base stations, communications system. Various embodiments are also directed to methods, e.g., method of controlling and/or operating a communications device, e.g., wireless terminals (UEs), base stations, control nodes and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the invention.

In some embodiments, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with user equipment devices, e.g., mobile nodes, using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. An apparatus, comprising:
   memory including stored beacon transmitter information, said beacon transmitter information including for a first beacon signal, information indicating: i) a location of a first beacon transmitter and ii) a transmit power level of the first beacon signal; and
   a processor configured to:
      determine, based on a location of a wireless terminal and the location of said first beacon transmitter, a beacon signal strength to be reported, said beacon signal strength to be reported being an expected beacon signal strength at the location of said wireless terminal given the location of said first beacon transmitter and the transmit power level; and
      communicate a message indicating the determined beacon signal strength to the wireless terminal or a component in said wireless terminal which acts upon received beacon signal information.

2. The apparatus of claim 1, wherein the processor is further configured to:
 generate said message indicating the determined beacon signal strength, said message including a beacon identifier identifying a beacon signal to which the determined beacon signal strength corresponds.

3. The apparatus of claim 2, further comprising:
 a transmitter configured to transmit said message to a device, external to said apparatus, which provides information in response to a report of received beacon signal.

4. The apparatus of claim 1, wherein said first beacon transmitter is a virtual beacon transmitter which does not transmit an actual beacon signal.

5. The apparatus of claim 1, wherein said message reports the beacon signal strength of a beacon signal which was not actually received by said wireless terminal.

6. The apparatus of claim 1, wherein said apparatus is a network device which is located external to said wireless terminal.

7. The apparatus of claim 1, wherein said apparatus is the wireless terminal.

8. A method of operating an apparatus, the method comprising:
 storing beacon transmitter information, said beacon transmitter information including for a first beacon signal, information indicating: i) a location of a first beacon transmitter, and ii) a transmit power level of the first beacon signal;
 determining, based on a location of a wireless terminal and the location of said first beacon transmitter, a beacon signal strength to be reported, said beacon signal strength to be reported being an expected beacon signal strength at the location of said wireless terminal given the location of said first beacon transmitter and the transmit power level; and
 communicating a message indicating the determined beacon signal strength to the wireless terminal or a component in said wireless terminal which acts upon received beacon signal information.

9. The method of claim 8, further comprising:
 generating said message indicating the determined beacon signal strength, said message including a beacon identifier identifying a beacon signal to which the determined beacon signal strength corresponds.

10. The method of claim 8, further comprising:
 transmitting said message to a device, external to said apparatus, which provides information in response to a report of received beacon signal.

11. The method of claim 8, wherein said first beacon transmitter is a virtual beacon transmitter which does not transmit an actual beacon signal.

12. The method of claim 8, wherein said message reports the beacon signal strength of a beacon signal which was not actually received by said wireless terminal.

13. The method of claim 8, wherein said apparatus is a network device which is located external to said wireless terminal.

14. The method of claim 8, wherein said apparatus is the wireless terminal.

15. A non-transitory computer readable medium for use in an apparatus, said non-transitory computer readable medium including processor executable instructions which when executed by at least one processor cause said apparatus to:
 store beacon transmitter information, said beacon transmitter information including for a first beacon signal, information indicating: i) a location of a first beacon transmitter, and ii) a transmit power level of the first beacon signal;
 determine, based on a location of a wireless terminal and the location of said first beacon transmitter, a beacon signal strength to be reported, said beacon signal strength to be reported being an expected beacon signal strength at the location of said wireless terminal given the location of said first beacon transmitter and the transmit power level; and
 communicate a message indicating the determined beacon signal strength to the wireless terminal or a component in said wireless terminal which acts upon received beacon signal information.

16. The non-transitory computer readable medium of claim 15, further comprising processor executable instructions which when executed by said at least one processor cause said apparatus to:
 generate said message indicating the determined beacon signal strength, said message including a beacon identifier identifying a beacon signal to which the determined beacon signal strength corresponds.

17. The non-transitory computer readable medium of claim 15, further comprising processor executable instructions which when executed by said at least one processor cause said apparatus to:
 transmit said message to a device, external to said apparatus, which provides information in response to a report of received beacon signal.

18. The non-transitory computer readable medium of claim 15, wherein said first beacon transmitter is a virtual beacon transmitter which does not transmit an actual beacon signal.

19. The non-transitory computer readable medium of claim 15, wherein said message reports the beacon signal strength of a beacon signal which was not actually received by said wireless terminal.

20. The non-transitory computer readable medium of claim 15, wherein said apparatus is a network device which is located external to said wireless terminal.

* * * * *